(12) United States Patent
Suh et al.

(10) Patent No.: US 11,229,085 B2
(45) Date of Patent: Jan. 18, 2022

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Kyung-Joo Suh, Seoul (KR); Alexander Sayenko, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/755,435

(22) PCT Filed: Oct. 12, 2018

(86) PCT No.: PCT/KR2018/012070
§ 371 (c)(1),
(2) Date: Apr. 10, 2020

(87) PCT Pub. No.: WO2019/074334
PCT Pub. Date: Apr. 18, 2019

(65) Prior Publication Data
US 2020/0245404 A1    Jul. 30, 2020

(30) Foreign Application Priority Data

Oct. 13, 2017  (KR) .................. 10-2017-0133638
Oct. 20, 2017  (KR) .................. 10-2017-0136705
(Continued)

(51) Int. Cl.
*H04W 80/10*       (2009.01)
*H04W 76/25*       (2018.01)
(Continued)

(52) U.S. Cl.
CPC ............. *H04W 80/10* (2013.01); *H04W 8/08* (2013.01); *H04W 12/06* (2013.01); *H04W 48/16* (2013.01); *H04W 60/00* (2013.01); *H04W 76/25* (2018.02)

(58) Field of Classification Search
CPC .............. H04L 41/0823; H04L 5/0092; H04L 41/0853; H04W 24/02; H04W 76/15;
(Continued)

(56) References Cited

U.S. PATENT DOCUMENTS 8,345,612 B2    1/2013  Lim et al.
8,982,838 B2    3/2015  Sun
(Continued)

FOREIGN PATENT DOCUMENTS

GB          2501110 A  * 10/2013 ............ H04W 76/15
KR   10-2009-0028056 A     3/2009
(Continued)

OTHER PUBLICATIONS

"3GPP SA2 architecture and functions for 5G mobile communication system" by Kim et al. (dated Apr. 13, 2017) (Year: 2017).*
(Continued)

*Primary Examiner* — Daniel Lai

(57) ABSTRACT

The present disclosure relates to a 5G or pre-5G communication system for supporting a higher data transfer rate than a 4G communication system such as LTE. In a method of a terminal according to one embodiment of the present disclosure, a communication method of a terminal in a wireless
(Continued)

communication system supporting a plurality of PDU sessions is proposed, the communication method comprising: a step of transmitting, via a base station to a network entity responsible for mobility management, a first NAS message including first state information indicating whether to activate each of the plurality of PDU sessions; and a step of receiving, via the base station from the network entity, a second NAS message including second state information indicating whether to activate each of the plurality of PDU sessions.

17 Claims, 70 Drawing Sheets

(30) Foreign Application Priority Data

| Nov. 20, 2017 | (KR) | ......................... 10-2017-0154465 |
|---|---|---|
| Nov. 20, 2017 | (KR) | ......................... 10-2017-0154682 |
| Jan. 12, 2018 | (KR) | ......................... 18-2018-0004643 |
| Feb. 14, 2018 | (KR) | ......................... 10-2018-0018573 |
| May 3, 2018 | (KR) | ......................... 10-2018-0051473 |
| May 24, 2018 | (KR) | ......................... 10-2018-0058903 |

(51) Int. Cl.
*H04W 8/08* (2009.01)
*H04W 12/06* (2021.01)
*H04W 48/16* (2009.01)
*H04W 60/00* (2009.01)

(58) Field of Classification Search
CPC ..... H04W 88/06; H04W 76/11; H04W 76/27; H04W 76/10; H04W 76/19; H04W 88/18; H04W 8/08; H04W 24/04; H04W 36/0033; H04W 60/00; H04W 80/10; H04W 76/25; H04W 12/06; H04W 48/16; H04W 12/75; H04W 12/72; H04W 12/08; H04W 88/02

See application file for complete search history.

(56) References Cited

U.S. PATENT DOCUMENTS

| 9,237,594 | B2 | 1/2016 | Yang et al. | |
|---|---|---|---|---|
| 2011/0103277 | A1* | 5/2011 | Watfa | H04W 36/0033 370/310 |
| 2015/0351136 | A1* | 12/2015 | Kaura | H04W 76/10 370/329 |
| 2016/0113054 | A1* | 4/2016 | Chen | H04W 36/28 370/329 |
| 2018/0176979 | A1 | 6/2018 | Ryu et al. | |
| 2019/0246342 | A1* | 8/2019 | Wang | H04W 68/005 |
| 2020/0137643 | A1* | 4/2020 | Li | H04W 36/0038 |
| 2020/0359291 | A1* | 11/2020 | Ramle | H04W 48/18 |

FOREIGN PATENT DOCUMENTS

| KR | 10-2010-0019960 A | 2/2010 |
|---|---|---|
| KR | 10-2013-0116076 A | 10/2013 |
| WO | 2016/163723 A1 | 10/2016 |

OTHER PUBLICATIONS

Supplementary Partial European Search Report dated Oct. 20, 2020 in connection with European Application No. 18866019.5, 7 pages.
3GPP TR 24.890 V1.0.3 (Sep. 2017), Technical Report, 3rd Generation Partnership Project; Technical Specification Group Core Network and Terminals; 5G System—Phase 1; CT WG1 Aspects (Release 15), Sep. 2017, 163 pages.
ZTE, "UE Triggered Service Request procedure," S2-170273 (revision of S2-17xxxx), SA WG2 Temporary Document, SA WG2 Meeting #118-BIS, Spokane, WA, USA, Jan. 16-20, 2017, 3 pages.
"3rd Generation Partnership Project; Technical Specification Group Services and System Aspects; Procedures for the 5G System; Stage 2 (Release 15)", 3GPP TS 23.502 V1.2.0 (Sep. 2017), 165 pages.
International Search Report dated Feb. 20, 2019 in connection with International Patent Application No. PCT/KR2018/012070, 4 pages.
Written Opinion of the International Searching Authority dated Feb. 20, 2019 in connection with International Patent Application No. PCT/KR2018/012070, 8 pages.

* cited by examiner

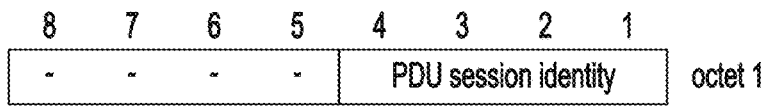

FIG.3

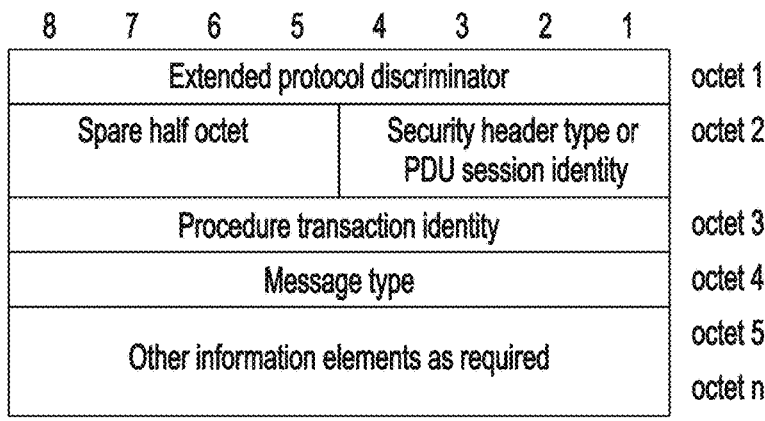

FIG.4

```
PDU session identity value (octet 1, bit 1 to bit 4)
Bits
4 3 2 1
0 0 0 0   No PDU session identity assigned
0 0 0 1   PDU session identity value 1
0 0 1 0   PDU session identity value 2
0 0 1 1   PDU session identity value 3
0 1 0 0   PDU session identity value 4
0 1 0 1   PDU session identity value 5
0 1 1 0   PDU session identity value 6
0 1 1 1   PDU session identity value 7
1 0 0 0   PDU session identity value 8
1 0 0 1   PDU session identity value 9
1 0 1 0   PDU session identity value 10
1 0 1 1   PDU session identity value 11
1 1 0 0   PDU session identity value 12
1 1 0 1   PDU session identity value 13
1 1 1 0   PDU session identity value 14
1 1 1 1   PDU session identity value 15
```

FIG.5

```
PDU session identity value (octet 1, bit 1 to bit 8)
Bits
8 7 6 5 4 3 2 1
0 0 0 0 0 0 0 0   No PDU session identity assigned
0 0 0 0 0 0 0 1   reserved
0 0 0 0 0 0 1 0   reserved
0 0 0 0 0 0 1 1   reserved
0 0 0 0 0 1 0 0   reserved
0 0 0 0 0 1 0 1   PDU session identity value 5
0 0 0 0 0 1 1 0   PDU session identity value 6
0 0 0 0 0 1 1 1   PDU session identity value 7
0 0 0 0 1 0 0 0   PDU session identity value 8
0 0 0 0 1 0 0 1   PDU session identity value 9
0 0 0 0 1 0 1 0   PDU session identity value 10
0 0 0 0 1 0 1 1   PDU session identity value 11
0 0 0 0 1 1 0 0   PDU session identity value 12
0 0 0 0 1 1 0 1   PDU session identity value 13
0 0 0 0 1 1 1 0   PDU session identity value 14
0 0 0 0 1 1 1 1   PDU session identity value 15
0 0 0 1 0 0 0 0   PDU session identity value 16
0 0 0 1 0 0 0 1   PDU session identity value 17
0 0 0 1 0 0 1 0   PDU session identity value 18
0 0 0 1 0 0 1 1   PDU session identity value 19
0 0 0 1 0 1 0 0   PDU session identity value 20
0 0 0 1 0 1 0 1   PDU session identity value 21
0 0 0 1 0 1 1 0   PDU session identity value 22
0 0 0 1 0 1 1 1   PDU session identity value 23
0 0 0 1 1 0 0 0   PDU session identity value 24
0 0 0 1 1 0 0 1   PDU session identity value 25
0 0 0 1 1 0 1 0   PDU session identity value 26
0 0 0 1 1 0 1 1   PDU session identity value 27
0 0 0 1 1 1 0 0   PDU session identity value 28
0 0 0 1 1 1 0 1   PDU session identity value 29
0 0 0 1 1 1 1 0   PDU session identity value 30
0 0 0 1 1 1 1 1   PDU session identity value 31
0 0 1 0 0 0 0 0   PDU session identity value 32
0 0 1 0 0 0 0 1   PDU session identity value 33
0 0 1 0 0 0 1 0   PDU session identity value 34
0 0 1 0 0 0 1 1   PDU session identity value 35
0 0 1 0 0 1 0 0   PDU session identity value 36
```

FIG.6A

| PDU session identity value (octet 1, bit 1 to bit 8) | |
|---|---|
| Bits | |
| 8 7 6 5 4 3 2 1 | |
| 0 0 0 0 0 0 0 0 | No PDU session identity assigned |
| 0 0 0 0 0 0 0 1 | reserved |
| 0 0 0 0 0 0 1 0 | reserved |
| 0 0 0 0 0 0 1 1 | reserved |
| 0 0 0 0 0 1 0 0 | reserved |
| 0 0 0 0 0 1 0 1 | PDU session identity value 5 |
| 0 0 0 0 0 1 1 0 | PDU session identity value 6 |
| 0 0 0 0 0 1 1 1 | PDU session identity value 7 |
| 0 0 0 0 1 0 0 0 | PDU session identity value 8 |
| 0 0 0 0 1 0 0 1 | PDU session identity value 9 |
| 0 0 0 0 1 0 1 0 | PDU session identity value 10 |
| 0 0 0 0 1 0 1 1 | PDU session identity value 11 |
| 0 0 0 0 1 1 0 0 | PDU session identity value 12 |
| 0 0 0 0 1 1 0 1 | PDU session identity value 13 |
| 0 0 0 0 1 1 1 0 | PDU session identity value 14 |
| 0 0 0 0 1 1 1 1 | PDU session identity value 15 |
| 0 0 0 1 0 0 0 0 | PDU session identity value 16 |
| 0 0 0 1 0 0 0 1 | PDU session identity value 17 |
| 0 0 0 1 0 0 1 0 | PDU session identity value 18 |
| 0 0 0 1 0 0 1 1 | PDU session identity value 19 |
| 0 0 0 1 0 1 0 0 | PDU session identity value 20 |
| All other values are reserved. | |

FIG.6B

| PDU session identity value (octet 1, bit 1 to bit 8) | |
|---|---|
| Bits | |
| 8 7 6 5 4 3 2 1 | |
| 0 0 0 0 0 0 0 0 | No PDU session identity assigned |
| 0 0 0 0 0 0 0 1 | reserved |
| 0 0 0 0 0 0 1 0 | reserved |
| 0 0 0 0 0 0 1 1 | reserved |
| 0 0 0 0 0 1 0 0 | reserved |
| 0 0 0 0 0 1 0 1 | PDU session identity value 5 |
| 0 0 0 0 0 1 1 0 | PDU session identity value 6 |
| 0 0 0 0 0 1 1 1 | PDU session identity value 7 |
| 0 0 0 0 1 0 0 0 | PDU session identity value 8 |
| 0 0 0 0 1 0 0 1 | PDU session identity value 9 |
| 0 0 0 0 1 0 1 0 | PDU session identity value 10 |
| 0 0 0 0 1 0 1 1 | PDU session identity value 11 |
| 0 0 0 0 1 1 0 0 | PDU session identity value 12 |
| 0 0 0 0 1 1 0 1 | PDU session identity value 13 |
| 0 0 0 0 1 1 1 0 | PDU session identity value 14 |
| 0 0 0 0 1 1 1 1 | PDU session identity value 15 |
| 0 0 0 1 0 0 0 0 | PDU session identity value 16 |
| 0 0 0 1 0 0 0 1 | PDU session identity value 17 |
| 0 0 0 1 0 0 1 0 | PDU session identity value 18 |
| 0 0 0 1 0 0 1 1 | PDU session identity value 19 |
| 0 0 0 1 0 1 0 0 | PDU session identity value 20 |
| 0 0 0 1 0 1 0 1 | PDU session identity value 21 |
| 0 0 0 1 0 1 1 0 | PDU session identity value 22 |
| 0 0 0 1 0 1 1 1 | PDU session identity value 23 |
| 0 0 0 1 1 0 0 0 | PDU session identity value 24 |
| 0 0 0 1 1 0 0 1 | PDU session identity value 25 |
| 0 0 0 1 1 0 1 0 | PDU session identity value 26 |
| 0 0 0 1 1 0 1 1 | PDU session identity value 27 |
| 0 0 0 1 1 1 0 0 | PDU session identity value 28 |
| 0 0 0 1 1 1 0 1 | PDU session identity value 29 |
| 0 0 0 1 1 1 1 0 | PDU session identity value 30 |
| 0 0 0 1 1 1 1 1 | PDU session identity value 31 |
| 0 0 1 0 0 0 0 0 | PDU session identity value 32 |
| 0 0 1 0 0 0 0 1 | PDU session identity value 33 |
| 0 0 1 0 0 0 1 0 | PDU session identity value 34 |
| 0 0 1 0 0 0 1 1 | PDU session identity value 35 |
| 0 0 1 0 0 1 0 0 | PDU session identity value 36 |
| All other values are reserved. | |

FIG.6C

| PDU session identity value (octet 1, bit 1 to bit 8) | |
|---|---|
| Bits | |
| 8 7 6 5 4 3 2 1 | |
| 0 0 0 0 0 0 0 0 | No PDU session identity assigned |
| 0 0 0 0 0 0 0 1 | reserved |
| 0 0 0 0 0 0 1 0 | reserved |
| 0 0 0 0 0 0 1 1 | reserved |
| 0 0 0 0 0 1 0 0 | reserved |
| 0 0 0 0 0 1 0 1 | PDU session identity value 5 |
| 0 0 0 0 0 1 1 0 | PDU session identity value 6 |
| 0 0 0 0 0 1 1 1 | PDU session identity value 7 |
| 0 0 0 0 1 0 0 0 | PDU session identity value 8 |
| 0 0 0 0 1 0 0 1 | PDU session identity value 9 |
| 0 0 0 0 1 0 1 0 | PDU session identity value 10 |
| 0 0 0 0 1 0 1 1 | PDU session identity value 11 |
| 0 0 0 0 1 1 0 0 | PDU session identity value 12 |
| 0 0 0 0 1 1 0 1 | PDU session identity value 13 |
| 0 0 0 0 1 1 1 0 | PDU session identity value 14 |
| 0 0 0 0 1 1 1 1 | PDU session identity value 15 |
| 0 0 0 1 0 0 0 0 | PDU session identity value 16 |
| 0 0 0 1 0 0 0 1 | PDU session identity value 17 |
| 0 0 0 1 0 0 1 0 | PDU session identity value 18 |
| 0 0 0 1 0 0 1 1 | PDU session identity value 19 |

All other values are reserved.

FIG.6D

```
PDU session identity value (octet 1, bit 1 to bit 8)
Bits
8 7 6 5 4 3 2 1
0 0 0 0 0 0 0 0   No PDU session identity assigned
0 0 0 0 0 0 0 1   PDU session identity value 1
0 0 0 0 0 0 1 0   PDU session identity value 2
0 0 0 0 0 0 1 1   PDU session identity value 3
0 0 0 0 0 1 0 0   PDU session identity value 4
0 0 0 0 0 1 0 1   PDU session identity value 5
0 0 0 0 0 1 1 0   PDU session identity value 6
0 0 0 0 0 1 1 1   PDU session identity value 7
0 0 0 0 1 0 0 0   PDU session identity value 8
0 0 0 0 1 0 0 1   PDU session identity value 9
0 0 0 0 1 0 1 0   PDU session identity value 10
0 0 0 0 1 0 1 1   PDU session identity value 11
0 0 0 0 1 1 0 0   PDU session identity value 12
0 0 0 0 1 1 0 1   PDU session identity value 13
0 0 0 0 1 1 1 0   PDU session identity value 14
0 0 0 0 1 1 1 1   PDU session identity value 15

All other values are reserved.
```

FIG.6E

```
PDU session identity value (octet 1, bit 1 to bit 8)
Bits
8 7 6 5 4 3 2 1
0 0 0 0 0 0 0 0   No PDU session identity assigned
0 0 0 0 0 0 0 1   PDU session identity value 1
0 0 0 0 0 0 1 0   PDU session identity value 2
0 0 0 0 0 0 1 1   PDU session identity value 3
0 0 0 0 0 1 0 0   PDU session identity value 4
0 0 0 0 0 1 0 1   PDU session identity value 5
0 0 0 0 0 1 1 0   PDU session identity value 6
0 0 0 0 0 1 1 1   PDU session identity value 7
0 0 0 0 1 0 0 0   PDU session identity value 8
0 0 0 0 1 0 0 1   PDU session identity value 9
0 0 0 0 1 0 1 0   PDU session identity value 10
0 0 0 0 1 0 1 1   PDU session identity value 11
0 0 0 0 1 1 0 0   PDU session identity value 12
0 0 0 0 1 1 0 1   PDU session identity value 13
0 0 0 0 1 1 1 0   PDU session identity value 14
0 0 0 0 1 1 1 1   PDU session identity value 15
0 0 0 1 0 0 0 0   PDU session identity value 16
0 0 0 1 0 0 0 1   PDU session identity value 17
0 0 0 1 0 0 1 0   PDU session identity value 18
0 0 0 1 0 0 1 1   PDU session identity value 19
0 0 0 1 0 1 0 0   PDU session identity value 20
0 0 0 1 0 1 0 1   PDU session identity value 21
0 0 0 1 0 1 1 0   PDU session identity value 22
0 0 0 1 0 1 1 1   PDU session identity value 23
0 0 0 1 1 0 0 0   PDU session identity value 24
0 0 0 1 1 0 0 1   PDU session identity value 25
0 0 0 1 1 0 1 0   PDU session identity value 26
0 0 0 1 1 0 1 1   PDU session identity value 27
0 0 0 1 1 1 0 0   PDU session identity value 28
0 0 0 1 1 1 0 1   PDU session identity value 29
0 0 0 1 1 1 1 0   PDU session identity value 30
0 0 0 1 1 1 1 1   PDU session identity value 31
0 0 1 0 0 0 0 0   PDU session identity value 32
0 0 1 0 0 0 0 1   No PDU session identity assigned or reserved
0 0 1 0 0 0 1 0   No PDU session identity assigned or reserved
0 0 1 0 0 0 1 1   No PDU session identity assigned or reserved
0 0 1 0 0 1 0 0   No PDU session identity assigned or reserved
```

FIG.7

| 8 | 7 | 6 | 5 | 4 | 3 | 2 | 1 | |
|---|---|---|---|---|---|---|---|---|
| Extended protocol discriminator ||||||||  octet 1 |
| | | | | Security header type or PDU session identity ||||  octet 2 |
| Procedure transaction identity |||||||| octet 3 |
| Message type |||||||| octet 4 |
| Other information elements as required |||||||| octet 5<br>octet n |

FIG.10

| 8 | 7 | 6 | 5 | 4 | 3 | 2 | 1 | |
|---|---|---|---|---|---|---|---|---|
| PDU session status IE |||||||| octet 1 |
| Length of PDU session status contents |||||||| octet 2 |
| PSI(7) | PSI(6) | PSI(5) | PSI(4) | PSI(3) | PSI(2) | PSI(1) | PSI(0) | octet 3 |
| PSI(15) | PSI(14) | PSI(13) | PSI(12) | PSI(11) | PSI(10) | PSI(9) | PSI(8) | octet 4 |

FIG.11

PSI(x) shall be coded as follows:

PSI(0):
Bits 0 of octet 3 is spare and shall be coded as zero.

PSI(1) - PSI(15):
0    indicates that the 5GSM state of the corresponding PDU session is PDU SESSION INACTIVE.
1    indicates that the 5GSM state of the corresponding PDU session is not PDU SESSION INACTIVE.

FIG.12

| 8 | 7 | 6 | 5 | 4 | 3 | 2 | 1 | |
|---|---|---|---|---|---|---|---|---|
| PDU session status IE ||||||||  octet 1 |
| Length of PDU session status contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| PSI (31) | PSI (30) | PSI (29) | PSI (28) | PSI (27) | PSI (26) | PSI (25) | PSI (24) | octet 6 |

FIG.13A

| 8 | 7 | 6 | 5 | 4 | 3 | 2 | 1 | |
|---|---|---|---|---|---|---|---|---|
| PDU session status IE |||||||| octet 1 |
| Length of PDU session status contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| 0 | 0 | 0 | 0 | 0 | 0 | 0 | 0 | octet 6 |
| Spare ||||||||  |

FIG.13B

PSI(x) shall be coded as follows :

PSI(0)-PSI(4) :
Bits 1 to 5 of octet 3 is spare and shall be coded as zero.

PSI(5) - PSI(20) :
0    indicates that the 5GSM state of the corresponding PDU session is PDU SESSION INACTIVE.
1    indicates that the 5GSM state of the corresponding PDU session is not PDU SESSION INACTIVE Bit 6 to 8 of octet 5 are spare and shall be coded as zero.

All bits in octet 6 to 34 are spare and shall be coded as zero, if the respective octet in included in the information element.

FIG.13C

PSI(x) shall be coded as follows :

PSI(0)-PSI(4) :
Bits 1 to 5 of octet 3 is spare and shall be coded as zero.

PSI(5) - PSI(23) :
0    indicates that the 5GSM state of the corresponding PDU session is PDU SESSION INACTIVE.
1    indicates that the 5GSM state of the corresponding PDU session is not PDU SESSION INACTIVE All bits in octet 6 to 34 are spare and shall be coded as zero, if the respective octet in included in the information element.

FIG.13D

|   | 8 | 7 | 6 | 5 | 4 | 3 | 2 | 1 |   |
|---|---|---|---|---|---|---|---|---|---|
|   | PDU session status IE | | | | | | | | octet 1 |
|   | Length of PDU session status contents | | | | | | | | octet 2 |
|   | PSI (7) | PSI (6) | PSI (5) | PSI (4) | PSI (3) | PSI (2) | PSI (1) | PSI (0) | octet 3 |
|   | PSI (15) | PSI (14) | PSI (13) | PSI (12) | PSI (11) | PSI (10) | PSI (9) | PSI (8) | octet 4 |
|   | PSI (23) | PSI (22) | PSI (21) | PSI (20) | PSI (19) | PSI (18) | PSI (17) | PSI (16) | octet 5 |
|   | PSI (31) | PSI (30) | PSI (29) | PSI (28) | PSI (27) | PSI (26) | PSI (25) | PSI (24) | octet 6 |
|   | PSI (39) | PSI (38) | PSI (37) | PSI (36) | PSI (35) | PSI (34) | PSI (33) | PSI (32) | octet 7 |
|   | 0 | 0 | 0 | 0 | 0 | 0 | 0 | 0 | octet 8 |
|   | Spare | | | | | | | | |

FIG.13E

PSI(x) shall be coded as follows :

PSI(0)-PSI(4) :
Bits 1 to 5 of octet 3 is spare and shall be coded as zero.

PSI(5) - PSI(36) :
0 indicates that the 5GSM state of the corresponding PDU session is PDU SESSION INACTIVE.
1 indicates that the 5GSM state of the corresponding PDU session is not PDU SESSION INACTIVE Bit 6 to 8 of octet 7 are spare and shall be coded as zero.

All bits in octet 8 to 34 are spare and shall be coded as zero, if the respective octet in included in the information element.

FIG.13F

PSI(x) shall be coded as follows :

PSI(0)-PSI(4) :
Bits 1 to 5 of octet 3 is spare and shall be coded as zero.

PSI(5) - PSI(39) :
0    indicates that the 5GSM state of the corresponding PDU session is PDU SESSION INACTIVE.
1    indicates that the 5GSM state of the corresponding PDU session is not PDU SESSION INACTIVE All bits in octet 8 to 34 are spare and shall be coded as zero, if the respective octet in included in the information element.

FIG.13G

PSI(x) shall be coded as follows :

PSI(0)-PSI(4) :
Bits 1 to 5 of octet 3 is spare and shall be coded as zero.

PSI(5) - PSI(19) :
0    indicates that the 5GSM state of the corresponding PDU session is PDU SESSION INACTIVE.
1    indicates that the 5GSM state of the corresponding PDU session is not PDU SESSION INACTIVE Bit 5 to 8 of octet 5 are spare and shall be coded as zero.

All bits in octet 6 to 34 are spare and shall be coded as zero, if the respective octet in included in the information element.

FIG.13H

| 8 | 7 | 6 | 5 | 4 | 3 | 2 | 1 | |
|---|---|---|---|---|---|---|---|---|
| PDU session status IE ||||||||octet 1|
| Length of PDU session status contents ||||||||octet 2|
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5 |
| Spare ||||||||  |

FIG.13I

PSI(x) shall be coded as follows :

PSI(0) :
Bits 1 of octet 3 is spare and shall be coded as zero.

PSI(1) - PSI(15) :
0    indicates that the 5GSM state of the corresponding PDU session is PDU SESSION INACTIVE.
1    indicates that the 5GSM state of the corresponding PDU session is not PDU SESSION INACTIVE All bits in octet 5 to 34 are spare and shall be coded as zero, if the respective octet in included in the information element.

FIG.13J

```
PSI(x) shall be coded as follows:

PSI(0):
Bits 0 of octet 3 is spare and shall be coded as zero.

PSI(1) - PSI(31):
0       indicates that the 5GSM state of the corresponding PDU session is PDU SESSION INACTIVE.
1       indicates that the 5GSM state of the corresponding PDU session is not PDU SESSION INACTIVE.
```

FIG.14

```
PSI(x) shall be coded as follows:

PSI(0)-PSI(4) :
Bits 0 to 4 of octet 3 is spare and shall be coded as zero.

PSI(5) - PSI(31):
0       indicates that the 5GSM state of the corresponding PDU session is PDU SESSION INACTIVE.
1       indicates that the 5GSM state of the corresponding PDU session is not PDU SESSION INACTIVE.
```

FIG.15

| 8 | 7 | 6 | 5 | 4 | 3 | 2 | 1 | |
|---|---|---|---|---|---|---|---|---|
| PDU session reactivation IE ||||||||octet 1 |
| Length of PDU session reactivation contents ||||||||octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |

FIG.16

```
PSI(x) shall be coded as follows:

PSI(0):
Bits 0 of octet 3 is spare and shall be coded as zero.

PSI(1) - PSI(15):
0     indicates that the 5GSM state of the corresponding PDU session is PDU SESSION INACTIVE.
1     indicates that the 5GSM state of the corresponding PDU session is not PDU SESSION INACTIVE.
```

FIG.17

| 8 | 7 | 6 | 5 | 4 | 3 | 2 | 1 | |
|---|---|---|---|---|---|---|---|---|
| PDU session reactivation IE ||||||||  octet 1 |
| Length of PDU session reactivation contents ||||||||  octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| PSI (31) | PSI (30) | PSI (29) | PSI (28) | PSI (27) | PSI (26) | PSI (25) | PSI (24) | octet 6 |

FIG.18A

| 8 | 7 | 6 | 5 | 4 | 3 | 2 | 1 | |
|---|---|---|---|---|---|---|---|---|
| PDU session reactivation IE ||||||||  octet 1 |
| Length of PDU session reactivation contents ||||||||  octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| 0 | 0 | 0 | 0 | 0 | 0 | 0 | 0 | octet 6 |
| Spare ||||||||  |

FIG.18B

PSI(x) shall be coded as follows :

PSI(0)-PSI(4) :
Bits 1 to 5 of octet 3 is spare and shall be coded as zero.

PSI(5) - PSI(20) :
0    indicates that user plane resource of corresponding PDU session cannot be reactivated over 3GPP access.
1    indicates that user plane resource of corresponding PDU session can be reactivated over 3GPP access Bit 6 to 8 of octet 5 are spare and shall be coded as zero.

All bits in octet 6 to 34 are spare and shall be coded as zero, if the respective octet in included in the information element.

FIG.18C

PSI(x) shall be coded as follows :

PSI(0)-PSI(4) :
Bits 1 to 5 of octet 3 is spare and shall be coded as zero.

PSI(5) - PSI(23) :
0    indicates that user plane resource of corresponding PDU session cannot be reactivated over 3GPP access.
1    indicates that that user plane resource of corresponding PDU session can be reactivated over 3GPP access All bits in octet 6 to 34 are spare and shall be coded as zero, if the respective octet in included in the information element.

FIG.18D

| | 8 | 7 | 6 | 5 | 4 | 3 | 2 | 1 | |
|---|---|---|---|---|---|---|---|---|---|
| | \multicolumn{8}{c|}{PDU session reactivation IE} | octet 1 |
| | \multicolumn{8}{c|}{Length of PDU session reactivation contents} | octet 2 |
| | PSI(7) | PSI(6) | PSI(5) | PSI(4) | PSI(3) | PSI(2) | PSI(1) | PSI(0) | octet 3 |
| | PSI(15) | PSI(14) | PSI(13) | PSI(12) | PSI(11) | PSI(10) | PSI(9) | PSI(8) | octet 4 |
| | PSI(23) | PSI(22) | PSI(21) | PSI(20) | PSI(19) | PSI(18) | PSI(17) | PSI(16) | octet 5 |
| | PSI(31) | PSI(30) | PSI(29) | PSI(28) | PSI(27) | PSI(26) | PSI(25) | PSI(24) | octet 6 |
| | PSI(39) | PSI(38) | PSI(37) | PSI(36) | PSI(35) | PSI(34) | PSI(33) | PSI(32) | octet 7 |
| | 0 | 0 | 0 | 0 | 0 | 0 | 0 | 0 | octet 8 |
| | \multicolumn{8}{c|}{Spare} | |

FIG.18E

PSI(x) shall be coded as follows :

PSI(0)-PSI(4) :
Bits 1 to 5 of octet 3 is spare and shall be coded as zero.

PSI(5) - PSI(36) :
0    indicates that user plane resource of corresponding PDU session cannot to be reactivated over 3GPP access.
1    indicates that user plane resource of corresponding PDU session can be reactivated over 3GPP access Bit 6 to 8 of octet 7 are spare and shall be coded as zero.

All bits in octet 8 to 34 are spare and shall be coded as zero, if the respective octet in included in the information element.

FIG.18F

PSI(x) shall be coded as follows :

PSI(0)-PSI(4) :
Bits 1 to 5 of octet 3 is spare and shall be coded as zero.

PSI(5) - PSI(39) :
0    indicates that user plane resource of corresponding PDU session cannot to be reactivated over 3GPP access.
1    indicates that that user plane resource of corresponding PDU session can be reactivated over 3GPP access All bits in octet 8 to 34 are spare and shall be coded as zero, if the respective octet in included in the information element.

FIG.18G

PSI(x) shall be coded as follows :

PSI(0)-PSI(4) :
Bits 1 to 5 of octet 3 is spare and shall be coded as zero.

PSI(5) - PSI(19) :
0    indicates that user plane resource of corresponding PDU session cannot to be reactivated over 3GPP access.
1    indicates that user plane resource of corresponding PDU session can be reactivated over 3GPP access Bit 5 to 8 of octet 5 are spare and shall be coded as zero.

All bits in octet 6 to 34 are spare and shall be coded as zero, if the respective octet in included in the information element.

FIG.18H

| 8 | 7 | 6 | 5 | 4 | 3 | 2 | 1 | |
|---|---|---|---|---|---|---|---|---|
| PDU session reactivation IE ||||||||  octet 1 |
| Length of PDU session reactivation contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5 |
| Spare ||||||||  |

FIG.18I

PSI(x) shall be coded as follows :

PSI(0) :
Bits 1 of octet 3 is spare and shall be coded as zero.

PSI(1) - PSI(15) :
0     indicates that user plane resource of corresponding PDU session cannot to be reactivated over 3GPP access.
1     indicates that user plane resource of corresponding PDU session can be reactivated over 3GPP access All bits in octet 5 to 34 are spare and shall be coded as zero, if the respective octet in included in the information element.

FIG.18J

PSI(x) shall be coded as follows:

PSI(0):
Bits 0 of octet 3 is spare and shall be coded as zero.

PSI(1) - PSI(31):
0      indicates that the 5GSM state of the corresponding PDU session is PDU SESSION INACTIVE.
1      indicates that the 5GSM state of the corresponding PDU session is not PDU SESSION INACTIVE.

FIG.19

PSI(x) shall be coded as follows:

PSI(0)-PSI(4):
Bits 0 to 4 of octet 3 is spare and shall be coded as zero.

PSI(5) - PSI(31):
0      indicates that the 5GSM state of the corresponding PDU session is PDU SESSION INACTIVE.
1      indicates that the 5GSM state of the corresponding PDU session is not PDU SESSION INACTIVE.

FIG.20

|   8   |   7   |   6   |   5   |   4   |   3   |   2   |   1   |         |
|-------|-------|-------|-------|-------|-------|-------|-------|---------|
| PDU session reactivation result IE ||||||||  octet 1 |
| Length of PDU session reactivation result contents ||||||||  octet 2 |
| PSI(7) | PSI(6) | PSI(5) | PSI(4) | PSI(3) | PSI(2) | PSI(1) | PSI(0) | octet 3 |
| PSI(15) | PSI(14) | PSI(13) | PSI(12) | PSI(11) | PSI(10) | PSI(9) | PSI(8) | octet 4 |

FIG.21

PSI(x) shall be coded as follows:

PSI(0):
Bits 0 of octet 3 is spare and shall be coded as zero.

PSI(1) - PSI(15):
0    indicates that the 5GSM state of the corresponding PDU session is PDU SESSION INACTIVE.
1    indicates that the 5GSM state of the corresponding PDU session is not PDU SESSION INACTIVE.

FIG.22

| 8 | 7 | 6 | 5 | 4 | 3 | 2 | 1 | |
|---|---|---|---|---|---|---|---|---|
| colspan=8 | PDU session reactivation result IE | | | | | | | octet 1 |
| colspan=8 | Length of PDU session reactivation result contents | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| PSI (31) | PSI (30) | PSI (29) | PSI (28) | PSI (27) | PSI (26) | PSI (25) | PSI (24) | octet 6 |

FIG.23A

| 8 | 7 | 6 | 5 | 4 | 3 | 2 | 1 | |
|---|---|---|---|---|---|---|---|---|
| colspan=8 | PDU session reactivation result IE | | | | | | | octet 1 |
| colspan=8 | Length of PDU session reactivation result contents | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| 0 | 0 | 0 | 0 | 0 | 0 | 0 | 0 | octet 6 |
| | Spare | | | | | | | |

FIG.23B

PSI(x) shall be coded as follows :

PSI(0)-PSI(4) :
Bits 1 to 5 of octet 3 is spare and shall be coded as zero.

PSI(5) - PSI(20) :
0    indicates that user plane resource reactivation was not requested or user plane resource reactivation is successful.
1    indicates that PDU session reactivation was requested but user plane resource reactivation is not successful.

Bit 6 to 8 of octet 5 are spare and shall be coded as zero.

All bits in octet 6 to 34 are spare and shall be coded as zero, if the respective octet in included in the information element.

FIG.23C

PSI(x) shall be coded as follows :

PSI(0)-PSI(4) :
Bits 1 to 5 of octet 3 is spare and shall be coded as zero.

PSI(5) - PSI(23) :
0    indicates that user plane resource reactivation was not requested or user plane resource reactivation is successful.
1    indicates that PDU session reactivation was requested but user plane resource reactivation is not successful.

All bits in octet 6 to 34 are spare and shall be coded as zero, if the respective octet in included in the information element.

FIG.23D

| 8 | 7 | 6 | 5 | 4 | 3 | 2 | 1 | |
|---|---|---|---|---|---|---|---|---|
| \multicolumn{8}{|c|}{PDU session reactivation result IE} | octet 1 |
| \multicolumn{8}{|c|}{Length of PDU session reactivation result contents} | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| PSI (31) | PSI (30) | PSI (29) | PSI (28) | PSI (27) | PSI (26) | PSI (25) | PSI (24) | octet 6 |
| PSI (39) | PSI (38) | PSI (37) | PSI (36) | PSI (35) | PSI (34) | PSI (33) | PSI (32) | octet 7 |
| 0 | 0 | 0 | 0 | 0 | 0 | 0 | 0 | octet 8 |
| \multicolumn{8}{|c|}{Spare} | |

FIG.23E

PSI(x) shall be coded as follows :

PSI(0)-PSI(4) :
Bits 1 to 5 of octet 3 is spare and shall be coded as zero.

PSI(5) - PSI(36) :
0    indicates that user plane resource reactivation was not requested or user plane resource reactivation is successful.
1    indicates that PDU session reactivation was requested but user plane resource reactivation is not successful.

Bit 6 to 8 of octet 7 are spare and shall be coded as zero.

All bits in octet 8 to 34 are spare and shall be coded as zero, if the respective octet in included in the information element.

FIG.23F

PSI(x) shall be coded as follows :

PSI(0)-PSI(4) :
Bits 1 to 5 of octet 3 is spare and shall be coded as zero.

PSI(5) - PSI(39) :
0    indicates that user plane resource reactivation was not requested or user plane resource reactivation is successful.
1    indicates that PDU session reactivation was requested but user plane resource reactivation is not successful.

All bits in octet 8 to 34 are spare and shall be coded as zero, if the respective octet in included in the information element.

FIG.23G

PSI(x) shall be coded as follows :

PSI(0)-PSI(4) :
Bits 1 to 5 of octet 3 is spare and shall be coded as zero.

PSI(5) - PSI(19) :
0    indicates that user plane resource reactivation was not requested or user plane resource reactivation is successful.
1    indicates that PDU session reactivation was requested but user plane resource reactivation is not successful.

Bit 5 to 8 of octet 5 are spare and shall be coded as zero.

All bits in octet 6 to 34 are spare and shall be coded as zero, if the respective octet in included in the information element.

FIG.23H

| 8 | 7 | 6 | 5 | 4 | 3 | 2 | 1 | |
|---|---|---|---|---|---|---|---|---|
| PDU session reactivation result IE ||||||||octet 1|
| Length of PDU session reactivation result ||||||||octet 2|
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| 0 | 0 | 0 | 0 | 0 | 0 | 0 | 0 | octet 5 |
| Spare ||||||||  |

FIG.23I

PSI(x) shall be coded as follows :

PSI(0) :
Bits 1 of octet 3 is spare and shall be coded as zero.

PSI(1) - PSI(15) :
0    indicates that user plane resource reactivation was not requested or user plane resource reactivation is successful.
1    indicates that PDU session reactivation was requested but user plane resource reactivation is not successful.

All bits in octet 5 to 34 are spare and shall be coded as zero, if the respective octet in included in the information element.

FIG.23J

PSI(x) shall be coded as follows:

PSI(0):
Bits 0 of octet 3 is spare and shall be coded as zero.

PSI(1) - PSI(31):
0      indicates that the 5GSM state of the corresponding PDU session is PDU SESSION INACTIVE.
1      indicates that the 5GSM state of the corresponding PDU session is not PDU SESSION INACTIVE.

FIG.24

PSI(x) shall be coded as follows:

PSI(0)-PSI(4) :
Bits 0 to 4 of octet 3 is spare and shall be coded as zero.

PSI(5) - PSI(31):
0      indicates that the 5GSM state of the corresponding PDU session is PDU SESSION INACTIVE.
1      indicates that the 5GSM state of the corresponding PDU session is not PDU SESSION INACTIVE.

FIG.25

| 8 | 7 | 6 | 5 | 4 | 3 | 2 | 1 | |
|---|---|---|---|---|---|---|---|---|
| Uplink data status IE | | | | | | | | octet 1 |
| Length of uplink data status contents | | | | | | | | octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |

FIG.26

PSI(x) shall be coded as follows:

PSI(0) :
Bits 0 of octet 3 is spare and shall be coded as zero.

PSI(1) - PSI(15):
0    indicates that the 5GSM state of the corresponding PDU session is PDU SESSION INACTIVE.
1    indicates that the 5GSM state of the corresponding PDU session is not PDU SESSION INACTIVE.

FIG.27

| 8 | 7 | 6 | 5 | 4 | 3 | 2 | 1 | |
|---|---|---|---|---|---|---|---|---|
| Uplink data status IE ||||||||  octet 1 |
| Length of Uplink data status contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| PSI (31) | PSI (30) | PSI (29) | PSI (28) | PSI (27) | PSI (26) | PSI (25) | PSI (24) | octet 6 |

FIG.28A

| 8 | 7 | 6 | 5 | 4 | 3 | 2 | 1 | |
|---|---|---|---|---|---|---|---|---|
| Uplink data status IE |||||||| octet 1 |
| Length of Uplink data status contents |||||||| octet 2 |
| PSI (7) | PSI (6) | PSI (5) | PSI (4) | PSI (3) | PSI (2) | PSI (1) | PSI (0) | octet 3 |
| PSI (15) | PSI (14) | PSI (13) | PSI (12) | PSI (11) | PSI (10) | PSI (9) | PSI (8) | octet 4 |
| PSI (23) | PSI (22) | PSI (21) | PSI (20) | PSI (19) | PSI (18) | PSI (17) | PSI (16) | octet 5 |
| 0 | 0 | 0 | 0 | 0 | 0 | 0 | 0 | octet 6 |
| Spare ||||||||  |

FIG.28B

PSI(x) shall be coded as follows :

PSI(0)-PSI(4) :
Bits 1 to 5 of octet 3 is spare and shall be coded as zero.

PSI(5) - PSI(20) :
0    indicates that no uplink data are pending for the corresponding PDU session Identity.
1    indicates that uplink data are pending.

Bit 6 to 8 of octet 5 are spare and shall be coded as zero.

All bits in octet 6 to 34 are spare and shall be coded as zero, if the respective octet in included in the information element.

FIG.28C

PSI(x) shall be coded as follows :

PSI(0)-PSI(4) :
Bits 1 to 5 of octet 3 is spare and shall be coded as zero.

PSI(5) - PSI(23) :
0    indicates that no uplink data are pending for the corresponding PDU session Identity.
1    indicates that uplink data are pending.

All bits in octet 6 to 34 are spare and shall be coded as zero, if the respective octet in included in the information element.

FIG.28D

| 8 | 7 | 6 | 5 | 4 | 3 | 2 | 1 | |
|---|---|---|---|---|---|---|---|---|
| Uplink data status IE ||||||||octet 1|
| Length of Uplink data status contents ||||||||octet 2|
| PSI(7) | PSI(6) | PSI(5) | PSI(4) | PSI(3) | PSI(2) | PSI(1) | PSI(0) | octet 3 |
| PSI(15) | PSI(14) | PSI(13) | PSI(12) | PSI(11) | PSI(10) | PSI(9) | PSI(8) | octet 4 |
| PSI(23) | PSI(22) | PSI(21) | PSI(20) | PSI(19) | PSI(18) | PSI(17) | PSI(16) | octet 5 |
| PSI(31) | PSI(30) | PSI(29) | PSI(28) | PSI(27) | PSI(26) | PSI(25) | PSI(24) | octet 6 |
| PSI(39) | PSI(38) | PSI(37) | PSI(36) | PSI(35) | PSI(34) | PSI(33) | PSI(32) | octet 7 |
| 0 | 0 | 0 | 0 | 0 | 0 | 0 | 0 | octet 8 |
| Spare |||||||||

FIG.28E

PSI(x) shall be coded as follows :

PSI(0)-PSI(4) :
Bits 1 to 5 of octet 3 is spare and shall be coded as zero.

PSI(5) - PSI(36) :
0    indicates that no uplink data are pending for the corresponding PDU session Identity.
1    indicates that uplink data are pending.

Bit 6 to 8 of octet 7 are spare and shall be coded as zero.

All bits in octet 8 to 34 are spare and shall be coded as zero, if the respective octet in included in the information element.

FIG.28F

PSI(x) shall be coded as follows :

PSI(0)-PSI(4) :
Bits 1 to 5 of octet 3 is spare and shall be coded as zero.

PSI(5) - PSI(39) :
0    indicates that no uplink data are pending for the corresponding PDU session Identity.
1    indicates that uplink data are pending.

All bits in octet 8 to 34 are spare and shall be coded as zero, if the respective octet in included in the information element.

FIG.28G

PSI(x) shall be coded as follows :

PSI(0)-PSI(4) :
Bits 1 to 5 of octet 3 is spare and shall be coded as zero.

PSI(5) - PSI(19) :
0    indicates that no uplink data are pending for the corresponding PDU session Identity.
1    indicates that uplink data are pending.

Bit 5 to 8 of octet 5 are spare and shall be coded as zero.

All bits in octet 6 to 34 are spare and shall be coded as zero, if the respective octet in included in the information element.

FIG.28H

|   8   |   7   |   6   |   5   |   4   |   3   |   2   |   1   |         |
|-------|-------|-------|-------|-------|-------|-------|-------|---------|
| Uplink data status IE ||||||||  octet 1 |
| Length of Uplink data status contents ||||||||  octet 2 |
| PSI(7) | PSI(6) | PSI(5) | PSI(4) | PSI(3) | PSI(2) | PSI(1) | PSI(0) | octet 3 |
| PSI(15) | PSI(14) | PSI(13) | PSI(12) | PSI(11) | PSI(10) | PSI(9) | PSI(8) | octet 4 |
| 0 | 0 | 0 | 0 | 0 | 0 | 0 | 0 | octet 5 |
| Spare ||||||||  |

FIG.28I

PSI(x) shall be coded as follows :

PSI(0) :
Bits 1 of octet 3 is spare and shall be coded as zero.

PSI(1) - PSI(15) :
0    indicates that no uplink data are pending for the corresponding PDU session Identity.
1    indicates that uplink data are pending.

All bits in octet 5 to 34 are spare and shall be coded as zero, if the respective octet in included in the information element.

FIG.28J

```
PSI(x) shall be coded as follows:

PSI(0):
Bits 0 of octet 3 is spare and shall be coded as zero.

PSI(1) - PSI(31):
0      indicates that the 5GSM state of the corresponding PDU session is PDU SESSION INACTIVE.
1      indicates that the 5GSM state of the corresponding PDU session is not PDU SESSION INACTIVE.
```

FIG.29

```
PSI(x) shall be coded as follows:

PSI(0)-PSI(4) :
Bits 0 to 4 of octet 3 is spare and shall be coded as zero.

PSI(5) - PSI(31):
0      indicates that the 5GSM state of the corresponding PDU session is PDU SESSION INACTIVE.
1      indicates that the 5GSM state of the corresponding PDU session is not PDU SESSION INACTIVE.
```

FIG.30

| 8 | 7 | 6 | 5 | 4 | 3 | 2 | 1 | |
|---|---|---|---|---|---|---|---|---|
| EPS bearer identity value | | | | - | - | - | - | octet 1 |

| EPS bearer identity value (octet 1) | |
|---|---|
| Bits | |
| 8 7 6 5 | |
| 0 0 0 0 | No EPS bearer identity assigned |
| 0 0 0 1 | EPS bearer identity value 1 |
| 0 0 1 0 | EPS bearer identity value 2 |
| 0 0 1 1 | EPS bearer identity value 3 |
| 0 1 0 0 | EPS bearer identity value 4 |
| 0 1 0 1 | EPS bearer identity value 5 |
| 0 1 1 0 | EPS bearer identity value 6 |
| 0 1 1 1 | EPS bearer identity value 7 |
| 1 0 0 0 | EPS bearer identity value 8 |
| 1 0 0 1 | EPS bearer identity value 9 |
| 1 0 1 0 | EPS bearer identity value 10 |
| 1 0 1 1 | EPS bearer identity value 11 |
| 1 1 0 0 | EPS bearer identity value 12 |
| 1 1 0 1 | EPS bearer identity value 13 |
| 1 1 1 0 | EPS bearer identity value 14 |
| 1 1 1 1 | EPS bearer identity value 15 |

FIG.36A

| EPS bearer identity value (octet 1) | |
|---|---|
| Bits | |
| 8 7 6 5 | |
| 0 0 0 0 | No EPS bearer identity assigned |
| 0 0 0 1 | Reserved |
| 0 0 1 0 | Reserved |
| 0 0 1 1 | Reserved |
| 0 1 0 0 | Reserved |
| 0 1 0 1 | EPS bearer identity value 5 |
| 0 1 1 0 | EPS bearer identity value 6 |
| 0 1 1 1 | EPS bearer identity value 7 |
| 1 0 0 0 | EPS bearer identity value 8 |
| 1 0 0 1 | EPS bearer identity value 9 |
| 1 0 1 0 | EPS bearer identity value 10 |
| 1 0 1 1 | EPS bearer identity value 11 |
| 1 1 0 0 | EPS bearer identity value 12 |
| 1 1 0 1 | EPS bearer identity value 13 |
| 1 1 1 0 | EPS bearer identity value 14 |
| 1 1 1 1 | EPS bearer identity value 15 |

FIG.36B

| 8 | 7 | 6 | 5 | 4 | 3 | 2 | 1 | |
|---|---|---|---|---|---|---|---|---|
| EPS bearer context status IE ||||||||  octet 1 |
| Length of EPS bearer context status contents |||||||| octet 2 |
| EBI (7) | EBI (6) | EBI (5) | EBI (4) | EBI (3) | EBI (2) | EBI (1) | EBI (0) | octet 3 |
| EBI (15) | EBI (14) | EBI (13) | EBI (12) | EBI (11) | EBI (10) | EBI (9) | EBI (8) | octet 4 |

FIG.37A

```
EBI(x) shall be coded as follows:

EBI(0) - EBI(4)
Bits 0 to 5 of octet 3 are spare and shall be coded as zero.

EBI(5) - EBI(15):
0      indicates that the ESM state of the corresponding EPS bearer context is BEARER CONTEXT-INACTIVE.
1      indicates that the ESM state of the corresponding EPS bearer context is not BEARER CONTEXT-INACTIVE
```

FIG.37B

| 8 | 7 | 6 | 5 | 4 | 3 | 2 | 1 | |
|---|---|---|---|---|---|---|---|---|
| Extended EPS bearer context status IE ||||||||  octet 1 |
| Length of extended EPS bearer context status contents |||||||| octet 2 |
| EBI (23) | EBI (22) | EBI (21) | EBI (20) | EBI (19) | EBI (18) | EBI (17) | EBI (16) | octet 3 |

FIG.37C

EBI(x) shall be coded as follows:

EBI(16)
Bit 1 octet 3 is spare and shall be coded as zero.

EBI(17) - EBI(23):
0    indicates that the ESM state of the corresponding EPS bearer context is BEARER CONTEXT-INACTIVE.
1    indicates that the ESM state of the corresponding EPS bearer context is not BEARER CONTEXT-INACTIVE

FIG.37D

EBI(x) shall be coded as follows:

EBI(0) :
Bit 0 octet 3 is spare and shall be coded as zero.

PSI(1) - PSI(15):
0    indicates that the ESM state of the corresponding EPS bearer context is BEARER CONTEXT-INACTIVE.
1    indicates that the ESM state of the corresponding EPS bearer context is not BEARER CONTEXT-INACTIVE

FIG.38

|   | 8 | 7 | 6 | 5 | 4 | 3 | 2 | 1 |   |
|---|---|---|---|---|---|---|---|---|---|
| UE network capability IE ||||||||| octet 1 |
| Length of EPS bearer context status contents ||||||||| octet 2 |
| | EEA0 | 128-EEA1 | 128-EEA2 | 128-EEA3 | EEA4 | EEA5 | EEA6 | EEA7 | octet 3 |
| | EIA0 | 128-EIA1 | 128-EIA2 | 128-EIA3 | EIA4 | EIA5 | EIA6 | EIA7 | octet 4 |
| | UEA0 | UEA1 | UEA2 | UEA3 | UEA4 | UEA5 | UEA6 | UEA7 | octet 5* |
| | UCS2 | UIA1 | UIA2 | UIA3 | UIA4 | UIA5 | UIA6 | UIA7 | octet 6* |
| | ProSe-dd | ProSe | H.245-ASH | ACC-CSFB | LPP | LCS | 1xSRVCC | NF | octet 7* |
| | ePCO | HC-CP CIoT | ERw/o PDN | S1-U data | UP CIoT | CP CIoT | ProSe-relay | ProSe-dc | octet 8* |
| | 0 Spare | 0 Spare | EXT EBI | DCNR | CP backoff | RestrictEC | V2X PC5 | multipl eDRB | octet 9* |
| | 0 | 0 | 0 | 0 | 0 | 0 | 0 | 0 | octet 10 |
| Spare ||||||||| |

FIG.39

Extended EPS bearer identity (EXT EBI) (octet 9, bit 6)
This bit indicates the capability for Extended bit supported for EPS bearer identity
0     Extended bit for EPS bearer identity Not supported
1     Extended bit for EPS bearer identity supported

FIG.40

| 8 | 7 | 6 | 5 | 4 | 3 | 2 | 1 | |
|---|---|---|---|---|---|---|---|---|
| \multicolumn{8}{|c|}{NSSAI IEI} | octet 1 |
| \multicolumn{8}{|c|}{Length of NSSAI contents} | octet 2 |
| \multicolumn{8}{|c|}{Number of S-NSSAI} | octet 3 |
| \multicolumn{8}{|c|}{S-NSSAI 1} | octet 4 — octet m |
| \multicolumn{8}{|c|}{S-NSSAI 2} | octet m+1* — octet n* |
| \multicolumn{8}{|c|}{...} | octet n+1* — octet u* |
| \multicolumn{8}{|c|}{S-NSSAI n} | octet u+1* — octet v* |

FIG.57

| 8 | 7 | 6 | 5 | 4 | 3 | 2 | 1 | |
|---|---|---|---|---|---|---|---|---|
| \multicolumn{8}{|c|}{Allowed NSSAI IEI} | octet 1 |
| \multicolumn{8}{|c|}{Length of allowed NSSAI contents} | octet 2 |
| \multicolumn{8}{|c|}{Number of allowed S-NSSAI} | octet 3 |
| \multicolumn{8}{|c|}{Allowed S-NSSAI 1} | octet 4 — octet m |
| \multicolumn{8}{|c|}{Allowed S-NSSAI 2} | octet m+1* — octet n* |
| \multicolumn{8}{|c|}{...} | octet n+1* — octet u* |
| \multicolumn{8}{|c|}{Allowed S-NSSAI n} | octet u+1* — octet v* |

FIG.58

| 8 | 7 | 6 | 5 | 4 | 3 | 2 | 1 | |
|---|---|---|---|---|---|---|---|---|
| S-NSSAI IEI ||||||||octet 1 |
| TSF | S-NSSAI identifier |||||||octet 2 |
| Length of S-NSSAI contents ||||||||octet 3 |
| SST ||||||||octet 4 |
| SD ||||||||octet 5 |
| |||||||| octet 7 |

FIG.59

| 8 | 7 | 6 | 5 | 4 | 3 | 2 | 1 | |
|---|---|---|---|---|---|---|---|---|
| S-NSSAI IEI ||||||||octet 1 |
| TSF | S-NSSAI identifier |||||||octet 2 |
| Length of S-NSSAI contents ||||||||octet 3 |
| SST ||||||||octet 4 |
| SD ||||||||octet 5 |
| |||||||| octet 7 |
| Mapped subscribed SST ||||||||octet 8 |
| Mapped subscribed SD ||||||||octet 9 |
| |||||||| octet 11 |

FIG.60

| 8 | 7 | 6 | 5 | 4 | 3 | 2 | 1 | |
|---|---|---|---|---|---|---|---|---|
| \multicolumn{8}{|c|}{NSSAI IEI} | octet 1 |
| \multicolumn{8}{|c|}{Length of NSSAI contents} | octet 2 |
| \multicolumn{8}{|c|}{Number of S-NSSAI} | octet 3 |
| \multicolumn{8}{|c|}{S-NSSAI 1} | octet 4 … octet m |
| \multicolumn{8}{|c|}{S-NSSAI 2} | octet m+1* … octet n* |
| \multicolumn{8}{|c|}{…} | octet n+1* … octet u* |
| \multicolumn{8}{|c|}{S-NSSAI n} | octet u+1* … octet v* |

FIG.61

| 8 | 7 | 6 | 5 | 4 | 3 | 2 | 1 | |
|---|---|---|---|---|---|---|---|---|
| \multicolumn{8}{|c|}{Mapping allowed NSSAI IEI} | octet 1 |
| \multicolumn{8}{|c|}{Length of mapping allowed NSSAI contents} | octet 2 |
| \multicolumn{8}{|c|}{Number mapping of allowed S-NSSAI} | octet 3 |
| \multicolumn{8}{|c|}{Mapping of allowed S-NSSAI 1} | octet 4 … octet m |
| \multicolumn{8}{|c|}{Mapping of allowed S-NSSAI 2} | octet m+1* … octet n* |
| \multicolumn{8}{|c|}{…} | octet n+1* … octet u* |
| \multicolumn{8}{|c|}{Mapping of allowed S-NSSAI n} | octet u+1* … octet v* |

FIG.62

| 8 | 7 | 6 | 5 | 4 | 3 | 2 | 1 | |
|---|---|---|---|---|---|---|---|---|
| colspan="8" | S-NSSAI IEI | | | | | | | | octet 1 |
| TSF | | colspan="7" | S-NSSAI identifier | | | | | | | octet 2 |
| colspan="8" | Total Length of S-NSSAI contents | | | | | | | | octet 3 |
| colspan="8" | Total number of mapped S-NSSAI | | | | | | | | octet 4 |
| colspan="8" | Length of S-NSSAI contents | | | | | | | | octet 5 |
| colspan="8" | SST | | | | | | | | octet 6 |
| colspan="8" | SD | | | | | | | | octet 7 — octet 9 |
| TSF | | colspan="7" | S-NSSAI identifier | | | | | | | octet n |
| colspan="8" | Length of S-NSSAI contents | | | | | | | | octet n+1 |
| colspan="8" | SST | | | | | | | | octet n+2 |
| colspan="8" | SD | | | | | | | | octet n+3 — octet n+5 |
| TSF | | colspan="7" | S-NSSAI identifier | | | | | | | octet m |
| colspan="8" | Length of S-NSSAI contents | | | | | | | | octet |
| colspan="8" | SST | | | | | | | | octet |
| colspan="8" | SD | | | | | | | | octet — octet |

FIG.64

| 8 | 7 | 6 | 5 | 4 | 3 | 2 | 1 | |
|---|---|---|---|---|---|---|---|---|
| \multicolumn{8}{c}{S-NSSAI IEI} | octet 1 |

| | | | | | | | | |
|---|---|---|---|---|---|---|---|---|
| 8 | 7 | 6 | 5 | 4 | 3 | 2 | 1 | |
| S-NSSAI IEI | | | | | | | | octet 1 |
| TSF | Allowed S-NSSAI identifier | | | | | | | octet 2 |
| Total length of allowed and mapping of allowed S-NSSAI contents | | | | | | | | octet 3 |
| Total number of mapped S-NSSAI | | | | | | | | octet 4 |
| Length of allowed S-NSSAI contents | | | | | | | | octet 5 |
| SST | | | | | | | | octet 6 |
| SD | | | | | | | | octet 7 – octet 9 |
| TSF | Mapping of allowed S-NSSAI identifier | | | | | | | octet n |
| Length of S-NSSAI contents | | | | | | | | octet n+1 |
| SST | | | | | | | | octet n+2 |
| SD | | | | | | | | octet n+3 – octet n+5 |
| TSF | Mapping of allowed S-NSSAI identifier | | | | | | | octet m |
| Length of S-NSSAI contents | | | | | | | | octet |
| SST | | | | | | | | octet |
| SD | | | | | | | | octet – octet |

FIG.65

| 8 | 7 | 6 | 5 | 4 | 3 | 2 | 1 | |
|---|---|---|---|---|---|---|---|---|
| S-NSSAI IEI ||||||||  octet 1 |
| TSF | S-NSSAI identifier ||||||| octet 2 |
| Total length of S-NSSAI contents |||||||| octet 3 |
| Total number of mapped S-NSSAI |||||||| octet 4 |
| Length of S-NSSAI contents |||||||| octet 5 |
| SST |||||||| octet 6 |
| SD |||||||| octet 7 |
| |||||||| octet 9 |
| TSF | S-NSSAI identifier ||||||| octet n |
| TSF | S-NSSAI identifier ||||||| octet m |

FIG.66

| 8 | 7 | 6 | 5 | 4 | 3 | 2 | 1 | |
|---|---|---|---|---|---|---|---|---|
| S-NSSAI IEI |||||||| octet 1 |
| TSF | S-NSSAI identifier ||||||| octet 2 |
| Total length of S-NSSAI contents |||||||| octet 3 |
| Total number of mapped S-NSSAI |||||||| octet 4 |
| TSF | S-NSSAI identifier ||||||| octet n |
| TSF | S-NSSAI identifier ||||||| octet m |

FIG.67

| 8 | 7 | 6 | 5 | 4 | 3 | 2 | 1 | |
|---|---|---|---|---|---|---|---|---|
| NSSAI IEI |||||||| octet 1 |
| Length of NSSAI contents |||||||| octet 2 |
| Number of S-NSSAI |||||||| octet 3 |
| S-NSSAI 1 |||||||| octet 4 — octet m |
| S-NSSAI 2 |||||||| octet m+1* — octet n* |
| ... |||||||| octet n+1* — octet u* |
| S-NSSAI n |||||||| octet u+1* — octet v* |

FIG.68

| 8 | 7 | 6 | 5 | 4 | 3 | 2 | 1 | |
|---|---|---|---|---|---|---|---|---|
| Allowed and mapped NSSAI IEI |||||||| octet 1 |
| Length of allowed and mapped NSSAI contents |||||||| octet 2 |
| Number of allowed and mapped S-NSSAI |||||||| octet 3 |
| Allowed and mapped S-NSSAI 1 |||||||| octet 4 — octet m |
| Allowed and mapped S-NSSAI 2 |||||||| octet m+1* — octet n* |
| ... |||||||| octet n+1* — octet u* |
| Allowed and mapped S-NSSAI n |||||||| octet u+1* — octet v* |

FIG.69

| 8 | 7 | 6 | 5 | 4 | 3 | 2 | 1 | |
|---|---|---|---|---|---|---|---|---|
| colspan="8" | S-NSSAI IEI | | | | | | | | octet 1 |
| TSF | | colspan="7" | S-NSSAI identifier | | | | | | | octet 2 |
| colspan="8" | Total Length of S-NSSAI contents | | | | | | | | octet 3 |
| colspan="8" | Total number of mapped S-NSSAI | | | | | | | | octet 4 |
| colspan="8" | Length of S-NSSAI contents | | | | | | | | octet 5 |
| colspan="8" | SST | | | | | | | | octet 6 |
| colspan="8" rowspan="2" | SD | | | | | | | | octet 7 |
| | | | | | | | | octet 9 |
| TSF | | colspan="7" | S-NSSAI identifier | | | | | | | octet n |
| colspan="8" | Length of S-NSSAI contents | | | | | | | | octet n+1 |
| colspan="8" | SST | | | | | | | | octet n+2 |
| colspan="8" rowspan="2" | SD | | | | | | | | octet n+3 |
| | | | | | | | | octet n+5 |
| TSF | | colspan="7" | S-NSSAI identifier | | | | | | | octet m |
| colspan="8" | Length of S-NSSAI contents | | | | | | | | octet |
| colspan="8" | SST | | | | | | | | octet |
| colspan="8" rowspan="2" | SD | | | | | | | | octet |
| | | | | | | | | octet |

FIG.71

| 8 | 7 | 6 | 5 | 4 | 3 | 2 | 1 | |
|---|---|---|---|---|---|---|---|---|
| colspan="8" | S-NSSAI IEI | | | | | | | | octet 1 |
| TSF | | colspan="6" | S-NSSAI identifier | | | | | | | octet 2 |
| colspan="8" | Total Length of S-NSSAI contents | | | | | | | | octet 3 |
| colspan="8" | Total number of mapped S-NSSAI | | | | | | | | octet 4 |
| colspan="8" | Length of S-NSSAI contents | | | | | | | | octet 5 |
| colspan="8" | SST | | | | | | | | octet 6 |
| colspan="8" | SD | | | | | | | | octet 7 / octet 9 |
| TSF | | colspan="6" | S-NSSAI identifier | | | | | | | octet n |
| colspan="8" | Length of S-NSSAI contents | | | | | | | | octet n+1 |
| colspan="8" | SST | | | | | | | | octet n+2 |
| colspan="8" | SD | | | | | | | | octet n+3 / octet n+5 |
| TSF | | colspan="6" | S-NSSAI identifier | | | | | | | octet m |
| colspan="8" | Length of S-NSSAI contents | | | | | | | | octet |
| colspan="8" | SST | | | | | | | | octet |
| colspan="8" | SD | | | | | | | | octet / octet |

FIG.72

| 8 | 7 | 6 | 5 | 4 | 3 | 2 | 1 | |
|---|---|---|---|---|---|---|---|---|
| S-NSSAI IEI ||||||||  octet 1 |
| TSF | | S-NSSAI identifier |||||| octet 2 |
| Total Length of S-NSSAI contents |||||||| octet 3 |
| Total number of mapped S-NSSAI |||||||| octet 4 |
| Length of S-NSSAI contents |||||||| octet 5 |
| SST |||||||| octet 6 |
| SD |||||||| octet 7 octet 9 |
| TSF | | S-NSSAI identifier |||||| octet n |
| Length of S-NSSAI contents |||||||| octet n+1 |
| SST |||||||| octet n+2 |
| SD |||||||| octet n+3 octet n+5 |
| TSF | | S-NSSAI identifier |||||| octet m |
| Length of S-NSSAI contents |||||||| octet |
| SST |||||||| octet |
| SD |||||||| octet octet |

FIG.73

| 8 | 7 | 6 | 5 | 4 | 3 | 2 | 1 | |
|---|---|---|---|---|---|---|---|---|
| S-NSSAI IEI ||||||||  octet 1 |
| TSF | S-NSSAI identifier ||||||| octet 2 |
| Total length of S-NSSAI contents |||||||| octet 3 |
| Total number of mapped S-NSSAI |||||||| octet 4 |
| Length of S-NSSAI contents |||||||| octet 5 |
| SST |||||||| octet 6 |
| SD |||||||| octet 7 / octet 9 |
| TSF | S-NSSAI identifier ||||||| octet n |
| TSF | S-NSSAI identifier ||||||| octet m |

FIG.74

| 8 | 7 | 6 | 5 | 4 | 3 | 2 | 1 | |
|---|---|---|---|---|---|---|---|---|
| S-NSSAI IEI |||||||| octet 1 |
| TSF | S-NSSAI identifier ||||||| octet 2 |
| Total length of S-NSSAI contents |||||||| octet 3 |
| Total number of mapped S-NSSAI |||||||| octet 4 |
| TSF | S-NSSAI identifier ||||||| octet n |
| TSF | S-NSSAI identifier ||||||| octet m |

FIG.75

| 8 | 7 | 6 | 5 | 4 | 3 | 2 | 1 | |
|---|---|---|---|---|---|---|---|---|
| 5GS mobile identiti IEI ||||||||octet 1 |
| Length of 5GS mobile identity contents ||||||||octet 2 |
| Identity digit 1 |||| Odd/even indic | Type of identity ||| octet 3 |
| Identity digit p+1 |||| Identity digit p |||| octet 4 |

FIG.76

| 8 | 7 | 6 | 5 | 4 | 3 | 2 | 1 | |
|---|---|---|---|---|---|---|---|---|
| 5GS mobile identiti IEI ||||||||octet 1 |
| Length of 5GS mobile identity contents ||||||||octet 2 |
| Identity digit 1 |||| Odd/even indic | Type of identity ||| octet 3 |
| Identity digit p+1 |||| Identity digit p |||| octet 4 |

FIG.77

METHOD AND APPARATUS FOR TRANSMITTING AND RECEIVING DATA IN WIRELESS COMMUNICATION SYSTEM

CROSS-REFERENCE TO RELATED APPLICATIONS

This application is a 371 of International Application No. PCT/KR2018/012070 filed on Oct. 12, 2018, which claims priority to Korean Patent Application No. 10-2017-0133638 filed on Oct. 13, 2017, Korean Patent Application No. 10-2017-0136705 filed on Oct. 20, 2017, Korean Patent Application No. 10-2017-0154682 filed on Nov. 20, 2017, Korean Patent Application No. 10-2017-0154465 filed on Nov. 20, 2017, Korean Patent Application No. 10-2018-0004643 filed on Jan. 12, 2018, Korean Patent Application No. 10-2018-0018573 filed on Feb. 14, 2018, Korean Patent Application No. 10-2018-0051473 filed on May 3, 2018, and Korean Patent Application No. 10-2018-0058903 filed on May 24, 2018, the disclosures of which are herein incorporated by reference in their entirety.

BACKGROUND

1. Field

Various embodiments of the disclosure relate to a data transmission/reception method and apparatus in a wireless communication system, and more specifically, to a method and apparatus for transmitting and receiving control information for data transmission/reception in a wireless communication system.

Various embodiments of the disclosure relate to a scheme for network access and data transfer by a terminal, which is applicable to communication systems, a method for transmitting information by a terminal and a network, and an apparatus for performing the same.

Various embodiments of the disclosure relate to wireless communication systems, and more specifically, to an apparatus and method for performing communication with a network entity in a wireless communication system.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post long-term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Vigorous research efforts are also being made to methods of data transmission between terminals and network entities and methods for performing communication adaptively depending on variations in information required to be processed by the network.

Recent development of LTE and LTE-advanced requires a scheme for network access and data transfer by a terminal, which is applicable to communication systems, a method for transmitting information by a terminal and a network, and an apparatus for performing the same.

Meanwhile, there is under discussion various types of system interworking and terminal identification schemes in 5G systems as well as schemes for identifying the terminal performing system interworking in a more efficient manner.

Various embodiments of the disclosure provide a data transmission/reception method and apparatus in a wireless communication system for efficiently operating wireless data transmission/reception.

Meanwhile, with the advent of 5G ($5^{th}$ generation) mobile communication, the access and mobility management function (AMF), which is the entity of managing the mobility of terminals, and the session management function (SMF), which is the entity of managing sessions, have been separated from each other. Thus, unlike legacy 4G ($4^{th}$ generation) long-term evolution (LTE) in which the mobility management entity (MME) performs both session management and mobility management, 5G communication splits the entity of managing mobility from the entity of managing sessions.

Various embodiments of the disclosure propose communication schemes related to methods of registration between a terminal and a network entity, session managing methods, and information transfer methods.

Meanwhile, the 5G communication era has led to changes in communication scheme and communication management schemes between terminals and network entities. Also terminal security has arisen as a critical issue.

Various embodiments of the disclosure propose security schemes for terminals. Various embodiments of the disclosure also propose a scheme of identifying a terminal and a scheme of suggesting information related to the service of the terminal when the terminal moves or hands over between a 5G network and a 4G LTE network.

SUMMARY

According to various embodiments of the disclosure, a terminal may include a transceiver and a processor controlling the transceiver to transmit a message including session-related information.

According to various embodiments of the disclosure, there is proposed a method of communication by a terminal in a wireless communication system supporting a plurality of protocol data unit (PDU) sessions, comprising transmitting a first non-access stratum (NAS) including first state information indicating whether each of the plurality of PDU sessions is active to a network entity in charge of mobility management via a base station and receiving a second NAS message including second state information indicating whether each of the plurality of PDU sessions is active from the network entity via the base station.

According to various embodiments of the disclosure, there is proposed a terminal in a wireless communication system supporting a plurality of protocol data unit (PDU) sessions, comprising a transceiver and a processor coupled with the transceiver and configured to transmit a first non-access stratum (NAS) including first state information indicating whether each of the plurality of PDU sessions is active to a network entity in charge of mobility management via a base station and receive a second NAS message including second state information indicating whether each of the plurality of PDU sessions is active from the network entity via the base station.

According to various embodiments of the disclosure, there is proposed a method of communication by a network entity in charge of mobility management in a wireless communication system supporting a plurality of protocol data unit (PDU) sessions, comprising transmitting a first non-access stratum (NAS) including first state information indicating whether each of the plurality of PDU sessions is active from a terminal via a base station and transmitting a second NAS message including second state information indicating whether each of the plurality of PDU sessions is active to the terminal via the base station.

According to various embodiments of the disclosure, there is proposed a network entity in charge of mobility management in a wireless communication system supporting a plurality of protocol data unit (PDU) sessions, comprising a transceiver and a processor coupled with the transceiver and configured to transmit a first non-access stratum (NAS) including first state information indicating whether each of the plurality of PDU sessions is active from a terminal via a base station and transmit a second NAS message including second state information indicating whether each of the plurality of PDU sessions is active to the terminal via the base station.

According to various embodiments of the disclosure, there is proposed a method of communication by a terminal in a wireless communication system using a plurality of bearers, comprising transmitting a request message including information indicating whether the plurality of bearers are supported to a network entity in charge of mobility management via a base station and receiving a message responsive to the request message from the network entity via the base station.

According to various embodiments of the disclosure, there is proposed a terminal in a wireless communication system using a plurality of bearers, comprising a transceiver and a processor coupled with the transceiver and configured to transmit a request message including information indicating whether the plurality of bearers are supported to a network entity in charge of mobility management via a base station and receive a message responsive to the request message from the network entity via the base station.

According to various embodiments of the disclosure, a terminal and a network may efficiently perform data communication.

According to various embodiments of the disclosure, there is prepared a scheme for registering a terminal and managing sessions in a 5G system which has a mobility management entity and a session management entity separated from each other, thereby performing a basic procedure for communication between terminal and network and performing communication.

According to various embodiments of the disclosure, in a 5G system which has a mobility management entity and a session management entity separated from each other, it is possible to more efficiently perform communication by preparing a scheme for transferring information which is transferred from the terminal to network and/or information which is transferred from the network to terminal for the purpose of controlling from the terminal to the network entity or session management for data transfer The apparatus and method according to various embodiments of the disclosure propose a scheme for identifying the terminal and a scheme for providing the terminal with a service in the cases where the terminal performs communication in a network environment where a 5G system and an LTE system coexist, in particular when the terminal hands over from the LTE system to 5G system or from the 5G system to LTE system, thereby enabling identification of the terminal upon communication between the terminal and the network, performing data communication and service procedures, and performing communication in an efficient manner.

The apparatus and method according to various embodiments of the disclosure may reinforce the security for the network accessed by the terminal and protection of the terminal by performing security protection on the terminal accessing the network in the 5G system, thereby allowing for communication in an efficient way.

Effects of the disclosure are not limited to the foregoing, and other unmentioned effects would be apparent to one of ordinary skill in the art from the following description.

BRIEF DESCRIPTION OF THE DRAWINGS

FIG. 3 illustrates a configuration of a PDU session ID information element according to an embodiment of the present disclosure;

FIG. 4 illustrates an organization of a general NAS message including a PDU session ID according to an embodiment of the present disclosure;

FIGS. 5, 6A to 6E, and 7 illustrate a specific coding scheme of PDU session ID information element according to various embodiments of the present disclosure;

FIGS. 9A, 9B, and 10 illustrate organizations of general NAS messages including a PDU session ID according to various embodiments of the present disclosure;

FIGS. 11 and 12 illustrate a specific coding scheme and a configuration of a PDU session status information element according to still another embodiment of the present disclosure;

FIGS. 13A to 13J, 14, and 15 illustrate specific coding schemes and a configuration of a PDU session status information element according to still another embodiment of the present disclosure;

FIGS. 16 and 17 illustrate a specific coding scheme and a configuration of a PDU session reactivation information element according to still another embodiment of the present disclosure;

FIGS. 18A to 18J, 19, and 20 illustrate specific coding schemes and a configuration of a PDU session reactivation information element according to still another embodiment of the present disclosure;

FIGS. 21 and 22 illustrate a specific coding scheme and a configuration of a PDU session reactivation result information element according to an embodiment of the present disclosure;

FIGS. 23A to 23J, 24, and 25 illustrate specific coding schemes and a configuration of a PDU session reactivation result information element according to an embodiment of the present disclosure;

FIGS. 26 and 27 illustrate a specific coding scheme and a configuration of a uplink data status information element according to an embodiment of the present disclosure;

FIGS. 28A to 28J, 29, and 30 illustrate specific coding schemes and a configuration of an uplink data status information element according to an embodiment of the present disclosure;

FIG. 34 illustrates an LTE system according to still another embodiment of the present disclosure;

FIGS. 35, 36A, and 36B illustrate specific coding schemes and a configuration of an EPS bearer identity information element according to an embodiment of the present disclosure;

FIGS. 37A to 37D and 38 illustrate a specific coding scheme and a configuration of an EPS bearer context status information element according to an embodiment of the present disclosure;

FIGS. 39 and 40 illustrate a coding scheme and a configuration of a UE network capability IE according to an embodiment of the present disclosure;

FIG. 57 illustrates parameters of the NSSAI information element according to embodiments of the present disclosure;

FIG. 58 illustrates a configuration of the allowed NASSAI information element according to embodiments of the present disclosure;

FIG. 59 illustrates a configuration of the S-NSSAI information element according to embodiments of the present disclosure;

FIG. 60 illustrates a configuration of the S-NSSAI information element according to embodiments of the present disclosure;

FIG. 61 illustrates a configuration of the NSSAI information element according to embodiments of the present disclosure;

FIG. 62 illustrates a configuration of the allowed NSSAI information element according to embodiments of the present disclosure;

FIG. 64 illustrates a configuration of the S-NSSAI information element according to embodiments of the present disclosure;

FIG. 65 illustrates a configuration of the S-NSSAI information element according to embodiments of the present disclosure;

FIG. 66 illustrates the configuration of the S-NSSAI information element according to embodiments of the present disclosure;

FIG. 67 illustrates a configuration of the S-NSSAI information element according to embodiments of the present disclosure;

FIG. 68 illustrates a configuration of the allowed NSSAI information element according to embodiments of the present disclosure;

FIG. 69 illustrates a configuration of the allowed NSSAI information element according to embodiments of the present disclosure;

FIG. 71 illustrates a configuration of the S-NSSAI information element according to embodiments of the present disclosure;

FIG. 72 illustrates a configuration of the S-NSSAI information element according to embodiments of the present disclosure;

FIG. 73 illustrates a configuration of the S-NSSAI information element according to embodiments of the present disclosure;

FIG. 74 illustrates a configuration of the S-NSSAI information element according to embodiments of the present disclosure;

FIG. 75 illustrates the configuration of the S-NSSAI information element according to yet other embodiments of the present disclosure;

FIG. 76 illustrates the configuration of the 5G information element according to various embodiments of the present disclosure; and FIG. 77 illustrates configurations of a 5G element according to embodiments of the present disclosure.

DETAILED DESCRIPTION

Figure 1:
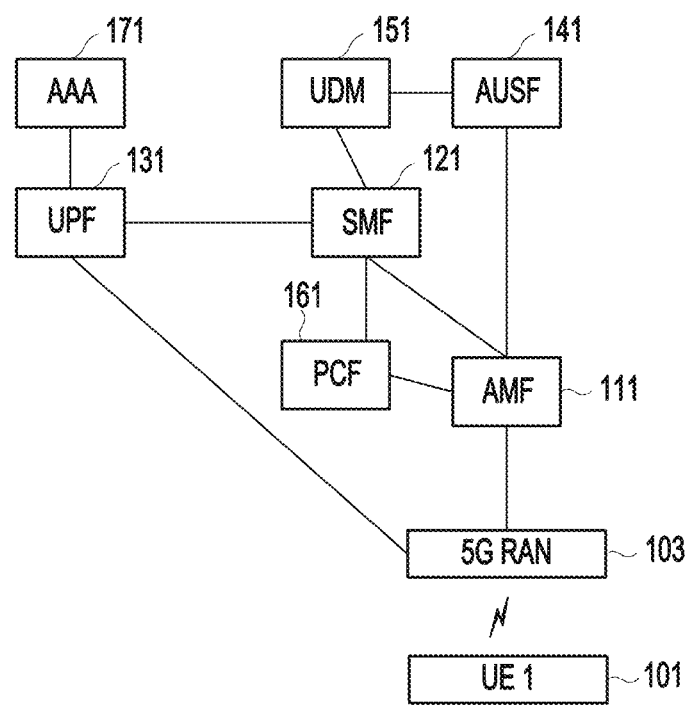
FIG. 1 illustrates security network environment in a 5G system according to an embodiment of the present disclosure.

Hereinafter, embodiments of the present disclosure are described in detail with reference to the accompanying drawings. The same reference denotations may be used to refer to the same or similar elements throughout the specification and the drawings. When making the gist of the present invention unclear, the detailed description of known functions or configurations is skipped.

In describing the embodiments of the disclosure, the description of technologies that are known in the art and are not directly related to the present invention is omitted. This is for further clarifying the gist of the present disclosure without making it unclear.

For the same reasons, some elements may be exaggerated, omitted or schematically shown. The size of each element does not necessarily reflects the real size of the element. The same reference numeral is used to refer to the same element throughout the drawings.

Advantages and features of the present disclosure, and methods for achieving the same may be understood through the embodiments to be described below taken in conjunction with the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

As used herein, terms for identifying access nodes, terms denoting network entities, terms denoting messages, terms denoting inter-network entity interfaces, and terms denoting various pieces of identification information are provided as examples for ease of description. Thus, the disclosure is not limited to the terms, and the terms may be replaced with other terms denoting objects with equivalent technical meanings.

For ease of description, the present disclosure adopts terms and names defined in 5G system standards. However, embodiments of the present disclosure are not limited by such terms and names and may be likewise applicable to systems conforming to other standards, e.g., LTE.

In other words, the description of embodiments of the present disclosure focuses primarily on 3rd generation partnership project (3GPP) communication standards, but the subject matter of the present disclosure may also be applicable to other communication systems with a similar technical background with minor changes without significantly departing from the scope of the present disclosure, and this may be so performed by the determination of those skilled in the art to which the present disclosure pertains.

FIG. 1 illustrates security network environment in a 5G system according to an embodiment of the disclosure.

According to an embodiment of the present disclosure, a 5G network is assumed. According to an embodiment, the 5G network may include a user plane function (UPF) 131, a session management function (SMF) 121, an access and mobility management function (AMF) 111, a 5G radio access network (RAN) 103, a user data management (UDM) 151, a policy control function (PCF) 161, and a user equipment (UE) UE1. Meanwhile, the system may also include an authentication server function (AUSF) 141 and an authentication-authorization-and-accounting (AAA) 171 for authentication purposes. Here, the 5G RAN 103 may be a base station (e.g., a gNB) supporting the 5G network. Further, the gNB may be specified in 3GPP TS 38.300. As an example, the PCF 161 may determine a policy of session management or mobility management and transfer to the SMF 121 or AMF 111, thereby performing proper mobility management, session management or QoS management. The AUSF 141 may store data for authentication of the UE, and the UDM 151 may store subscription data or policy data of the user. The AAA 171 may perform such functions as authentication, authorization, or account management.

The communication network on which the present disclosure is based is assumed to be a 5G network, but the same concept may also be applicable to other systems within a category one of ordinary skill may appreciate.

Figure 2:
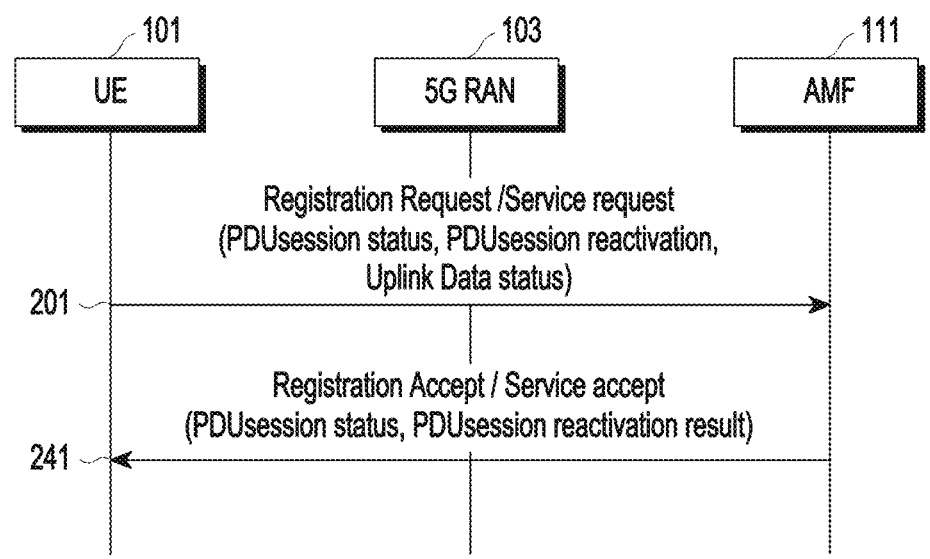
FIG. 2 illustrates a 5G system according to an embodiment of the present disclosure.

FIG. 2 illustrates a 5G system according to an embodiment of the present disclosure.

Referring to FIG. 2, in step 201, the UE 101 may include a PDU session status information element (hereinafter, "IE"), a PDU session reactivation IE, and an uplink data status IE in a registration request message or a service request and transmit the registration request message or the service request.

The PDU session status IE is used to indicate whether a session has previously been established in the UE. As an example, the PDU session status IE may be referred to as information regarding whether the PDU session is active (has been activated) or information regarding session establishment.

The PDU session reactivation IE is used to indicate which one of PDU sessions the UE is to reactivate.

The uplink data status IE is included when the UE sends the registration request or service request message and is used to allow the AMF to reactivate the user plane for the PDU session to the SMF.

In another embodiment, the PDU session status IE is used to indicate whether the PDU session is active.

In another embodiment, the uplink data status IE may be used to indicate whether uplink data for PDU session identity is pending in the network.

In another embodiment, the PDU session reactivation IE may be used to indicate whether reactivation in 3GPP access for the PDU session associated with non-3GPP access is allowed. Here, non-3GPP access may be the UE's access method via unlicensed radio access, i.e., access from WI-FI, and 3GPP access may be a method of access by the UE via the LTE network or NR network.

Referring to FIG. 2, in step 241, the AMF 111 may include a PDU session status IE or PDU session reactivation result IE in a registration accept message or service accept message when the AMF 111 sends the registration accept message or the service accept message to the UE 101.

Here, the PDU session status IE is used for the network to notify the UE 101 which PDU session is active. As an example, the PDU session status IE may be referred to as information regarding session activation or session activation status-related information.

The PDU session reactivation result IE is used for the network to notify the UE 101 of the result of PDU session reactivation for which the UE 101 has sent a request to the network (or to the SMF 121 via the AMF 111). In another embodiment, the PDU session status IE is used to indicate whether the PDU session is active.

In another embodiment, the PDU session reactivation result IE is used for the network (or the SMF 121 via the AMF 111) to notify the UE 101 of the result of PDU session reactivation. In other words, the PDU session reactivation result IE may be used for the network (or the SMF 121 via the AMF 111) to notify the UE 101 whether user plane resource reactivation has succeeded or not. In other words, the PDU session reactivation result IE may be used for the network (or the SMF 121 via the AMF 111) to notify the UE 101 whether user plane resource reactivation has succeeded or not in response to a request for PDU session reactivation sent from the UE 101 to the network (or the SMF 121 via the AMF 111) by the uplink data status IE (Case 1); the PDU session reactivation result IE may be used for the network (or the SMF 121 via the AMF 111) to notify the UE 101 whether user plane resource reactivation has succeeded or not in response to a request for reactivation in 3GPP access for the PDU session related to non-3GPP access sent from the UE 101 to the network (or the SMF 121 via the AMF 111) by the PDU session reactivation IE (Case 2); or the PDU session reactivation result IE may be used for the network (or the SMF 121 via the AMF 111) to confirm and notify the UE 101 that the UE 101 has sent no request for PDU session reactivation to the network (or the SMF 121 via the AMF 111) (Case 3). In other words, the PDU session reactivation result IE may be used for the network (or the SMF 121 via the AMF 111) to confirm and notify the UE that the UE has not sent a request for reactivation of the corresponding PDU session by the uplink status IE to the network (Case 3-1). The PDU session reactivation result IE may be used for the network (or the SMF 121 via the AMF 111) to confirm and notify the UE 101 that the UE 101 has not sent a request for reactivation of the corresponding PDU session by the PDU session reactivation IE to the network (Case 3-2).

A PDU session identity (ID) used for such a process may be configured as shown in FIG. 3 or 5.

FIG. 3 illustrates a configuration of a PDU session ID information element according to an embodiment of the present disclosure.

FIG. 3 illustrates an example in which a four-bit is used for PDU session identity, and the left-hand part is filled with spare values according to an embodiment of the present disclosure.

FIG. 4 illustrates a general non-access stratum (NAS) message organization according to an embodiment of the present disclosure.

Here, the PDU session ID uses the first, second, third, and fourth bits of octet number 1.

Meanwhile, FIG. 3 may be an enlarged view of the octet 2 portion only of FIG. 4. In other words, it may describe the PDU session identity part depending on whether four bits or eight bits are used. The other part may be described with reference to, e.g., FIG. 4.

FIG. 5 illustrates a specific configuration of a PDU session ID information element according to an embodiment of the present disclosure.

Figure 8:
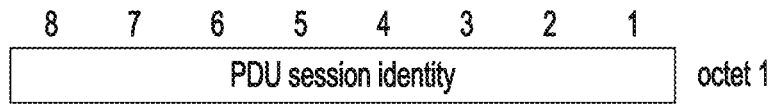
FIG. 8 illustrates a configuration of a PDU session ID information element according to another embodiment of the present disclosure.

In another embodiment, in a case where a UE (e.g., the UE 101) or a network supports up to 32 data radio bearers (DRBs), the PDU session identity may be transformed into one octet (i.e., eight bits), not four bits, to support the same so that it may be coded as shown in any one of FIGS. 6A to 6C and 7 in an information element format as shown in FIG. 8.

FIGS. 6A to 9B are related to the case where the PDU session ID is eight-bit long.

FIGS. 6A to 6C illustrate specific coding schemes of PDU session ID information element according to various embodiments. As used herein, "coding" may refer to dividing meanings with 1 or 0 as the message coding portion.

In the 5G RAN, since the UE supports 16 DRBs, and the user plane supports 32 DRBs, the UE needs to support a minimum of 16 PDU session identities for one-to-one mapping between PDU sessions and DRBs. The user plane may be enabled to support 32 PDU session identities.

FIG. 6B is a view illustrating an example of using 16 values according to various embodiments, and FIG. 6C is a view illustrating an example in which 32 values are available according to various embodiments. FIGS. 6D and 6E are views illustrating an example of using 15 values according to various embodiments.

FIG. 7 illustrates a specific coding scheme of PDU session ID information element according to another embodiment of the present disclosure.

FIG. 8 illustrates a configuration of a PDU session ID information element according to another embodiment of the present disclosure.

Here, as the PDU session identity (ID) is configured with eight bits as shown below in FIG. 8, a figure (or configuration) of a general non-access stratum (NAS) message organization is specifically shown in FIG. 9 or 10. In other words, the PDU session ID may use eight bits of octet number 1 (e.g., octet 1 of FIG. 8).

Figure 9A:
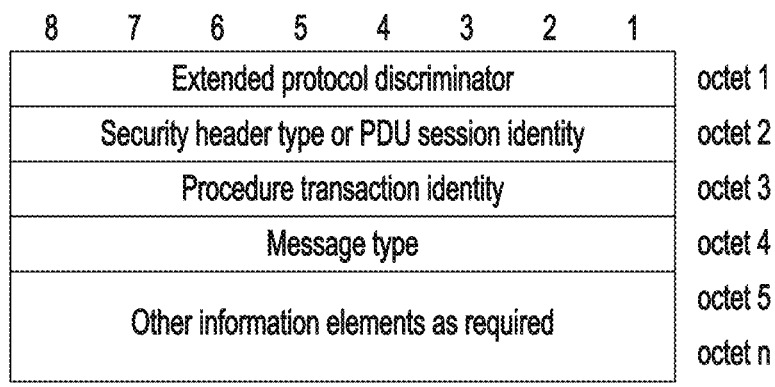
Figure 9B:
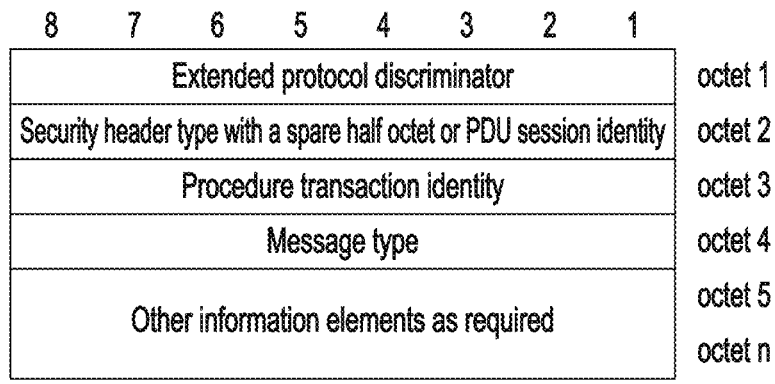

FIGS. 9A and 9B illustrate a general NAS message organization according to an embodiment of the present disclosure.

FIGS. 9A and 9B illustrate a NAS message format.

FIG. 10 illustrates a general NAS message organization according to another embodiment of the present disclosure. FIG. 10 involves the case where the PDU session ID is 4-bit long. FIG. 10 illustrates a NAS message format.

Configuration and coding schemes related to the PDU session status IE are described below.

The PDU session status information element (IE) of the UE which is used to notify the network whether the UE's PDU session has been activated may be configured in the form as shown in FIG. 11, and its coding may be configured as shown in FIG. 12. In other words, FIG. 12 illustrates an interpretation of the coding values of FIG. 11.

Such a PDU session status IE may be used for the UE to notify the network whether the PDU session has previously been activated as an example. As another example, the PDU session status IE may be used for the UE to send a request for reactivating a specific PDU session to the network. As another example, the PDU session status IE may be used for the network, which has received a request for PDU session reactivation from the UE, to notify the UE of the result of reactivation of a specific PDU session.

Further, in another embodiment, the UE's PDU session status information element (IE) used to notify the network whether the UE's PDU session has been activated by enabling 32 PDU session identity (ID) values or 28 PDU session ID values to support 32 data radio bearers (DRBs) may be configured in the form as shown in FIG. 13A, and its coding may be performed as shown in FIG. 14 or 15. As an example, the configuration of FIG. 13A may be coded and interpreted as shown in FIG. 14 or 15.

FIG. 13B illustrates a configuration for a PDU session status information element (IE) when 16 values are used, and FIGS. 13C and 13D illustrate a scheme of coding and interpreting the PDU session status information element (IE) of FIG. 13B. The configuration of FIG. 13B may be coded and interpreted as shown in FIG. 13C or 13D.

FIG. 13E illustrates a configuration for the PDU session status information element (IE) when 32 valves are used.

FIGS. 13F and 13G illustrate a scheme for coding and interpreting the PDU session status information element (IE) of FIG. 13E. The configuration of FIG. 13E may be coded and interpreted as shown in FIG. 13F or 13G.

FIG. 13B may be utilized as a configuration for the PDU session status information element (IE) when 15 values are used for the PDU session. In such a case, each bit of the information element may be used to indicate which one(s) of the PDU sessions are in activation or inactivation as shown in FIG. 13H.

As another example, an embodiment in which the PDU session supports 15 values is described. This is a scheme for indicating which PDU session among the PDU sessions is active or inactive. In this example, the PDU session status information element (IE) may be configured as shown in FIG. 13I. FIG. 13J illustrates a scheme for coding and interpreting the PDU session status information element (IE) configured as above.

Such a PDU session status IE may be used for the UE to notify the network whether the PDU session has previously been activated as an example. As another example, the PDU session status IE may be used for the UE to send a request for reactivating a specific PDU session to the network. As another example, the PDU session status IE may be used for the network, which has received a request for PDU session reactivation from the UE, to notify the UE of the result of reactivation of a specific PDU session.

As another example, a configuration and coding scheme of the PDU session reactivation information element (IE) used for the UE to reactivate a specific PDU session and to notify the network that the PDU session needs to be reactivated may be configured as shown in FIGS. 16 and 17.

As another example, the UE's PDU session reactivation information element (IE) used to notify the network that the UE's PDU session needs to be reactivated by enabling 32 PDU session identity (ID) values or 28 PDU session ID values to support 32 DRBs may be configured in the form as shown in FIG. 18A, and its coding may be set as shown in FIG. 19 or 20. As an example, the configuration of FIG. 18A may be coded and interpreted as shown in FIG. 19 or 20.

FIG. 18B illustrates a configuration for a PDU session reactivation information element (IE) when 16 values are used, and FIGS. 18C and 18D illustrate a scheme of coding and interpreting the PDU session reactivation information element (IE) of FIG. 18B. The configuration of FIG. 18B may be coded and interpreted as shown in FIG. 18C or 18D.

FIG. 18E illustrates a configuration for a PDU session reactivation information element (IE) when 32 values are used, and FIGS. 18F and 18G illustrate a scheme of coding and interpreting the PDU session reactivation information element (IE) of FIG. 18E. The configuration of FIG. 18E may be coded and interpreted as shown in FIG. 18F or 18G.

FIG. 18B may be utilized as a configuration for the PDU session reactivation information element (IE) when 15 values are used for the PDU session. In such a case, coding and interpretation may be performed in such a manner as to indicate, by using each bit of the information element, whether reactivation of the PDU session in 3GPP access is allowed as shown in FIG. 18H.

As another example, an embodiment in which the PDU session supports 15 values is described. This is a scheme for indicating whether PDU session reactivation in 3GPP access is allowed. The PDU session reactivation information element (IE) may be configured as shown in FIG. 18I. FIG. 18J illustrates a scheme for coding and interpreting the PDU session reactivation information element (IE) configured as above.

In another embodiment, the PDU session reactivation result information element (IE) used for the network to notify the UE of the PDU session reactivation result so as to notify the UE of the result of the PDU session reactivation requested by the UE may be configured as shown in FIG. 21, and its coding may be performed as shown in FIG. 22.

The PDU session reactivation result information element (IE) for the network to notify the UE of the result by enabling 32 PDU session identity (ID) values or 28 PDU session ID values to support 32 DRBs may be configured in the form as shown in FIG. 23A, and its coding may be performed as shown in FIG. 24 or 25. As an example, the configuration of FIG. 23A may be coded and interpreted as shown in FIG. 24 or 25.

FIG. 23B illustrates a configuration for a PDU session reactivation result information element (IE) when 16 values are used, and FIGS. 23C and 23D illustrate a scheme of coding and interpreting the PDU session reactivation result information element (IE) of FIG. 23B. The configuration of FIG. 23B may be coded and interpreted as shown in FIG. 23C or 23D.

FIG. 23E illustrates a configuration for a PDU session reactivation result information element (IE) when 32 values are used, and FIGS. 23F and 23G illustrate a scheme of coding and interpreting the PDU session reactivation result information element (IE) of FIG. 23E. The configuration of FIG. 23E may be coded and interpreted as shown in FIG. 23F or 23G.

FIG. 23B may be utilized as a configuration for the PDU session reactivation result information element (IE) when 15 values are used for the PDU session. In such a case, each bit of the information element may be used to indicate that no request for PDU session reactivation has been made or whether PDU session reactivation requested has succeeded or not as shown in FIG. 23H.

As another example, an embodiment in which the PDU session supports 15 values is described. This is a scheme for indicating that no request for PDU session reactivation has been made or whether PDU session reactivation requested has succeeded or not. In this embodiment, the PDU session reactivation result information element (IE) may be configured as shown in FIG. 23I. FIG. 23J illustrates a scheme for coding and interpreting the PDU session reactivation result information element (IE) configured as above.

In another embodiment, the uplink data status IE may be included in a message that the UE sends to the AMF. If the AMF receives the uplink data status IE, the AMF notifies the SMF of reactivation of the user plane for the corresponding PDU session.

The uplink data status information element (IE) may be configured as shown in FIG. 26, and its coding may be performed as shown in FIG. 27.

The uplink data status information element (IE) for the network to notify the UE of the result by enabling 32 PDU session identity (ID) values or 28 PDU session ID values to support 32 DRBs may be configured in the form as shown in FIG. 28A, and its coding may be performed as shown in FIG. 29 or 30. As an example, the configuration of FIG. 28A may be coded and interpreted as shown in FIG. 29 or 30.

FIG. 28B illustrates a configuration for an uplink data status information element (IE) when 16 values are used, and FIGS. 28C and 28D illustrate a scheme of coding and interpreting the uplink data status information element (IE) of FIG. 28B. The configuration of FIG. 28B may be coded and interpreted as shown in FIG. 28C or 28D.

FIG. 28E illustrates a configuration for an uplink data status information element (IE) when 32 values are used, and FIGS. 28F and 28G illustrate a scheme of coding and interpreting the PDU session status information element (IE) of FIG. 28E. The configuration of FIG. 28E may be coded and interpreted as shown in FIG. 28F or 28G.

FIG. 28B may be utilized as a configuration for the uplink data status information element when 15 values are used for the PDU session. In such a case, each bit of the information element may be used to indicate that uplink data is pending for which one of the corresponding PDU session identities as shown in FIG. 28H.

As another example, an embodiment in which the PDU session supports 15 values is described. This is a method for indicating that uplink data is pending for which one of the PDU session identities. In this embodiment, the uplink data status information element may be configured as shown in FIG. 28I. FIG. 28J illustrates a scheme for coding and interpreting the uplink data status information element configured as above.

Figure 31:
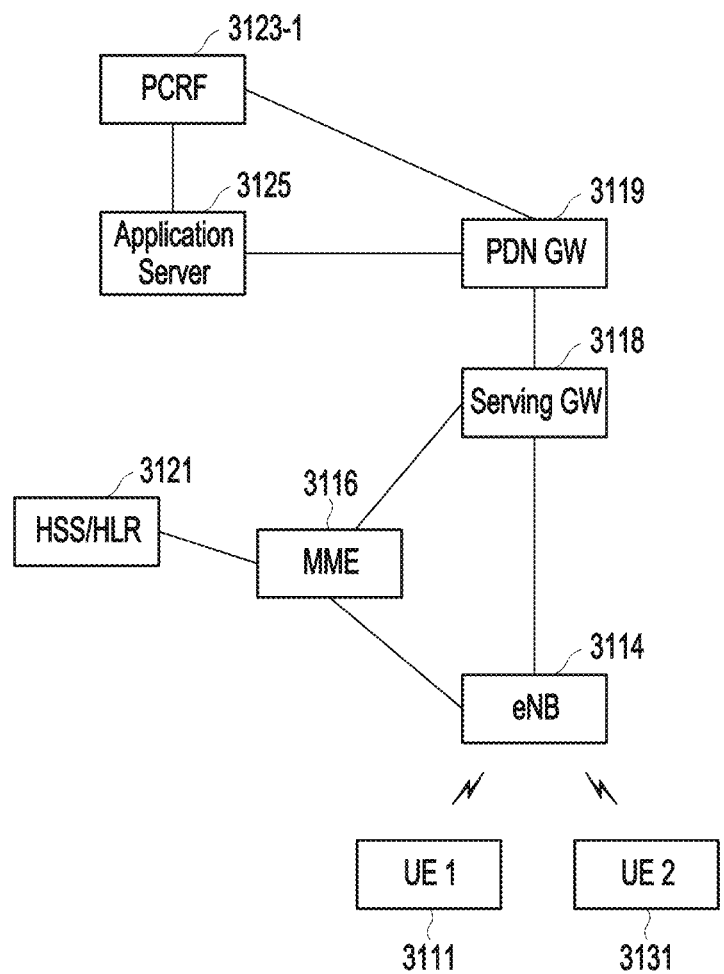
FIG. 31 illustrates an LTE system network environment according to an embodiment of the present disclosure.

FIG. 31 illustrates an LTE system network environment according to an embodiment of the present disclosure.

As an example, a structure for 3GPP EPS system is illustrated here. The description of the present disclosure focuses primarily on E-UTRAN, and such method may be available to other similar mobile communication systems.

Referring to FIG. 31, a device or user equipment (UE) 3111 may encompass various devices, e.g., conventional mobile communication terminals (UEs), machine-type communication-capable devices, or consumer devices.

Referring to FIG. 31, UE1 3111 and UE2 3131 may perform common EUTRAN communication via an eNB 3114 and an MME 3116 and perform data communication via a serving gateway 3118 and a PDN gateway 3119. Meanwhile, an HSS 3121 is provided to transfer UE-related security key information or subscription information regarding the UE (e.g., UE1 3111 or UE2 3131).

Further, the LTE system network may further include a PCRF 3123-1 and an application server 3125.

Thus, according to the present disclosure, the following description is made based on the above-described network for entities, such as the device or UE 3111, eNB 3114, MME 3116, HSS 3121, or application server 3125 to be able to support a communication setup process and operation based on the protocol used in mobile communication or Internet communication.

Figure 32:
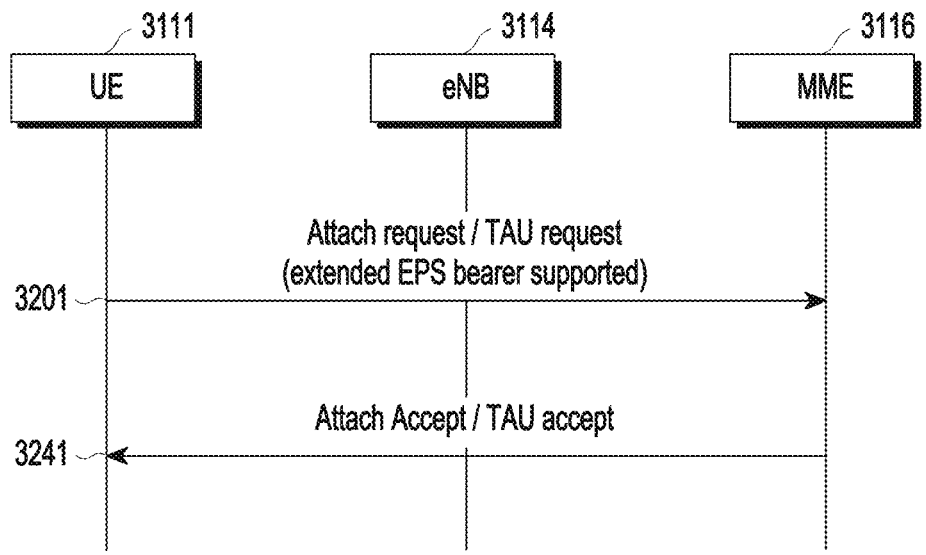
FIG. 32 illustrates an LTE system according to an embodiment of the present disclosure.

FIG. 32 illustrates an LTE system according to an embodiment of the present disclosure.

Here, the embodiment may be one for supporting an extended data service when a UE transmits data.

Referring to FIG. 32, in step 3201, the UE 3111 sends an attach request message or tracking area update request message, along with the indication that the UE 3111 supports the extended EPS bearer identity, to the MME 3116. In this method, as in an example of the present disclosure, a UE network capability information element (IE) or another form of information element configured of one octet or half octet or other length and additional information may be used to notify the network (e.g., the MME 3116) that UE has the capability for supporting the extended EPS bearer identity.

Referring to FIG. 32, as an example, upon sending an attach request (e.g., step 3201), a PDN connectivity request may be sent together or separately. To indicate that an additional bearer is set when the PDN connectivity request is sent, an extended EPS bearer identity may be used additionally. The extended EPS bearer identity information element (IE) may be used in addition to the EPS bearer identity of FIG. 36B which is the conventional mandatory field, thereby supporting more bearers than eight bearers as conventional. As an example, the EPS bearer identity and the extended EPS bearer identity information element (IE) may be used together. Since the EPS bearer identity is in the header field, and the extended EPS bearer identity information element (IE) is in the information element (IE), four bits from bit 5 to bit 8 of the EPS bearer identity may be set to 0000. Additionally, the extended EPS bearer identity information element (IE) may be set to represent the extended EPS bearer value with three bits, thus supporting extended EPS bearer values 17, 18, 19, 20, 21, and 22. In other words, as compared with the conventional EPS bearer identity which supports eleven values from 5 to 15, the present disclosure proposes a method of expansion to be able to additionally support more values.

Referring to FIG. 32, in step 3241, the network (or the MME 3116) sends an attach accept message or tracking area update (TAU) accept message to the UE 3111.

At this time, the EPS network feature support information element (IE) of the attach accept message or TAU accept message that the network (or the MME 3116) sends to the UE may indicate whether an extended EPS bearer identify is supported. In other words, the network may notify the UE 3111 whether the extended EPS bearer identity is supported.

As an example, upon sending the attach accept message to the UE 3111, the network (or the MME 3116) may send an activate default EPS bearer context request together or send an activate dedicated EPS bearer context request separately. At this time, i.e., upon sending the activate default EPS bearer context request or the activate dedicated EPS bearer context request, an extended EPS bearer identity may be additionally used to indicate that an additional bearer is set. The extended EPS bearer identity information element (IE) may be used in addition to the EPS bearer identity which is the conventional mandatory field, thereby supporting more bearers than eight bearers as conventional. In an embodiment, the EPS bearer identity and the extended EPS bearer identity information element (IE) may be used together. Since the EPS bearer identity is in the header field, and the extended EPS bearer identity information element (IE) is in the information element (IE), four bits from bit 5 to bit 8 of the EPS bearer identity are set to 0000 and, additionally, the extended EPS bearer identity information element (IE) is set to represent the extended EPS bearer value with three bits, thereby supporting extended EPS bearer values 17, 18, 19, 20, 21, and 22. In other words, as compared with the conventional EPS bearer identity which supports eleven values from 5 to 15, the present disclosure proposes a method of expansion to be able to additionally support more values.

Meanwhile, according to an embodiment, 5 through 15 may be available as identity values, and the identity is available as ID=5, 6, . . . , 15.

Figure 33:
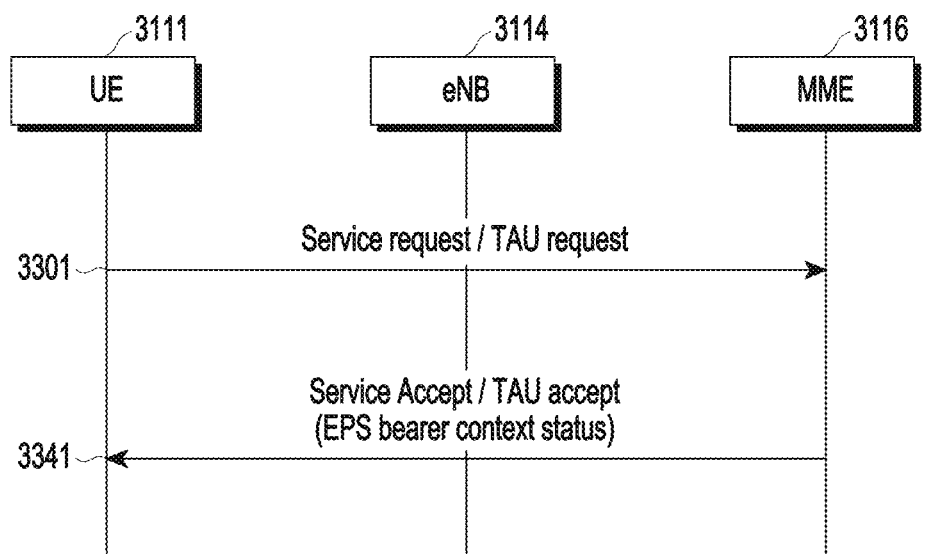
FIG. 33 illustrates an LTE system according to another embodiment of the present disclosure.

FIG. 33 illustrates an LTE system according to another embodiment of the present disclosure.

Here, the LTE system may be one for supporting a further extended data service when a UE transmits data.

Referring to FIG. 33, in step 3301, the UE 3111 sends a service request message or tracking area update request message to the MME 3116.

Referring to FIG. 33, in step 3341, the network (or the MME 3116) sends an attach accept message or tracking area update (TAU) accept message to the UE 3111. Upon sending the service accept message or tracking area update accept message to the UE 3111, the network (or the MME 3116) may send an EPS bearer context status IE. As an example, a reserved bit may be used to indicate that the extended EPS bearer identity is active (FIG. 37A or 38), or an extended EPS bearer context status information element (IE) may be used to indicate that the extended EPS bearer identity is active (FIG. 37C or 37D). In other words, the conventional EPS bearer context status IE as shown in FIG. 37A is coded as shown in FIG. 37B or, in a case where an extended EPS bearer is used additionally, the extended EPs bearer context status may be used to indicate whether it is active or inactive for the extended EPS bearer as shown in FIG. 37C or 37D.

This is for the network to notify the UE of EPS bearer context active for the UE. In particular, in a case where the extended EPS bearer identity is supported, it may be indicated by the method set forth in the present disclosure that the extended bearer is active.

Figures 34, 35:
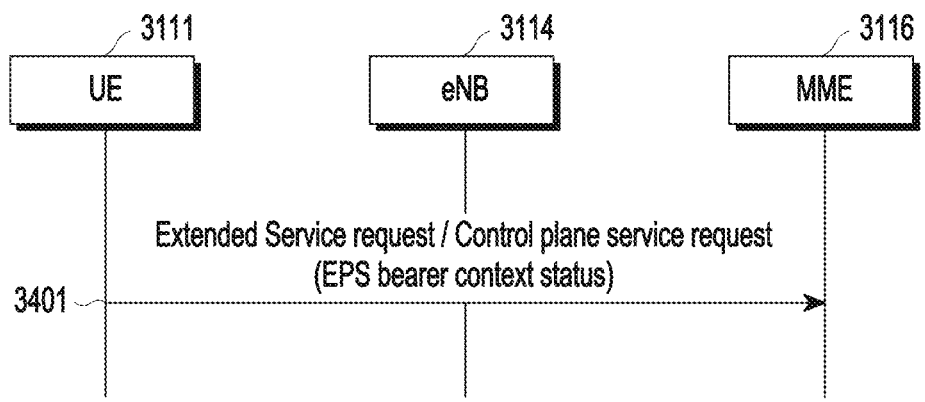

FIG. 34 illustrates an LTE system according to another embodiment of the present disclosure.

Here, the LTE system may be one for supporting a further extended data service when a UE transmits data.

Referring to FIG. 34, in step 3401, the UE 3111 sends an extended service request or control plane service request message to the MME 3116. At this time, the UE 3111 sends the EPS bearer context status IE to the network.

As an example, a reserved bit may be used to indicate that the extended EPS bearer identity is active (FIG. 37A or 38), or an extended EPS bearer context status information element (IE) may be used to indicate that the extended EPS bearer identity is active (FIG. 37C or 37D). In other words, the conventional EPS bearer context status IE as shown in FIG. 37A is coded as shown in FIG. 37B or, in a case where an extended EPS bearer is used additionally, the extended EPs bearer context status may be used to indicate whether it is active or inactive for the extended EPS bearer as shown in FIG. 37C or 37D.

This is for the UE 3111 to notify the network of EPS bearer context active inside the UE 3111. In particular, in a case where the extended EPS bearer identity is supported, it may be indicated by the method set forth in the present disclosure that the extended bearer is active.

The EPS bearer identity value used in this step may be configured as shown in FIG. 35.

FIG. 35 illustrates a configuration of an EPS bearer identity information element (IE) according to an embodiment of the present disclosure.

FIGS. 36A and 36B illustrate a specific coding scheme of an EPS bearer identity information element (IE) according to an embodiment of the present disclosure. The EPS bearer identity information element (IE) of FIG. 35 may be coded and interpreted as shown in FIG. 36A or 36B.

The UE's EPS bearer context status information element (IE) which is used to notify the network whether the UE's EPS bearer has been activated may be configured in the form as shown in FIG. 37A, and its coding may be configured as shown in FIG. 38 or 37B.

In the configuration and coding scheme of FIGS. 37A and 38, the reserved bit may be used to indicate that the extended EPS bearer identity is active. FIG. 37C illustrates a configuration of an extended EPS bearer context status information element (IE) used to indicate that an extended EPS bearer identity is active according to an embodiment of the present disclosure, and FIG. 37D illustrates a coding scheme for FIG. 37C. In other words, the EPS bearer context status IE of FIG. 37A is coded as shown in FIG. 37B or, in a case where there is additionally an extended EPS bearer, the configuration of the extended EPS bearer context status of FIG. 37C may be used to indicate whether it is active or inactive for the extended EPS bearer. The coding scheme of FIG. 37D may be used for the configuration of FIG. 37C.

Such an EPS bearer context status information element (IE) is used, e.g., for the UE to notify the network whether the EPS bearer has been activated or, in another embodiment, for the network to notify the UE whether the EPS bearer has been activated.

As such, to identify up to 15 EPS bearer identities, as compared with the conventional art which identifies eight EPS bearer identities, the UE is configured to be able to identify the EPS bearer identities, and the network system, particularly the MME, which communicates with the UE is configured to be aware of the fact that the UE has the capability for identifying the EPS bearer identities to process properly without packet drops.

Thus, the UE is configured to be able to give the network an indication for notifying the network of the fact that the UE has the capability for identifying the EPS bearer identities, and the network is configured to be able to interpret the UE appropriately to the UE's capability and process without packet drops.

FIG. 39 illustrates a configuration of a UE network capability IE used to notify the network of the indication. FIG. 40 illustrates a coding scheme as to how to interpret the received UE network capability IE value. In particular, in a case when the UE uses the extended EPS bearer identity values in the EXT EBI, i.e., when more bearers are used, the UE needs to send to the network, with the EXT EBI bit set to 1, on, so that the corresponding bearers are used.

Receiving the transmission with the EXT EBI set to on, from the UE, the network entity is configured to be able to recognize that the UE communicating with the network has the corresponding capability and process as follows:

1) Although any one EPS bearer identity value among 1 to 4 (i.e., 1, 2, 3, and 4) is transmitted, the network entity may process packets as it normally does without packet drops.

2) For the network entity and UE which use the EPS bearer context status information element (IE) for mobility management and session management, one needs to notify the other that the corresponding bearer among 1 to 4 has been activated, with the corresponding bit set to on, i.e., 1, so as to enable communication therebetween.

Figure 41:
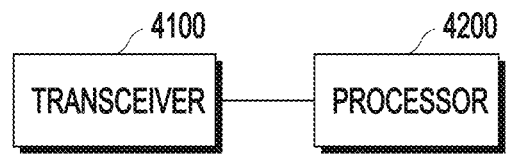
FIG. 41 is a block diagram illustrating a terminal according to an embodiment of the present disclosure.

FIG. 41 is a block diagram illustrating a terminal according to an embodiment of the present disclosure.

The terminal includes a transceiver 4100 and a processor 4200. Here, the terminal may be referred to as a terminal, UE, WTRU, device, or STA.

As an example, the processor 4200 may control the transceiver 4100 to transmit a message including session-related information.

Figure 42:
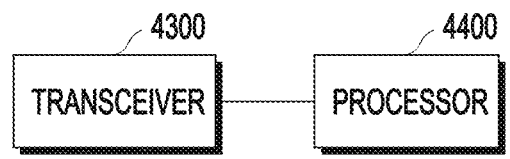
FIG. 42 is a block diagram illustrating a base station according to an embodiment of the present disclosure.

FIG. 42 is a block diagram illustrating a network node according to an embodiment of the present disclosure. The network node may be, e.g., a base station (e.g., an eNB or gNB).

The base station includes a transceiver 4300 and a processor 4400.

As an example, the processor 4400 may control the transceiver 4300 to receive a message including session-related information.

Various embodiments of the present disclosure relate to a scheme for network access and data transfer by a terminal, which is applicable to communication systems, a method for transmitting information by a terminal and a network, and an apparatus for performing the same.

First Embodiment

Figure 43:
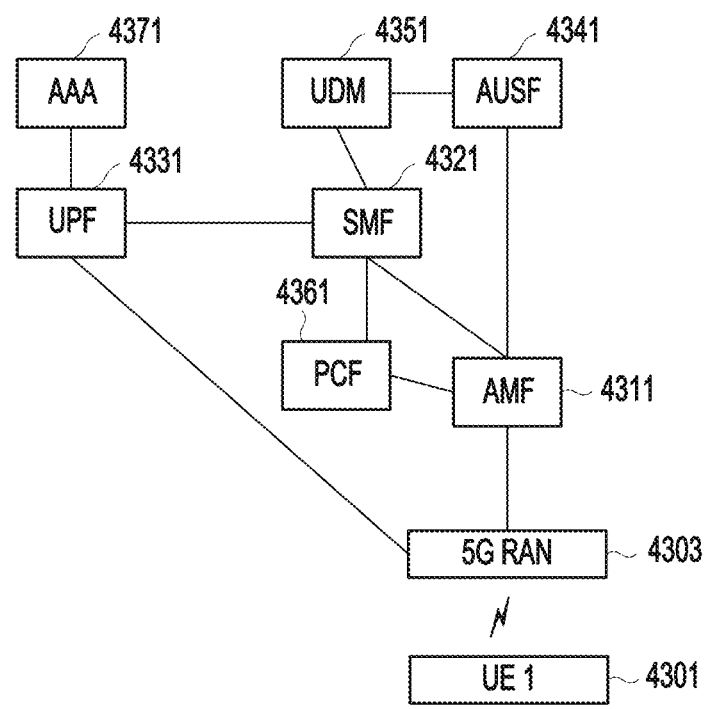
FIG. 43 illustrates an example of network environment in a 5G system according to an embodiment of the present disclosure.

FIG. 43 illustrates an example of network environment in a 5G system according to an embodiment of the present disclosure.

In an embodiment of the present disclosure, a user plane function (UPF) 4331, a session management function (SMF) 4321, an access and mobility management function (AMF) 4311, a 5G radio access network (RAN) 4303, a user data management (UDM) 4351, and a policy control function (PCF) 4361 constitute a network system under the assumption of 5G network. Meanwhile, the system may also include an authentication server function (AUSF) 4341 and an authentication-authorization-and-accounting (AAA) 4371 for authentication purposes. Here, the 5G RAN 4303 may be a base station (e.g., a gNB) supporting the 5G network. Further, the gNB may be specified in 3GPP TS 38.300. As an example, the PCF 4361 may determine a policy of session management or mobility management and transfer the policy to the AMF 4311 or SMF 4321, thereby performing proper mobility management, session management, or QoS management. The AUSF 4341 may store data for authentication of the UE, and the UDM 4351 may store subscription data or policy data of the user. The AAA 4371 may perform such functions as authentication, authorization, or account management.

The communication network on which the present disclosure is based is assumed to be a 5G network, but the same concept may also be applicable to other systems within a category one of ordinary skill may appreciate.

Figure 44:
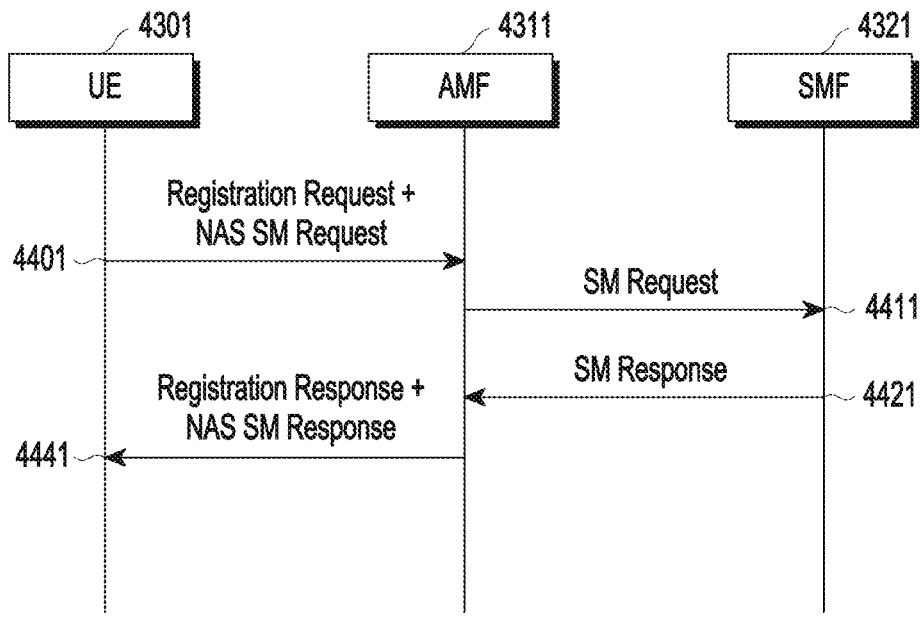
FIG. 44 illustrates an example of transmitting messages related to registration and session by a terminal in a 5G system according to an embodiment of the present disclosure.

FIG. 44 illustrates an example of transmitting messages related to registration and session by a terminal and a 5G system according to an embodiment of the present disclosure.

In step 4401, a registration request message is sent from a UE 4301 to an AMF 4311, and a NAS SM request message is sent from the UE 4301 to the AMF 4311 so that an SM request message is sent from the UE 4301 through the AMF 4311 to the SMF 4321. In an embodiment, the format of the message may be configured as in Table 1 below (NAS registration request+NAS SM request message).

TABLE 1

| IEI | Information Element | Type/Reference | Presence | Format | Length |
|---|---|---|---|---|---|
| | Extended Protocol Discriminator | Extended Protocol Discriminator | M | V | 1 |
| | Security Header type 또는 PDU session identity | Security Header type 또는 PDU session identity | M | V | 1/2 |
| | Spare half octet | Spare half octet | M | V | 1/2 |
| | Procedure Transaction Identity | Procedure Transaction Identity | M | V | 1 |
| | Registration request Message identity | Message type | M | V | 1 |
| | Registration type | | M | V | |

TABLE 1-continued

| IEI | Information Element | Type/Reference | Presence | Format | Length |
|---|---|---|---|---|---|
| | Request type | | M | V | |
| | Key set identifier | Key set identifier | M | V | 1/2 |
| | Mobile identity | Mobile identity | M | LV | 5-12 |
| | Network capability | Network capability | M | LV | 3-14 |
| | Old mobile identity | Mobile identity | M | TLV | 13 |
| | PDN update type | | M | V | |
| | NAS SM Message container type | SM message container type | M | LV | 1 |
| | NAS SM message container | SM message container | M | LV | 5-n |

In Table 1 above, the PDU session identity plays a role to identify PDU session flows. The procedure transaction identifier serves to identify procedure transactions.

Referring to Table 1, the registration type distinguishes between initial access and location update access in registration. Meanwhile, in another embodiment, the registration type may include an indication as to whether it is access by handover, access by emergency, addition of normal access to emergency access, transformed access from normal to emergency access, or handover of an emergency bearer.

In another embodiment, the registration type distinguishes between initial access and location update access in registration. The request type may include an indication as to whether it is access by handover, access by emergency, addition of normal access to emergency access, transformed access from normal to emergency access, or handover of an emergency bearer.

Referring to Table 1, the PDN update type is used to determine whether to activate the existing bearer. In other words, the PDN update type may perform the function of being able to indicate whether there is activation. Meanwhile, there may be added the function of being able to request to establish an additional bearer other than the existing bearer.

Referring to Table 1, the mobile identity may be the identifier of the UE used for current registration or current location update.

Referring to Table 1, the old mobile identity may be an identity used for cases where there is existing registration and include information, e.g., 5G GUTI, NAI, or IMEI, which is used in the 3GPP network. This identity may be used to look up, e.g., information related to the UE which has previously been accessed and used.

Referring to Table 1, the key set identifier is an identifier used to store security-related information upon communication between the UE and network entity and look up the information.

Referring to Table 1, the NAS SM message container may be used to transfer the session management message. The message transferable in the NAS SM message container may be, e.g., PDU session establishment related to session management and, in the above embodiment, the PDU session establishment may belong to such message.

In step 4411, the SM request which is a message for the session request transferred from the UE 4301 is transferred from the AMF 4311 to the SMF 4321 via an SM request message. At this time, the SM request message of the NAS SM message container IE in the NAS Registration request+ NAS SM request message of Table 1 is transferred from the AMF 4311 to the SMF 4321.

In step 4421, the response message responsive to the SM request to be transferred from the SMF 4321 to the UE 4301 is transmitted from the SMF 4321 to the AMF 4311. The response message may include, e.g., an SM request accept, SM request reject, or SM request failure.

First of all, the SM request accept is described as an example in the present disclosure. However, this is merely for ease of description, and the present disclosure is not limited thereto.

In step 4441, a response to the SM request transmitted to the AMF 4311 for transfer from the SMF 4321 to the UE 4301 and a response to the registration are together transmitted from the AMF 4311 to the UE 4301.

An embodiment of the registration response+NAS response message transmitted from the AMF to the UE may be configured as in Table 2 below (NAS registration accept+ NAS SM accept message). Such a NAS registration response message may be, e.g., a NAS registration accept, registration reject, or registration failure. In the instant embodiment, the registration accept is described as an example.

TABLE 2

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Registration Accept Message identity | Message type | M | V | 1 |
| | Registration result | | M | V | |
| | TAI list | | M | LV | |
| | PDN update result | | M | V | |
| | NAS SM Message container type | | M | LV | 1 |
| | NAS SM message container | | M | LV | 3-n |
| | Mobile identity | | O | TLV | |
| | PDN bearer status | | O | TLV | |

Referring to Table 2 above, the registration result is used to indicate the result of access. The registration result is used to indicate the result of location update. In particular, in a case where there is something to be updated along with location update, the registration result is used to activate the corresponding function.

Referring to Table 2, the PDN bearer status may be used to indicate the status of PDN bearer.

In an embodiment, the NAS SM message container type may be used to identify what message is carried over the NAS SM message container.

In another embodiment, the NAS SM message container may be used to identify what message is carried over the container.

Figure 45:
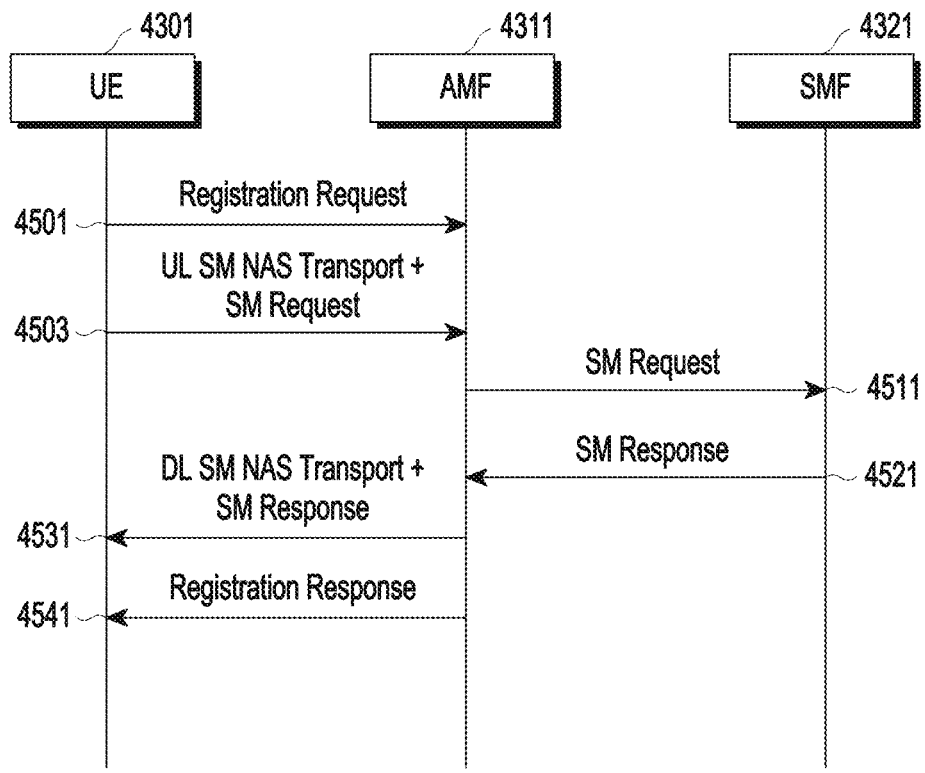
FIG. 45 illustrates an example of transmitting messages related to registration and session by a terminal in a 5G system according to another embodiment of the present disclosure.

FIG. 45 illustrates an example of transmitting messages related to registration and session by a terminal in a 5G system according to an embodiment of the present disclosure.

In step 4501, the UE 4301 sends a registration request message to the AMF 4311.

The format of the message may be configured as in Table 3 below (NAS registration request) in an embodiment.

TABLE 3

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Registration request Message identity | Message type | M | V | 1 |
| | Registration type | | M | V | |
| | Request type | | M | V | |
| | Key set identifier | | M | V | |
| | Mobile identity | | M | V | |
| | Network capability | | M | V | |
| | Old mobile identity | | M | V | |
| | PDN update type | | M | V | |

In step 4503, the UE 4301 sends a NAS SM request message to the AMF 4311 to send an SM request message from the UE 4301 via the AMF 4311 to the SMF 4321 through a NAS transport message. As an example, the format of the message may be configured as shown in Table 4 below (UL SM NAS transport+NAS SM request message).

TABLE 4

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL SM NAS transport Message identity | Message type | M | V | 1 |
| | Request type | | M | V | 1/2 |
| | PDN type | | M | V | 1/2 |
| | SM message container type | SM message container type | M | V | 1 |
| | SM message container | SM message container | M | LV-E | 3-n |
| | DNN (data network) name | | O | TLV | 3-102 |
| | SNSSAI | | O | TLV | |

Referring to Table 4, the UL SM NAS transport message identity is an identity used for identifying the UL SM NAS transport message and it identifies the UL SM NAS transport message among message types.

Referring to Table 4, as an embodiment, the request type may include an indication as to whether it is access by handover, access by emergency, addition of normal access to emergency access, transformed access from normal to emergency access, or handover of an emergency bearer.

Referring to Table 4, the PDN type includes information indicating the PDN type, e.g., as to whether the bearer is IPv4 or IPv6. The DNN name is used for identifying the data network. The SNSSAI is information used for identifying the network slice with single network slice selection assistance information.

Referring to Table 4, in an embodiment, the SM message container type may be used to identify what message is carried over the SM message container. In an embodiment, the message transferred may be identified as to whether it is a PDN session establishment or modify.

Referring to Table 4, in another embodiment, the SM message container may be used to identify what message is carried over the container. In other words, in an embodiment, the message transferred may be identified as to whether it is a PDN session establishment or modify.

Referring to Table 4, the SM message container may be used to transfer the session management message. The message transferable in the NAS SM message container may be, e.g., PDN session establishment related to session management and, in the above embodiment, the PDU session establishment may belong to such message.

In another embodiment, the UL SM NAS transport+NAS SM request message may be configured as shown in Table 5 below.

TABLE 5

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Request type | | M | V | 1/2 |
| | Transport type (UL SM NAS transport type) | | M | V | 1 |
| | PDN type | | M | V | 1/2 |
| | SM message container type | SM message container type | M | V | 1 |
| | SM message container | SM message container | M | LV-E | 3-n |
| | DNN (data network) name | | O | TLV | 3-102 |
| | SNSSAI | | O | TLV | |

Referring to Table 5, as an embodiment, there may be included a type for identifying what type the transported NAS message is. In other words, the type information may distinctively identify whether the transported information is a session management, short message (SMS), or user application or user-related data information.

Referring to Table 5, if the transported message is an SM message, in a case where the SM message is included, the SM message container type or SM message container may be included as in the embodiment of Table 4-2.

In another embodiment, the UL SM NAS transport+NAS SM request message may be configured as shown in Tables 6 and 7 below.

TABLE 6

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |

TABLE 6-continued

| IEI | Information Element | Type/Reference | Presence | Format | Length |
|---|---|---|---|---|---|
| | UL NAS transport Message identity | Message type | M | V | 1 |
| | Request type | | M | V | 1/2 |
| | Transport type (SM NAS transport type) | | M | V | 1 |
| | PDN type | | M | V | 1/2 |
| | SM message container type | SM message container type | M | V | 1 |
| | SM message container | SM message container | M | LV-E | 3-n |
| | DNN (data network) name | | O | TLV | 3-102 |
| | SNSSAI | | O | TLV | |

TABLE 7

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL NAS transport Message identity | Message type | M | V | 1 |
| | Request type | | M | V | 1/2 |
| | Transport type (SM NAS transport type) | | M | V | 1 |
| | PDN type | | M | V | 1/2 |
| | SM message container | SM message container | M | LV-E | 3-n |
| | DNN (data network) name | | O | TLV | 3-102 |
| | SNSSAI | | O | TLV | |

In other words, the message type is used to identify whether the message is a UL NAS transport message or DL NAS transport message.

Referring to Tables 6 and 7, the transport type is used to identify whether the transport type is an SM NAS transport type.

Referring to Tables 6 and 7, the transmitted SM message container is included.

Referring to Tables 6 and 7, the SM message container type may be identified.

Referring to FIG. 45, in step 4511, the SM request which is a message for the session request transferred from the UE 4301 is transferred from the AMF 4311 to the SMF 4321 through an SM request message. At this time, the SM request message of the NAS SM message container IE in the UL SM NAS transport+NAS SM request message is transferred from the AMF 4311 to the SMF 4321.

Referring to FIG. 45, in step 4521, the response message responsive to the SM request to be transferred from the SMF 4321 to the UE 4301 is transmitted from the SMF 4321 to the AMF 4311. The response message may include, e.g., an SM request accept, SM request reject, or SM request failure.

The SM request accept is described below as an example. However, this is merely for ease of description, and the present disclosure is not limited thereto.

Referring to FIG. 45, in step 4531, a DL SM NAS transport message is transmitted from the AMF 4311 to the UE 4301.

Table 8 below shows an example of the DL SM NAS transport+NAS SM accept message.

TABLE 8

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL SM NAS transport Message identity | Message type | M | V | 1 |
| | SM message container type | SM message container type | M | V | 1 |
| | SM message container | SM message container | M | LV-E | 3-n |
| | Protocol configuration option | | O | TLV | 3-n |

Referring to Table 8, the DL SM NAS transport message identity is an identity used for identifying the DL SM NAS transport message and it identifies the DL SM NAS transport message among message types.

Referring to Table 8, in an embodiment, the SM message container type may be used to identify what message is carried over the SM message container. In an embodiment, the message transferred may be identified as to whether it is a PDN session establishment result (e.g., success).

Referring to Table 8, in another embodiment, the SM message container may be used to identify what message is carried over the container. In other words, in an embodiment, the message transferred may be identified as to whether it is a PDN session establishment result.

Referring to Table 8, the SM message container may be used to transfer the session management message. The message transferable in the NAS SM message container may be, e.g., PDN session establishment or PDN session establishment response (result) related to session management and, in the above embodiment, the PDU session establishment response (result) may belong to such message.

In another embodiment, the DL SM NAS transport+NAS SM accept message may be configured as shown in Table 9 below.

TABLE 9

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (DL SM NAS transport type) | | M | | 1 |
| | SM message container type | SM message container type | M | V | 1 |
| | SM message container | SM message container | M | LV-E | 3-n |
| | Protocol configuration option | | O | TLV | 3-n |

Referring to Table 9, as an embodiment, there may be included a type for identifying what type the transported NAS message is. In other words, the type information may distinctively identify whether the transported information is a session management, short message service (SMS), or user application or user-related data information.

Referring to Table 9, if the transported message is an SM message, in a case where the SM message is included, the SM message container type or SM message container may be included as in the embodiment of Table 5-2.

Referring to Table 9 below, the message type is used to identify whether the message is a UL NAS transport message or DL NAS transport message.

Referring to Table 9, the transport type is used to identify whether the transport type is an SM NAS transport type.

Referring to Table 9, the transmitted SM message container is included.

Referring to Table 9, according to an embodiment, the SM message container type may be identified.

Referring to FIG. 45, in step 4541, a response to registration is transmitted from the AMF to the UE.

As an embodiment of the registration response message transmitted from the AMF 4311 to the UE 4301, the registration response message may be configured as in Table 10 below (NAS registration accept). Such a NAS registration response message may be, e.g., a NAS registration accept, registration reject, or registration failure. The registration accept is described below as an example. However, this is merely for ease of description, and the present disclosure is not limited thereto.

TABLE 10

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Registration Accept Message identity | Message type | M | V | 1 |
| | Registration result | | M | V | |
| | TAI list | | M | LV | |
| | PDN update result | | M | V | |
| | Mobile identity | | O | TLV | |
| | PDN bearer status | | O | TLV | |

The SM message container used in the above procedure may be configured as shown in Table 11 below.

TABLE 11

| 8 | 7 | 6 | 5 | 4 | 3 | 2 | 1 | |
|---|---|---|---|---|---|---|---|---|
| SM message container IEI | | | | | | | | Octet 1 |
| Length of SM message container contents | | | | | | | | Octet 2 |
| | | | | | | | | Octet 3 |
| SM message container contents | | | | | | | | Octet 4 |
| | | | | | | | | ... |
| | | | | | | | | Octet n |

Figure 46:
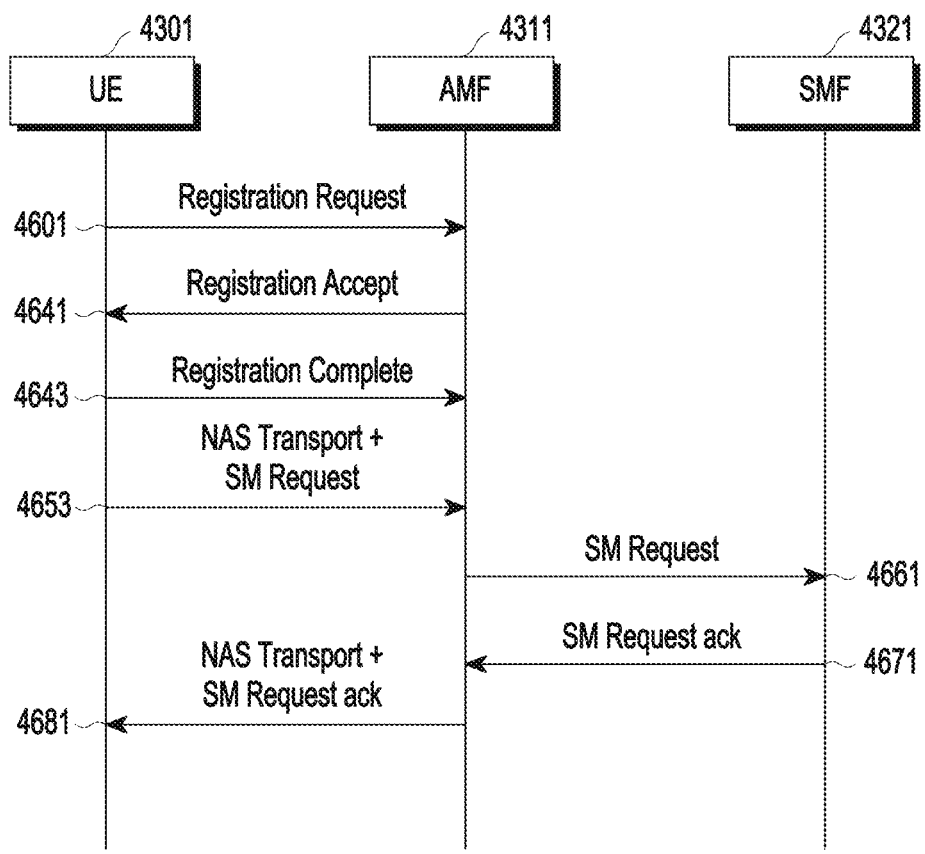
FIG. 46 illustrates an example of transmitting messages related to registration and session by a terminal in a 5G system according to an embodiment of the present disclosure.

FIG. 46 illustrates an example of transmitting messages related to registration and session by a terminal in a 5G system according to an embodiment of the present disclosure. In step 4601, the UE 4301 sends a registration request message to the AMF 4311.

Meanwhile, according to an embodiment, the format of the message may be configured as in Table 12 below (NAS registration request).

TABLE 12

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Registration request Message identity | Message type | M | V | 1 |
| | Registration type | | M | V | |
| | Request type | | M | V | |
| | 5G Key set identifier | | M | V | |
| | Mobile identity | | M | V | |
| | Network capability | | M | V | |
| | SM capability | | | | |
| | Old mobile identity | | M | V | |
| | PDN update type | | M | V | |
| | PDU session status | | | | |
| | Uplink data status | | | | |
| | PDU session reactivation | | | | |
| | Last visited registered TAI | | | | |
| | Requested NSSAI | | | | |
| | Mapping of requested NSSAI | | | | |

Referring to Table 12 above, the PDU session identity plays a role to identify PDU session flows. The procedure transaction identifier serves to identify procedure transactions.

Referring to Table 12, the registration type distinguishes between initial access and location update access in registration. Meanwhile, in another embodiment, the registration type may include an indication as to whether it is access by handover, access by emergency, addition of normal access to emergency access, transformed access from normal to emergency access, or handover of an emergency bearer.

Referring to Table 12, in another embodiment, the registration type distinguishes between initial access and location update access in registration. The request type may include an indication as to whether it is access by handover, access by emergency, addition of normal access to emergency access, transformed access from normal to emergency access, Referring to Table 12, it may include an indication as to whether it is handover of emergency bearer.

Referring to Table 12, the PDN update type is used to determine whether to activate the existing bearer. In other words, the PDN update type may perform the function of being able to indicate whether there is activation. Meanwhile, there may be added the function of being able to request to establish an additional bearer other than the existing bearer.

Referring to Table 12, the mobile identity may be the identifier of the UE used for current registration or current location update.

Meanwhile, the NAS registration request may further include a UE network capability field, and the UE network capability includes information such as the security algorithm supported and whether dual registration is supported. The NAS registration request may also include information about whether the number of extended PDU sessions is included.

The NAS registration request may further include a UE network capability field, and the UE SM capability is an IE used to indicate information related to PDU session management. As an example, the UE SM capability may indicate whether relative QoS is supported.

Referring to Table 12, the old mobile identity may include information, e.g., 5G GUTI, NAI, or IMEI, which is used in the 3GPP network, as an identifier used for cases where there is existing registration. The old mobile identity may be used to look up, e.g., information related to the UE which has previously been accessed and used.

Referring to Table 12, the 5G key set identifier is an identifier used to store security-related information upon communication between the UE and network entity and look up information.

Referring to Table 12, the PDU session status (or PDU session status information element (IE)) is used for notifying the network whether the UE's PDU session has been activated.

The PDU session status (or PDU session status IE) is used for notifying the network whether the UE's PDU session has previously been activated according to an embodiment or, according to another embodiment, the PDU session status (or PDU session status IE) may be used for the UE to send a request for reactivation of a specific PDU session to the network, or according to still another embodiment, the PDU session status (or PDU session status IE) may be used for the network receiving a request for PDU session reactivation from the network to notify the UE of the result of reactivation of a specific PDU session.

The PDU session status (or PDU session status IE) may be used for the UE to notify the network whether the PDU session has previously been activated.

As another embodiment, the PDU session reactivation IE may be used for the UE to send a request for reactivating a specific PDU session to the network.

As still another embodiment, the PDU session reactivation result IE may be used for the network, which has received a request for PDU session reactivation from the UE, to notify the UE of the result of reactivation of a specific PDU session.

Meanwhile, in another embodiment, the uplink data status IE may be included in a message that the UE sends to the AMF. If the AMF 4311 receives the IE (e.g., the uplink data status), the AMF notifies the SMF of reactivation of the user plane for the corresponding PDU session.

Referring to FIG. 46, in step 4611, a registration accept message is transmitted from the AMF 4311 to the UE 4301.

As an embodiment, the registration response message transmitted from the AMF 4311 to the UE 4301 may be configured as in Table 13 below (NAS registration accept). Such a NAS registration response message may be, e.g., a NAS registration accept, registration reject, or registration failure. The registration accept is described below as an example. However, this is merely for ease of description, and the disclosure is not limited thereto.

TABLE 13

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |

TABLE 13-continued

| IEI | Information Element | Type/Reference | Presence | Format | Length |
|---|---|---|---|---|---|
| | Spare half octet | Spare half octet | M | V | 1/2 |
| | Procedure Transaction Identity | Procedure Transaction Identity | M | V | 1 |
| | Registration Accept Message identity | Message type | M | V | 1 |
| | Registration result | | M | V | |
| | TAI list | | M | LV | |
| | PDN update result | | M | V | |
| | 5G GUTI | | | | |
| | Mobile identity | | O | TLV | |
| | PDN bearer status | | O | TLV | |
| | PDU session status | | | | |
| | PDU session reactivation result | | | | |
| | Allowed NSSAI | | | | |
| | Mapping of Allowed NSSAI | | | | |

Referring to Table 13 above, the registration result is used to indicate the result of access. The registration result is used to indicate the result of location update. In particular, in a case where there is something to be updated along with location update, the registration result is used to activate the corresponding function.

Referring to Table 13, the PDN bearer status may be used to indicate the status of PDN bearer.

Referring to Table 13, as an example, the NAS SM message container type may be used to identify what message is carried over the NAS SM message container.

Referring to Table 13, as another example, the NAS SM message container may be used to identify what message is carried over the container.

Referring to Table 13, the 5G GUTI may indicate the identity of the UE used in 5G.

Referring to Table 13, the PDU session status IE may be used for the network to notify the UE whether the PDU session has been activated as an example or may be used for the network receiving a request for reactivation of a PDU session from the UE to notify the UE of the result of reactivation of a specific PDU session as another example.

The PDU session status IE may be used for the network to notify the UE whether the PDU session has been activated.

Referring to Table 13, the PDU session reactivation result IE may be used for the network, which has received a request for PDU session reactivation from the UE, to notify the UE of the result of reactivation of a specific PDU session.

Referring to FIG. 46, in step 4643, a registration complete message is transmitted from the UE 4301 to the AMF 4311.

Referring to FIG. 46, in step 4653, an SM request message is transmitted over a NAS transport from the UE 4301 to the AMF 4311. In step 4661, an SM request is transmitted from the AMF 4311 to the SMF 4321.

Referring to FIG. 46, in step 4671, an SM request acknowledgement (ack) is transmitted from the SMF 4321 to the AMF 4311. Referring to FIG. 46, in step 4681, an SM request ack message is transmitted over a NAS transport from the AMF to the UE.

The allowed NSSAI used in Table 13 above may be configured with the parameters of the NSSAI information element of FIG. 57. FIG. 57 represents the parameters of the NSSAI information element and configures the NSSAI information element.

In other words, the allowed NASSAI may be configured as shown in FIG. 58 using the NSSAI information element of FIG. 57. FIG. 58 shows an example of the allowed NSSAI.

The allowed NSSAI may be configured of the length of contents of NSSAI, the number of S-NSSAIs included in the NSSAI, and multiple S-NSSAIs.

Among the parameters in FIG. 57 and FIG. 58, the S-NSSAI is configured as follows according to an embodiment.

In other words, the S-NSSAI included in FIG. 58 may be configured with the following parameters included in the information element of the S-NSSAI of FIG. 59. In other words, the S-NSSAI may include any one value of the type of S-NSSAI flag, S-NSSAI identifier, length of S-NSSAI contents, SST, and SD. Thus, the parameters from octet 2 to octet 7 of FIG. 59 may be used.

FIG. 59 specifies the configuration of the information element of the S-NSSAI.

Referring to FIG. 59, the TSF (type of S-NSSAI flag) is set to 0 if the S-NSSAI is used in the home PLMN to indicate that the S-NSSAI is used in the HPLMN and is set to 1 if the S-NSSAI is used in the visited PLMN to indicate that the S-NSSAI is used in the VPLMN. In sum, whether native S-NSSAI or mapped S-NSSAI depends on whether the TSF value is 0 or 1. The native S-NSSAI indicates the case where the S-NSSAI is used in the home PLMN, and the mapped S-NSSAI indicates the case where the S-NSSAI is used in the visited PLMN.

TABLE 17

| native S-NSSAI(for Home PLMN: HPLMN) |
| mapped S-NSSAI(for Visted PLMN VPLMN) |

Referring to FIG. 59, the S-NSSAI identifier is used for identifying the S-NSSAI.

Referring to FIG. 59, the slice/service type (SST) is used for distinguishing slices or services.

Referring to FIG. 59, the slice differentiator (SD) is used for identifying, e.g., providers who provide services in slices.

A second embodiment of the S-NSSAI is as follows.

In other words, according to another embodiment, the S-NSSAI may be configured with the following parameters included in the information element of the S-NSSAI. In other words, the S-NSSAI may include any one value of the type of S-NSSAI flag, S-NSSAI identifier, length of S-NS-SAI contents, SST, SD, mapped subscribed SST, and mapped subscribed SD value as follows. Here, the mapped subscribed SST and mapped subscribed SD may be used for indicating the subscribed SST and subscribed SD that may be mapped in the VPLMN for the S-NSSAI. Thus, the parameters from octet 2 to octet 11 of FIG. 60 may be used.

FIG. 60 specifies the configuration of the information element of the S-NSSAI according to another embodiment.

The mapping of allowed NSSAI used in the NAS registration accept message of Table 13 may be configured as shown in FIG. 61 using the configuration of the NSSAI information element of FIG. 61.

FIG. 61 represents the configuration of the NSSAI information element of FIG. 61 according to another embodiment.

The mapping of allowed NSSAI of FIG. 62 may be configured using the configuration of the NSSAI information element of FIG. 60.

Referring to FIG. 62, the mapping of allowed NSSAI may be configured of the length of contents of NSSAI, the number of S-NSSAIs included in the NSSAI, and multiple S-NSSAIs.

The configuration of the S-NSSAI parameter of FIG. 62 is as follows according to an embodiment.

Figure 63:
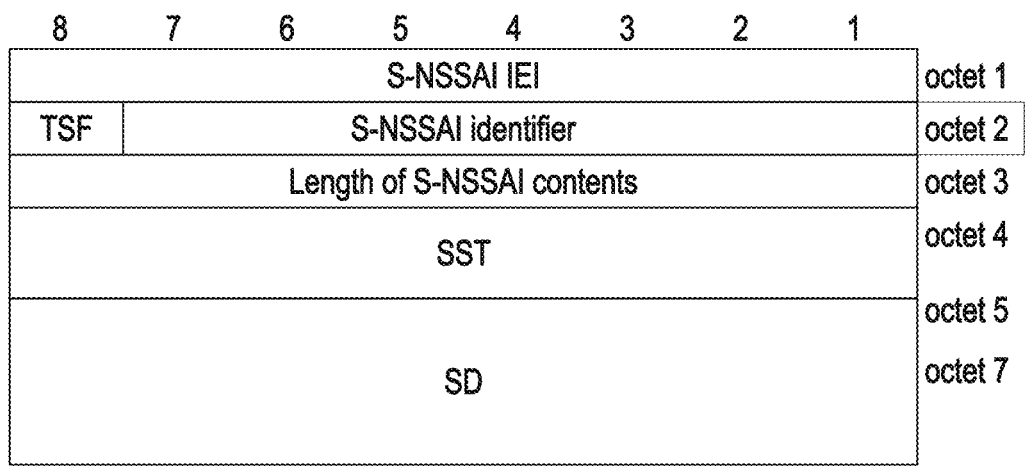
FIG. 63 illustrates a configuration of the S-NSSAI information element according to embodiments of the present disclosure.

The S-NSSAI included in FIG. 62 may be configured with the following parameters included in the information element of the S-NSSAI of FIG. 63. In other words, the S-NSSAI may include any one value of the type of S-NSSAI flag, S-NSSAI identifier, length of S-NSSAI contents, SST, and SD. Thus, the parameters from octet 2 to octet 7 of FIG. 63 may be used.

FIG. 63 specifies the configuration of the information element of the S-NSSAI.

Table 22 below regards a method of determining whether native S-NSSAI and mapped S-NSSAI depending on the TSF value of FIG. 63.

Referring to FIG. 63, the TSF (type of S-NSSAI flag) is set to 0 if the S-NSSAI is used in the home PLMN to indicate that the S-NSSAI is used in the HPLMN and Referring to FIG. 63, the TSF is set to 1 if the S-NSSAI is used in the visited PLMN to indicate that the S-NSSAI is used in the VPLMN.

TABLE 22

| native S-NSSAI(for Home PLMN: HPLMN) |
| mapped S-NSSAI(for Visted PLMN VPLMN) |

Referring to FIG. 63, the S-NSSAI identifier is used for identifying the S-NSSAI.

Referring to FIG. 63, the slice/service type (SST) is used for distinguishing slices or services.

Referring to FIG. 63, the slice differentiator (SD) is used for identifying, e.g., providers who provide services in slices.

The configuration of the S-NSSAI parameter of FIG. 62 is as follows according to another embodiment. Meanwhile, according to another embodiment, the S-NSSAI may be configured with the following parameters included in the information element of the S-NSSAI. In other words, the S-NSSAI may include any one value of the type of S-NSSAI flag, S-NSSAI identifier, length of S-NSSAI contents, SST, SD, mapped subscribed SST, and mapped subscribed SD value. Here, the mapped subscribed SST and mapped subscribed SD may be used for indicating the subscribe SST and subscribed SD that may be mapped in the VPLMN for the corresponding S-NSSAI.

FIG. 64 specifies the configuration of the information element of the S-NSSAI. In connection with FIG. 64, the configuration of the S-NSSAI information element used to indicate the S-NSSAI information in a case where there are several SNSSAIs mapped for the NSSAI available in the HPLMN is described.

In other words, if the TSF of octet 2 is native, i.e., if it is the S-NSSAI available in the HPLMN, in FIG. 64, using the configuration of the S-NSSAI of Table 22 representing the information element, there may be included several S-NSSAIs mapped thereto.

A method of interpreting information about the settings of the TSF value in FIG. 64 is represented as in Table 24. In other words, in FIG. 64, the TSF (type of S-NSSAI flag) is set to 0 if the S-NSSAI is used in the home PLMN to indicate that the S-NSSAI is used in the HPLMN and is set to 1 if the S-NSSAI is used in the visited PLMN to indicate that the S-NSSAI is used in the VPLMN.

TABLE 24

| native S-NSSAI(for Home PLMN: HPLMN) |
| mapped S-NSSAI(for Visted PLMN VPLMN) |

Referring to Table 22, the S-NSSAI identifier is used for identifying the S-NSSAI. The slice/service type (SST) is used for distinguishing slices or services.

Referring to Table 22, the slice differentiator (SD) is used for identifying, e.g., providers who provide services in slices.

For example, it is assumed that for the S-NSSAI identifier of octet 2 of FIG. 64, the S-NSSAI is assigned in the HPLMN, with the TSF set to 0. The total length of S-NSSAI contest set later indicates the total length, and the total number of mapped S-NSSAIs indicates the S-NSSAI of the VPLMM mapped to the S-NSSAI assigned in the corresponding HPLMN. Thereafter, octet 4 to octet 9 specify information about the S-NSSAI available in the corresponding home PLMN.

Meanwhile, in an embodiment, octet n to octet n+5 and octet m to octet m+5 are used to give mapping values of the SNSSAI in the VPLMN, available by mapping to the S-NSSAI of the home public land mobile network (PLMN) (e.g., the operator's network identification number) of octet 2 of FIG. 64. Thus, the TSF of octet 2 is set to 0, the TSF of octet n is set to 1, and the TSF of octet m is set to 1.

For example, if octet 2 has one allowed NSSAI in the home, there are two mapping of allowed NSSAIs in the VPLMN corresponding thereto, octet n to octet n+5 and octet m to octet m+5. In the following description, a scheme of configuring information about the allowed NSSAI and mapping of allowed NSSAI is exemplified.

One set of mapping of allowed NSSAI is configured as shown in FIG. 65.

Referring to FIG. 65, since there may be several mapping of allowed S-NSSAI identifiers (IDs), the configuration related to the mapping of allowed S-NSSAI identifier may be varied. FIG. 65 represents an example in which there are two.

In such a configuring scheme, it may be configured as shown in FIG. 66 to reduce information transmitted.

In such a configuring scheme, it may be configured as shown in FIG. 67 to reduce information transmitted.

As another embodiment, the allowed NSSAI and mapping of allowed NSSAI used in Table 13 above may be configured as shown in FIG. 68.

In other words, it may be configured as shown in FIG. 68 since information on the allowed NSSAI and information on the mapping of allowed NSSAI mapped thereto need to be sent.

The allowed NSSAI and the mapping of allowed NSSAI are optional parameters and are transmitted together as shown in Table 13.

The allowed NSSAI and mapping of allowed NSSAI may configure information as in the method of configuring the S-NSSAI of FIG. 68.

In other words, another embodiment of the allowed NSSAI and mapped S-NSSAI is as shown in FIG. 69.

The mapping of allowed NSSAI may be configured of the length of contents of NSSAI, the number of S-NSSAIs included in the NSSAI, and multiple S-NSSAIs.

Figure 70:
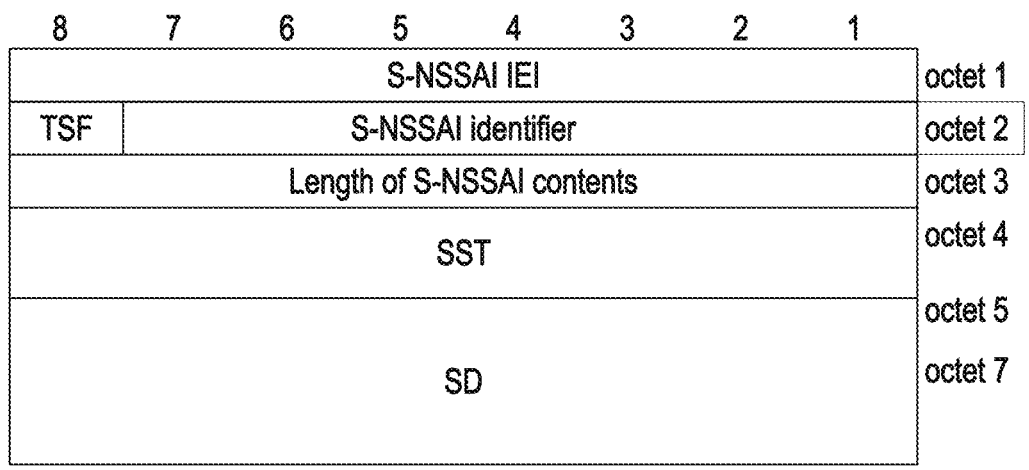
FIG. 70 illustrates a configuration of the S-NSSAI information element according to embodiments of the present disclosure.

The S-NSSAI included in FIG. 62 may be configured with the following parameters included in the information element (IE) of the S-NSSAI of FIG. 70. In other words, the S-NSSAI may include any one value of the type of S-NSSAI flag, S-NSSAI identifier, length of S-NSSAI contents, SST, and SD. Thus, the parameters from octet 2 to octet 7 of FIG. 70 may be used.

FIG. 70 specifies the configuration of the information element of the S-NSSAI.

In FIG. 70, the TSF has different meanings depending on whether it is 0 or 1 as shown in FIG. 71. In other words, the TSF (type of S-NSSAI flag) is set to 0 if the S-NSSAI is used in the home PLMN to indicate that the S-NSSAI is used in the HPLMN and Referring to FIG. 70, the TSF is set to 1 if the S-NSSAI is used in the visited PLMN to indicate that the S-NSSAI is used in the VPLMN.

Table 31 below regards determining the native S-NSSAI and mapped S-NSSAI information depending on the TSF value.

TABLE 31 native S-NSSAI(for Home PLMN: HPLMN)
mapped S-NSSAI(for Visted PLMN VPLMN)

Referring to Table 31, the S-NSSAI identifier is used for identifying the S-NSSAI.

Referring to Table 31, the slice/service type (SST) is used for distinguishing slices or services.

Referring to Table 31, the slice differentiator (SD) is used for identifying, e.g., providers who provide services in slices.

Meanwhile, according to another embodiment, the S-NSSAI may be configured with the following parameters included in the information element of the S-NSSAI. In other words, the S-NSSAI may include any one value of the type of S-NSSAI flag, S-NSSAI identifier, length of S-NSSAI contents, SST, SD, mapped subscribed SST, and mapped subscribed SD value. Here, the mapped subscribed SST and mapped subscribed SD may be used for indicating the subscribe SST and subscribed SD that may be mapped in the VPLMN for the corresponding S-NSSAI.

FIG. 71 specifies the configuration of the information element of the S-NSSAI.

If the TSF of octet 2 is native, i.e., if it is the S-NSSAI available in the HPLMN, in FIG. 71, there may be included several SNSSAIs mapped thereto.

In FIG. 71, the TSF has the same meaning as that of Table 33. In other words, the TSF (type of S-NSSAI flag) is set to 0 if the S-NSSAI is used in the home PLMN to indicate that the S-NSSAI is used in the HPLMN and The TSF is set to 1 if the S-NSSAI is used in the visited PLMN to indicate that the S-NSSAI is used in the VPLMN.

Table 33 below regards a scheme of determining the native S-NSSAI and mapped S-NSSAI information depending on the TSF value.

Table 33

TABLE 33 native S-NSSAI(for Home PLMN: HPLMN)
mapped S-NSSAI(for Visted PLMN VPLMN)

Referring to FIG. 71, the S-NSSAI identifier is used for identifying the S-NSSAI.

Referring to FIG. 71, the slice/service type (SST) is used for distinguishing slices or services.

Referring to FIG. 71, the slice differentiator (SD) is used for identifying, e.g., providers who provide services in slices.

FIG. 72 regards a scheme of indicating information on the S-NSSAI and information on the mapped NSSAI when there are several S-NSSAIs and mapped S-NSSAIs.

For example, it is assumed that for the S-NSSAI identifier of octet 2, the S-NSSAI is assigned in the HPLMN, with the TSF set to 0. The total length of S-NSSAI contest set later indicates the total length, and the total number of mapped S-NSSAIs indicates the S-NSSAI of the VPLMM mapped to the S-NSSAI assigned in the corresponding HPLMN. Thereafter, octet 4 to octet 9 specify information about the S-NSSAI available in the corresponding home PLMN (HPLMN).

Meanwhile, in an embodiment, octet n to octet n+5 and octet m to octet m+5 are used to give mapping values of the SNSSAI in the VPLMN, available by mapping to the S-NSSAI of the home PLMN (HPLMN) of octet 2. Thus, the TSF of octet 2 is set to 0, the TSF of octet n is set to 1, and the TSF of octet m is set to 1.

For example, if octet 2 has one allowed NSSAI in the home, there are two mapping of allowed NSSAIs in the VPLMN corresponding thereto, octet n to octet n+5 and octet m to octet m+5.

The mapping of allowed NSSAI may be expressed as shown in FIG. 73 using the scheme of representing the information of the mapped NSSAI as shown in FIG. 72. In other words, one set of mapping of allowed NSSAI is configured as shown in FIG. 73.

Referring to FIG. 73, since there may be several mapping of allowed S-NSSAIs, the configuration related to the mapping of allowed S-NSSAI identifier may be varied. In this embodiment, an example is suggested where there are two.

In such a configuring scheme, it may be configured as shown in FIG. 74 to reduce information transmitted.

In such a configuring scheme, it may be configured as shown in FIG. 75 to reduce information transmitted.

The requested NSSAI and the mapping of requested NSSAI in the registration accept message may be configured in various manners, such as the allowed NASSA or the mapping of NSSAI.

Second Embodiment

Figure 47:
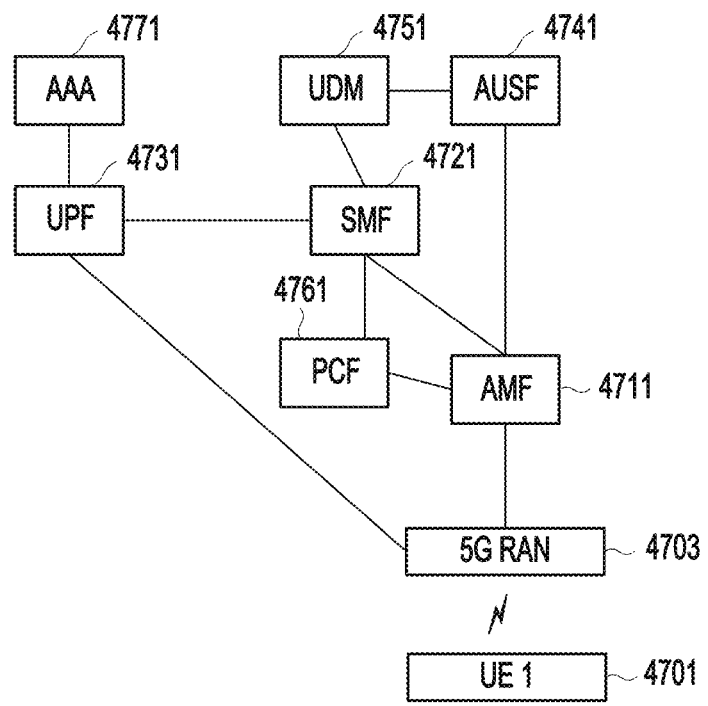
FIG. 47 illustrates an example of network environment in a 5G system according to an embodiment of the present disclosure.

FIG. 47 illustrates an example of a network environment in a 5G system according to an embodiment of the present invention.

In an embodiment of the disclosure, a user plane function (UPF) 4731, a session management function (SMF) 4721, an access and mobility management function (AMF) 4711, a 5G radio access network (RAN) 4703, a user data management (UDM) 4751, and a policy control function (PCF) 4761 constitute a network system under the assumption of 5G network. Meanwhile, the system may also include an authentication server function (AUSF) 4741 and an authentication-authorization-and-accounting (AAA) 4771 for authentication purposes. Here, the 5G RAN 4703 may be a base station (e.g., a gNB) supporting the 5G network. Further, the gNB may be specified in 3GPP TS 38.300. As an example, the PCF 4761 may determine a policy of session management or mobility management and transfer to the AMF 4711 or SMF 4721, thereby performing proper mobility management, session management, or QoS management. The AUSF 4741 may store data for authentication of the UE, and the UDM 4751 may store subscription data or policy data of the user. The AAA 4771 may perform such functions as authentication, authorization, or account management.

The communication network on which the disclosure is based is assumed to be a 5G network, but the same concept may also be applicable to other systems within a category one of ordinary skill may appreciate.

Figure 48:
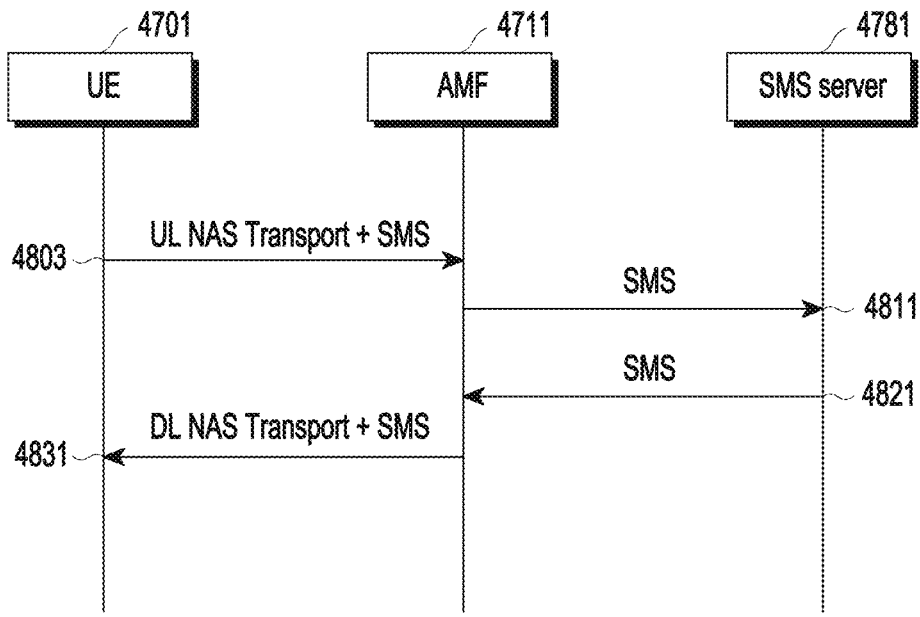
FIG. 48 illustrates an example scheme of transferring information by a terminal in a 5G system according to an embodiment of the present disclosure.

FIG. 48 illustrates an example of transmitting a 5G SMS message according to an embodiment of the present disclosure.

Referring to FIG. 48, in step 4803, the UE 4701 sends an SMS message to the AMF 4711 to send the SMS message from the UE 4701 via the AMF 4711 to the SMS server 4781 through a NAS transport message. The format of the message may be configured as in Table 38 below (UL SMS NAS transport) in an embodiment.

TABLE 38

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL SMS NAS transport Message identity | Message type | M | V | 1 |
| | SMS message container type | SMS message container type | M | V | 1 |
| | SMS message container | SMS message container | M | LV-E | 3-n |

Referring to Table 38, the UL SMS NAS transport message identity is an identity used for identifying the UL SMS NAS transport message and it identifies the UL SMS NAS transport message among message types.

Referring to Table 38, in an embodiment, the SMS message container type may be used to identify what message is carried over the SMS message container. As an example, it may be identified which one of short messages the transported message is.

Referring to Table 38, in an example, the SMS message container may be used to identify what message is carried over the container. In other words, in an embodiment, it may be identified which one of the short messages the transported message is.

Referring to Table 38, the SMS message container may be used to transfer the message of the shot message service.

In another embodiment, the format of the message may be configured as shown in Table 39 below.

TABLE 39

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (UL SMS NAS transport type) | | M | V | 1 |

TABLE 39-continued

| IEI | Information Element | Type/Reference | Presence | Format | Length |
|---|---|---|---|---|---|
| | SMS message container type | SMS message container type | M | V | 1 |
| | SMS message container | SMS message container | M | LV-E | 3-n |

Referring to Table 39, the transport type may be included for identifying what type the transported NAS message is. In other words, such type information may distinctively identify whether the transported information is a session management, short message service (SMS), or user application or user-related data information.

Referring to Table 39, if the transported message is an SMS message, in a case where the SMS message is included, the SMS message container type or SMS message container may be included as in the embodiment of Table 39.

In another embodiment, the format of the message may be configured as shown in Tables 40 and 41 below.

TABLE 40

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL NAS transport Message identity | Message type | M | V | 1 |
| | Transport type (SMS NAS transport type) | | M | V | 1 |
| | SMS message container type | SMS message container type | M | V | 1 |
| | SMS message container | SMS message container | M | LV-E | 3-n |

TABLE 41

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL NAS transport Message identity | Message type | M | V | 1 |
| | Transport type (SMS NAS transport type) | | M | V | 1 |
| | SMS message container | SMS message container | M | LV-E | 3-n |

In other words, the message type distinguishes whether the message is a UL NAS transport message or DL NAS transport message.

Referring to Tables 40 and 41, the transport type distinguishes whether the type is an SMS NAS transport type.

Referring to Tables 40 and 41, the transmitted SMS message container is included.

Referring to Tables 40 and 41, the SMS message container type is distinguished.

Referring to FIG. 48, in step 4811, the SMS message transferred from the UE 4701 is transferred from the AMF

4711 to the SMS server 4781. At this time, the SMS message of the SMS message container IE in the UL SMS NAS transport message is transferred from the AMF 4711 to the SMS server 4781.

Referring to FIG. 48, in step 4821, the SMS message to be transferred from the SMS server 4781 to the UE 4701 is transferred from the SMS server 4781 to the AMF 4711.

Referring to FIG. 48, in step 4831, a DL SMS NAS transport message is transmitted from the AMF 4711 to the UE 4701.

The format of the message may be configured as in Table 42 below (DL SMS NAS transport) in an embodiment.

TABLE 42

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL SMS NAS transport Message identity | Message type | M | V | 1 |
| | SMS message container type | SMS message container type | M | V | 1 |
| | SMS message container | SMS message container | M | LV-E | 3-n |

Referring to Table 42, the DL SMS NAS transport message identity is an identity used for identifying the DL SMS NAS transport message and it identifies the DL SMS NAS transport message among message types.

Referring to Table 42, in an embodiment, the SMS message container type may be used to identify what message is carried over the SMS message container.

Referring to Table 42, in another embodiment, the SMS message container may be used to identify what message is carried over the container. In other words, as an embodiment, it may be identified which SMS message is transferred in the message.

Referring to Table 42, the SMS message container may be used to transfer the SMS message. In other words, the SMS message is carried thereover.

In another embodiment, the format of the message may be configured as shown in Table 43 (DL SMS NAS transport) below.

TABLE 43

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (DL SMS NAS transport type) | | M | | 1 |
| | SMS message container type | SMS message container type | M | V | 1 |

TABLE 43-continued

| IEI | Information Element | Type/Reference | Presence | Format | Length |
|---|---|---|---|---|---|
| | SMS message container | SMS message container | M | LV-E | 3-n |
| | Protocol configuration option | | O | TLV | 3-n |

Referring to Table 43, the transport type may be included for identifying what type the transported NAS message is. In other words, such type information may distinctively identify whether the transported information is a session management, short message service (SMS), or user application or user-related data information.

Referring to Table 43, if the transported message is an SMS message, in a case where the SMS message is included, the SMS message container type or SMS message container may be included as in the embodiment of Table 43.

In another embodiment, the format of the message may be configured as shown in Tables 44 and 45 below.

TABLE 44

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (SMS NAS transport type) | | M | | 1 |
| | SMS message container type | SMS message container type | M | V | 1 |
| | SMS message container | SMS message container | M | LV-E | 3-n |
| | Protocol configuration option | | O | TLV | 3-n |

TABLE 45

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (SMS NAS transport type) | | M | | 1 |
| | SMS message container | SMS message container | M | LV-E | 3-n |
| | Protocol configuration option | | O | TLV | 3-n |

In other words, the message type is used to identify whether the message is a UL NAS transport message or DL NAS transport message.

Referring to Tables 44 and 45, the transport type is used to identify whether the type is an SMS NAS transport type.

Referring to Tables 44 and 45, the transmitted SMS message container is included.

Referring to Tables 44 and 45, the SMS message container type is distinguished.

The SMS message container used in the above procedure may be configured as shown in Table 46 below.

TABLE 46

| 8 | 7 | 6 | 5 | 4 | 3 | 2 | 1 |
|---|---|---|---|---|---|---|---|
| SMS message container IEI | | | | | | | |
| Length of SMS message container contents | | | | | | | |
| SMS message container contents | | | | | | | |

Figure 49:
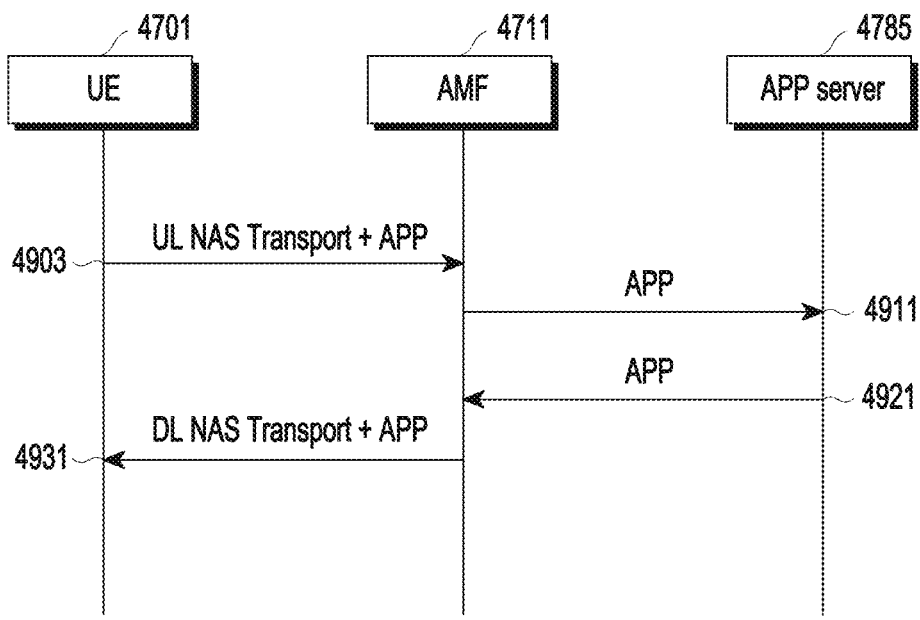
FIG. 49 illustrates an example scheme of transferring information by a terminal in a 5G system according to another embodiment of the present disclosure.

FIG. 49 illustrates an example of transmitting a 5G APP message according to an embodiment of the present disclosure.

Referring to FIG. 49, in step 4903, the UE 4701 sends an application message to the AMF 4711 to send the message from the UE via the AMF 4711 to the application server (APP server) 4785 through a NAS transport message. The format of the message may be configured as in Table 47 below (UL APP NAS transport) in an embodiment.

TABLE 47

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL APP NAS transport Message identity | Message type | M | V | 1 |
| | APP message container type | APP message container type | M | V | 1 |
| | APP message container | APP message container | M | LV-E | 3-n |

Referring to Table 47, the UL APP NAS transport message identity is an identity used for identifying the UL APP NAS transport message and it identifies the UL APP NAS transport message among message types.

Referring to Table 47, the APP message container type may be used to identify what message is carried over the APP message container. As an example, it may be identified which one of application-related pieces of information the transported message is. In other words, the APP message container type may indicate information for which application or protocol to be included.

Referring to Table 47, the APP message container may be used to identify what information is carried over the container. In other words, as an embodiment, it may be identified which information is transferred in the message.

Referring to Table 47, the APP message container may be used to transfer the application-related information. In other words, a message or information about what application or protocol is used may be transferred.

In another embodiment, the format of the message may be configured as shown in Table 48 below.

TABLE 48

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (UL APP NAS transport type) | | M | V | 1 |
| | APP message container type | APP message container type | M | V | 1 |
| | APP message container | APP message container | M | LV-E | 3-n |

In other words, as an embodiment, the transport type may be included for identifying what type the transported NAS message is. In other words, such type information may distinctively identify whether the transported information is a session management, short message service (SMS), or user application or user-related data information.

In other words, if the transported message is related to the application, the APP message container type or APP message container may be included as in the embodiment of Table 48.

In another embodiment, the format of the message may be configured as shown in Tables 49 and 50 below.

TABLE 49

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL NAS transport Message identity | Message type | M | V | 1 |
| | Transport type (APP NAS transport type) | | M | V | 1 |
| | APP message container type | APP message container type | M | V | 1 |
| | APP message container | APP message container | M | LV-E | 3-n |

TABLE 50

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |

TABLE 50-continued

| IEI | Information Element | Type/Reference | Presence | Format | Length |
|---|---|---|---|---|---|
| | UL NAS transport Message identity | Message type | M | V | 1 |
| | Transport type (APP NAS transport type) | | M | V | 1 |
| | APP message container | APP message container | M | LV-E | 3-n |

Referring to Tables 49 and 50 above, the message type is used to identify whether the message is a UL NAS transport message or DL NAS transport message.

Referring to Tables 49 and 50, the transport type is used to identify whether the type is an APP NAS transport type.

Referring to Tables 49 and 50, the transmitted APP message container is included.

Referring to Tables 49 and 50, an indication for identifying the APP message container type is included.

Referring to FIG. 49, in step 4911, the APP message transferred from the UE 4701 is transferred from the AMF 4711 to the APP server 4785. At this time, the APP message of the APP message container IE in the UL APP NAS transport message is transferred from the AMF 4711 to the APP server 4785.

Referring to FIG. 49, in step 4921, the APP message to be transferred from the APP server 4785 to the UE 4701 is transferred from the APP server 4785 to the AMF 4711.

Referring to FIG. 49, in step 4931, a DL APP NAS transport message is transmitted from the AMF 4711 to the UE 4701.

Here, the transferred message (i.e., DL APP NAS transport) is described with reference to Tables 51 to 54 below.

The DL APP NAS transport may be configured as shown in Table 51 according to an embodiment.

TABLE 51

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL APP NAS transport Message identity | Message type | M | V | 1 |
| | APP message container type | APP message container type | M | V | 1 |
| | APP message container | APP message container | M | LV-E | 3-n |

Referring to Table 51, the DL APP NAS transport message identity is an identity used for identifying the DL APP NAS transport message and it identifies the DL APP NAS transport message among message types.

Referring to Table 51, the APP message container type may be used to identify what message is carried over the APP message container.

Referring to Table 51, in another embodiment, which message is included in the container may be identified only with the information in the APP message container although the container type is not used. In other words, it may be identified which APP message is transferred in the message.

Referring to Table 51, the APP message container may be used to transfer the application- or protocol-related information or message.

The DL APP NAS transport may be configured as shown in Table 52 according to another embodiment.

TABLE 52

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (DL APP NAS transport type) | | M | | 1 |
| | APP message container type | APP message container type | M | V | 1 |
| | APP message container | APP message container | M | LV-E | 3-n |
| | Protocol configuration option | | O | TLV | 3-n |

Referring to Table 52, the transport type may be included for identifying what type the transported NAS message is. In other words, such type information may distinctively identify whether the transported information is a session management, short message service (SMS), or user application or user-related data information.

Referring to Table 52, if the transported message is application information, protocol-related information, or a message, the APP message container type or APP message container may be included as in the embodiment of Table 52.

The DL APP NAS transport may be configured as shown in Tables 53 and 54 according to another embodiment.

TABLE 53

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (APP NAS transport type) | | M | | 1 |
| | APP message container type | APP message container type | M | V | 1 |
| | APP message container | APP message container | M | LV-E | 3-n |
| | Protocol configuration option | | O | TLV | 3-n |

TABLE 54

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (APP NAS transport type) | | M | | 1 |
| | APP message container | APP message container | M | LV-E | 3-n |
| | Protocol configuration option | | O | TLV | 3-n |

In other words, the message type is used to identify whether the message is a UL NAS transport message or DL NAS transport message.

Referring to Tables 53 and 54, the transport type is used to identify whether the type is an APP NAS transport type.

Referring to Tables 53 and 54, the transmitted APP message container is included.

Referring to Tables 53 and 54, the APP message container type may be identified. In other words, the APP message container type may be included.

The APP message container of Tables 53 and 54 may be configured as shown in Table 55 below.

TABLE 55

| 8 | 7 | 6 | 5 | 4 | 3 | 2 | 1 |
|---|---|---|---|---|---|---|---|
| APP message container IEI | | | | | | | |
| Length of APP message container contents | | | | | | | |
| APP message container contents | | | | | | | |

Figure 50:
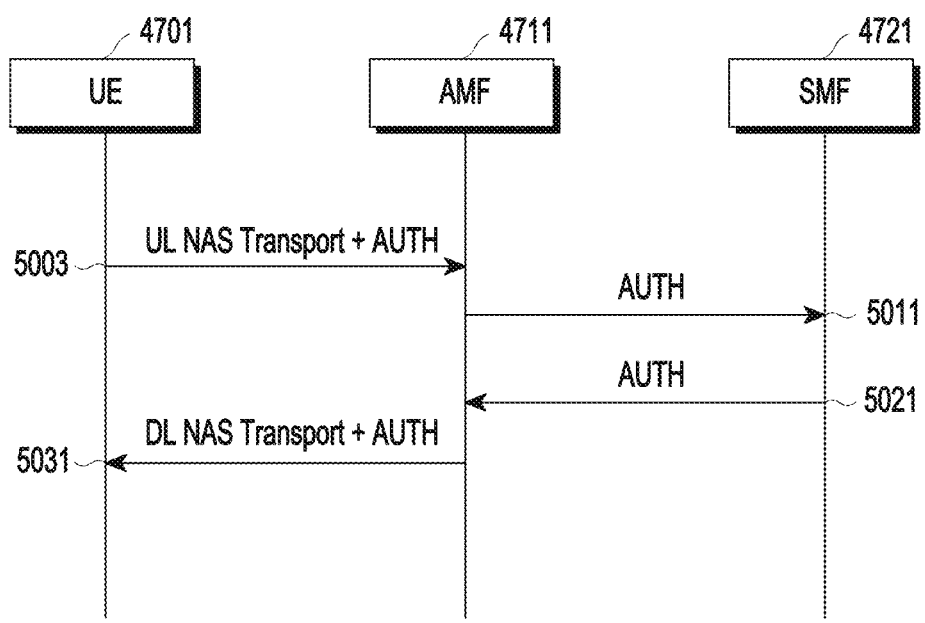
FIG. 50 illustrates an example scheme of transferring information by a terminal in a 5G system according to still another embodiment of the present disclosure.

FIG. 50 illustrates an example of transmitting a 5G authentication message according to an embodiment of the present invention.

Referring to FIG. 50, in step 5003, the UE 4701 sends an auth message to the AMF 4711 to send the authentication (auth) message from the UE 4701 via the AMF 4711 to the authentication server 4795 through a NAS transport message. The format of the message may be configured as in Table 56 below (UL Auth NAS transport) in an embodiment.

TABLE 56

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | UL Auth NAS transport Message identity | Message type | M | V | 1 |
| | Auth message container type | SM message container type | M | V | 1 |
| | Auth message container | SM message container | M | LVE | 3-n |

Referring to Table 56, the UL AUTH NAS transport message identity is an identifier used for identifying the UL AUTH NAS transport message and identifies the UL AUTH NAS transport message among message types.

Referring to Table 56, the AUTH message container type may be used to identify what message is carried over the AUTH message container.

Referring to Table 56, the auth message container may be used to identify what message is carried over the container. In other words, in an embodiment, it may be identified which auth-related message the transported message is.

Referring to Table 56, the auth message container may be used to transfer the authentication-related information or message.

The format of the UL Auth NAS transport message may be configured as shown in Table 57 according to another embodiment.

TABLE 57

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (UL AUTH NAS transport type) | | M | V | 1 |
| | Auth message container type | Auth message container type | M | V | 1 |
| | Auth message container | Auth message container | M | LV-E | 3-n |

Referring to Table 57, the transport type may be included for identifying what type the transported NAS message is. In other words, such type information may distinctively identify whether the transported information is a session management, short message service (SMS), or user application or user-related data information.

Referring to Table 57, if the transported message is an auth-related message, the auth message container type or auth message container may be included.

In other words, the message type is used to identify whether the message is a UL NAS transport message or DL NAS transport message.

Referring to Table 57, the transport type is used to identify whether the type is an AUTH NAS transport type.

Referring to Table 57, the transmitted AUTH message container is included.

Referring to Table 57, according to an embodiment, the AUTH message container type may be identified.

Referring to FIG. 50, in step 5011, the Auth message transferred from the UE is transferred from the AMF to the Auth server. At this time, the Auth message of the Auth message container IE in the UL Auth NAS transport message is transferred from the AMF to the SMF.

Referring to FIG. 50, in step 5021, the Auth message to be transferred from the SMF to the UE is transferred from the SMF to the AMF.

Referring to FIG. 50, in step 5031, a DL Auth NAS transport message is transmitted from the AMF to the UE.

The format of the DL Auth NAS transport message may be configured as shown in Table 58 according to an embodiment.

TABLE 58

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL Auth NAS transport Message identity | Message type | M | V | 1 |
| | Auth message container type | Auth message container type | M | V | 1 |
| | Auth message container | Auth message container | M | LV-E | 3-n |

Referring to Table 58, the DL auth NAS transport message identity is an identifier used for identifying the DL auth NAS transport message and it identifies the DL auth NAS transport message among message types.

Referring to Table 58, in an embodiment (in case 1, the type is identified by the container type), the auth message container type may be used to identify what message in relation to authentication is carried over the auth message container.

Referring to Table 58, in another embodiment (in case 2, type information is identified by the container itself), the auth message container may be used to identify what message is carried over the container. In other words, as an embodiment, it may be identified which authentication message is transferred in the message.

Referring to Table 58, the auth message container may be used to transfer the authentication-related information or authentication message.

The format of the DL Auth NAS transport message may be configured as shown in Table 59 according to another embodiment.

TABLE 59

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | NAS transport Message identity | Message type | M | V | 1 |
| | Transport type (DL Auth SM NAS transport type) | | M | | 1 |
| | Auth message container type | Auth message container type | M | V | 1 |
| | Auth message container | Auth message container | M | LV-E | 3-n |
| | Protocol configuration option | | O | TLV | 3-n |

Referring to Table 59, the transport type may be included for identifying what type the transported NAS message is. In other words, such type information may distinctively identify whether the transported information is a session management, short message service (SMS), or user application or user-related data information.

Referring to Table 59, if the transported message includes an auth message or authentication-related information, the auth message container type or auth message container may be included as in the embodiment of Table 59.

The format of the DL Auth NAS transport message may be configured as shown in Tables 60 and 61 according to another embodiment.

TABLE 60

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (Auth SM NAS transport type) | | M | | 1 |
| | Auth message container type | Auth message container type | M | V | 1 |
| | Auth message container | Auth message container | M | LV-E | 3-n |
| | Protocol configuration option | | O | TLV | 3-n |

TABLE 61

| IEI | Information Dement | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | DL NAS transport Message identity | Message type | M | V | 1 |
| | Transport type (Auth SM NAS transport type) | | M | | 1 |
| | Auth message container | Auth message container | M | LV-E | 3-n |
| | Protocol configuration option | | O | TLV | 3-n |

In other words, the message type is used to identify whether the message is a UL NAS transport message or DL NAS transport message.

Referring to Tables 60 and 61, the transport type is used to identify whether the type is an AUTH NAS transport type.

Referring to Tables 60 and 61, the transmitted AUTH message container is included.

According to an embodiment, the AUTH message container type may be identified.

The Auth message container of Tables 60 and 61 may be configured as shown in Table 62 below.

TABLE 62

| 8 | 7 | 6 | 5 | 4 | 3 | 2 | 1 |
|---|---|---|---|---|---|---|---|
| Auth message container IEI | | | | | | | |
| Length of Auth message container contents | | | | | | | |
| Auth message container contents | | | | | | | |

The present disclosure below relates to an apparatus and method for performing communication with a network entity in a wireless communication system. Specifically, described below is technology for identifying a UE upon system interworking and handover in a wireless communication system.

Figure 51:
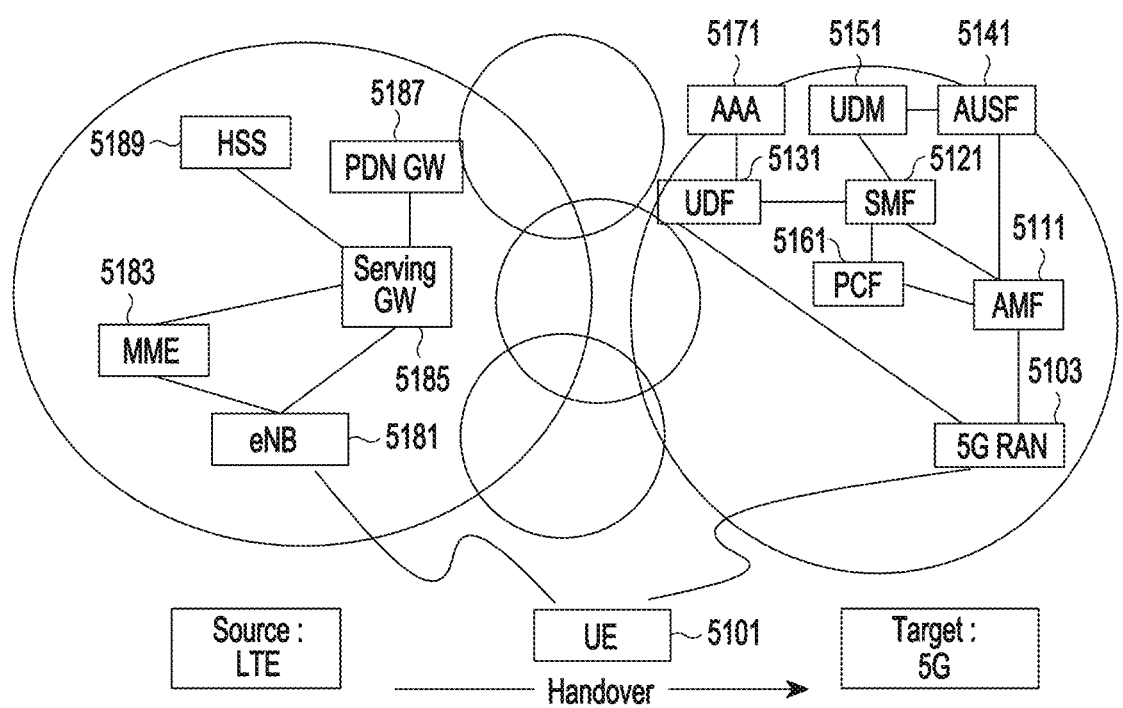
FIG. 51 illustrates an example network environment in which a 5G (5$^{th}$ generation) system and a long-term evolution (LTE) system coexist according to various embodiments of the present disclosure.

FIG. 51 illustrates an example network environment in which a 5G system and an LTE system coexist according to various embodiments of the present disclosure. For example, FIG. 51 illustrates an example of network environment in a case where a UE performs handover or interworking in a network environment where a 5G system and an LTE system coexist.

Referring to FIG. 51, for a 5G network, a user plane function (UPF) 5131, a session management function (SMF) 5121, an access and mobility management function (AMF) 5111, a 5G radio access network (RAN) 5103, a user data management (UDM) 5151, and a policy control function (PCF) 5161 constitute the network system. In some embodiments, the network system may also include an authentication server function (AUSF) 5141 and an authentication-authorization-and-accounting (AAA) 5171 for authenticating these entities. Here, the 5G RAN 5103 may be a base station (e.g., a gNB) supporting the 5G network. Further, the gNB may be specified in 3GPP TS 38.300. As an example, the PCF 5161 may determine a policy of session management or mobility management and transfer to the AMF 5111 or SMF 5121, thereby performing proper mobility management, session management, or QoS management. The AUSF 5141 may store data for authentication of the UE, and the UDM 5151 may store subscription data or policy data of the user. The AAA 5171 may perform such functions as authentication, authorization, or account management.

The communication network on which the present disclosure is based is assumed to be a 5G network, but the same concept may also be applicable to other systems within a category one of ordinary skill may appreciate.

FIG. 51 illustrates a 3GPP evolved packet system (EPS) system structure as another network which coexists with the 5G network to allow the UE to perform handover. In this case, the description has focused primarily on the evolved-UMTS terrestrial radio access network (E-UTRAN), and this method may be applicable to other similar wireless communication systems.

The device or UE 5101 may be a device used by the user. In some cases, the UE 5101 may be operated without the user's involvement. In other words, the UE 5101 may be a machine-type communication (MTC) device which may not be carried by the user. The UE 5101 may also be denoted in other terms, such as terminal, user equipment, mobile station, subscriber station, remote terminal, wireless terminal, user device, consumer device, or in other various terms with equivalent technical meanings thereto.

In FIG. 51, the UE 5101 may perform common EUTRAN communication via a base station 5181 and mobility management entity (MME) 5183 and may perform data communication via, e.g., a serving gateway (GW) 5185 and packet data network (PDN) GW 5187. In some embodiments, a home subscriber server (HSS) 5189 transfers subscription information regarding the UE 5101 and UE-related security key information.

Thus, the present disclosure is described below with reference to the network environment of FIG. 51 to be able to support communication setup and operations for entities, such as the device or UE 5101, base station 5581, MME 5183, and HSS 5189 based on the protocol used in mobile communication and Internet communication.

Meanwhile, in the step for migration, the HSS 5189 and the UDM 5151 may be co-located, and the PDN GW 5187 and the AMF 5111 may also be co-located. Before the 5G system is deployed, maintaining the co-located network system structure may also be an embodiment.

In a registration request message for registration performed after handover from the 4G to 5G network, an identity for the UE is used to identify the UE. The mapped globally unique temporary identity (GUTI) may be used when the UE 5101 hands from the 4G network over to the 5G network. At this time, to indicate that the UE 5101 has moved from the 4G network to 5G network, the mapped GUTI resultant from mapping the 4G GUTI identity used in the 4G network to 5G may be used. In other words, the mapped GUTI is an identity derived by mapping from the 4G GUTI when the UE 5101 hands over from the 4G network to the 5G network. Further, if the GUTI is the mapped GUTI to indicate that the UE 5101 has been moved from the 4G network upon performing a registration request, the identity type of the 5G mobile identity is used for identifying the identity and indicating the mapped GUTI in the mobile identity. In other words, in such a case, when the UE performs a registration request, the identity type for indicating the mapped GUTI may be used.

In some embodiments, the 5G information element may be configured as shown in FIG. 76 (5GS mobile identity information element).

In some embodiments, the identity type of the 5G mobile identity information element may be configured as shown in Table 64 below.

TABLE 64

Type of identity (octet 3)
Bits
3 2 1
0 0 1 SUCI
1 1 0 5G-GUTI
0 1 1 IMEI
1 0 0 5G-TMSI
1 0 1 IMSI
1 1 1 Mapped GUTI
All other values are reserved.
Odd/even indication (octet 3)
Bit
4
0     even number of identity digits
1     odd number of identity digits
Identity digits (octet 4 etc)
For the SUCI, this field is coded using BCD coding. If the number of identity digits is even then bits 5 to 8 of the last octet shall be filled with an end mark coded as "1111".
For the IMSI, this field is coded using BCD coding. If the number of identity digits is even then bits 5 to 8 of the last octet shall be filled with an end mark coded as "1111".
For the IMEI, this field is coded using BCD coding. The format of the IMEI is described in 3GPP TS 23.003 [2].
If the mobile identity is the 5G-TMSI then bits 5 to 8 of octet 3 are coded as "1111" and bit 8 of octet4 is the most significant bit and bit 1 of the last octet the least significant bit.
The coding of the 5G-TMSI is left open for each administration.

In some embodiments, the identity type of the 5G mobile identity information element may be configured as shown in Table 65 below.

TABLE 65

Type of identity (octet 3)
Bits
3 2 1
0 0 1 SUCI
1 1 0 5G-GUTI

TABLE 65-continued

```
0 1 1 IMEI
1 0 0 5G-TMSI
1 0 1 Mapped GUTI
1 1 1
All other values are reserved.
Odd/even indication (octet 3)
Bit
4
0    even number of identity digits
1    odd number of identity digits
Identity digits (octet 4 etc)
For the SUCI, this field is coded using BCD coding. If the number of
identity digits is even then bits 5 to 8 of the last octet shall be filled
with an end mark coded as "1111".
For the IMSI, this field is coded using BCD coding. If the number of
identity digits is even then bits 5 to 8 of the last octet shall be filled
with an end mark coded as "1111".
For the IMEI, this field is coded using BCD coding. The format of
the IMEI is described in 3GPP TS 23.003 [2].
If the mobile identity is the 5G-TMSI then bits 5 to 8 of octet 3 are
coded as "1111" and bit 8 of octet4 is the most significant bit and
bit 1 of the last octet the least significant bit.
The coding of the 5G-TMSI is left open for each administration.
```

In some embodiments, the identity type of the 5G mobile identity information element may be configured as shown in Table 66 below.

TABLE 66

```
Type of identity (octet 3)
Bits
3 2 1
0 0 1 SUCI
1 1 0 5G-GUTI
0 1 1 IMEI
1 0 0 5G-TMSI
0 1 0 Mapped GUTI
1 0 1
1 1 1
All other values are reserved.
Odd/even indication (octet 3)
Bit
4
0    even number of identity digits
1    odd number of identity digits
Identity digits (octet 4 etc)
For the SUCI, this field is coded using BCD coding. If the number of
identity digits is even then bits 5 to 8 of the last octet shall be filled
with an end mark coded as "1111".
For the IMSI, this field is coded using BCD coding. If the number of
identity digits is even then bits 5 to 8 of the last octet shall be filled
with an end mark coded as "1111".
For the IMEI, this field is coded using BCD coding. The format of
the IMEI is described in 3GPP TS 23.003 [2].
If the mobile identity is the 5G-TMSI then bits 5 to 8 of octet 3 are
coded as "1111" and bit 8 of octet4 is the most significant bit and
bit 1 of the last octet the least significant bit.
The coding of the 5G-TMSI is left open for each administration.
```

Meanwhile, as another embodiment, the UE 5101 may prepare for handover or interworking by fetching information available upon accessing the target cell via a preparation process before handover from the 4G network to 5G network or moving to the idle mode.

In this case, single-network slice selection assistance information (S-NSSAI) for the target's serving public land mobile network (PLMN) may be included in the NSSAI requested in the registration request by the UE 5101.

Referring to FIG. 51, since the target cell, 5G cell, performs data transmission at a data rate increased with higher power, the cell coverage may be small. Thus, the information on the target cell which the UE 5101 has previously received while in the 4G network may be varied by the movement of the UE 5101, so that the target cell may be changed. In such case, e.g., if the UE 5101 configures the NSSAI requested in the registration request with the S-NSSAI for the serving PLMN corresponding to target cell 1, the corresponding information as information about other cells or information about other S-NSSAIs may differ from the target cell to which it has been moved (e.g., target cell 2) which is to be actually registered.

Thus, PLMN may be set using not only serving PLMN but also information on the equivalent PLMN.

Meanwhile, various embodiments as follows are possible in relation to transfer of PLMN-related S-NSSAI information.

The first embodiment regards the case where there is mapped S-NSSAI available for the equivalent PLMN which is equivalent to the serving PLMN. In this case, as like there is S-NSSAI available for the serving PLMN, the S-NSSAI available for the equivalent PLMN is used by mapping.

In the second embodiment, in a case the serving PLMN is not supported and thus the equivalent PLMN is used, the S-NSSAIs determined as default for the equivalent PLMN are used.

In the third embodiment, with the mappings of the S-NSSAIs available to each of the PLMNs, whether the serving PLMN or equivalent PLMN, as a candidate set, selection may be made from the candidate set, i.e., among multiple S-NSSAIs with the mapping of the S-NSSAIs. In such a scheme, the mapping information of multiple S-NSSAIs related to the equivalent PLMN may be transmitted and used.

Such S-NSSAI information may be transmitted from the combined node of the SMF 5111 and the PGW-C, SMF 5121, or PGW 5187 while the UE 5101 is in the 4G network and may be used later when the UE 5101 sends a registration request.

Figure 52:
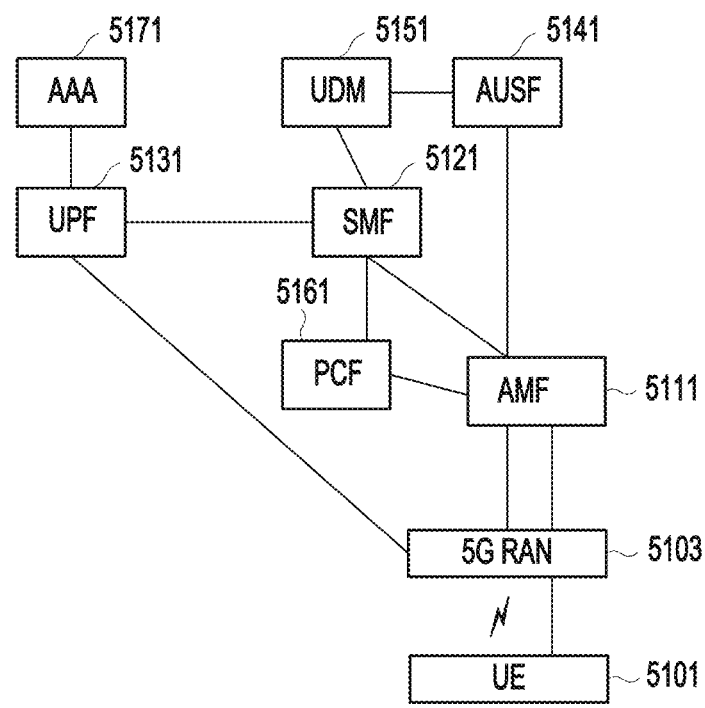
FIG. 52 illustrates an example network environment for a security procedure for a terminal in a 5G network according to various embodiments of the present disclosure.

FIG. 52 illustrates an example of network environment for a security procedure for a terminal in a 5G network according to various embodiments of the present disclosure.

Referring to FIG. 52, under the assumption of a 5G network, the UPF 5131, the SMF 5121, the AMF 5111, the 5G RAN 5103, the UDM 5151, and the PCF 5161 constitute the network system. Meanwhile, for authenticating these entities, the AUSF 5141 and the AAA 5171 may also be included in the network system.

Here, the 5G RAN 5103 may be a base station (e.g., a gNB) supporting the 5G network. Further, the gNB may be specified in 3GPP TS 38.300. As an example, the PCF 5161 may determine a policy of session management or mobility management and transfer to the AMF 5111 or SMF 5121, thereby performing proper mobility management, session management, or QoS management. The AUSF 5141 may store data for authentication of the UE, and the UDM 5151 may store subscription data or policy data of the user. The AAA 5171 may perform such functions as authentication, authorization, or account management.

The communication network on which the present disclosure is based is assumed to be a 5G network, but the same concept may also be applicable to other systems within a category one of ordinary skill may appreciate.

Figure 53:
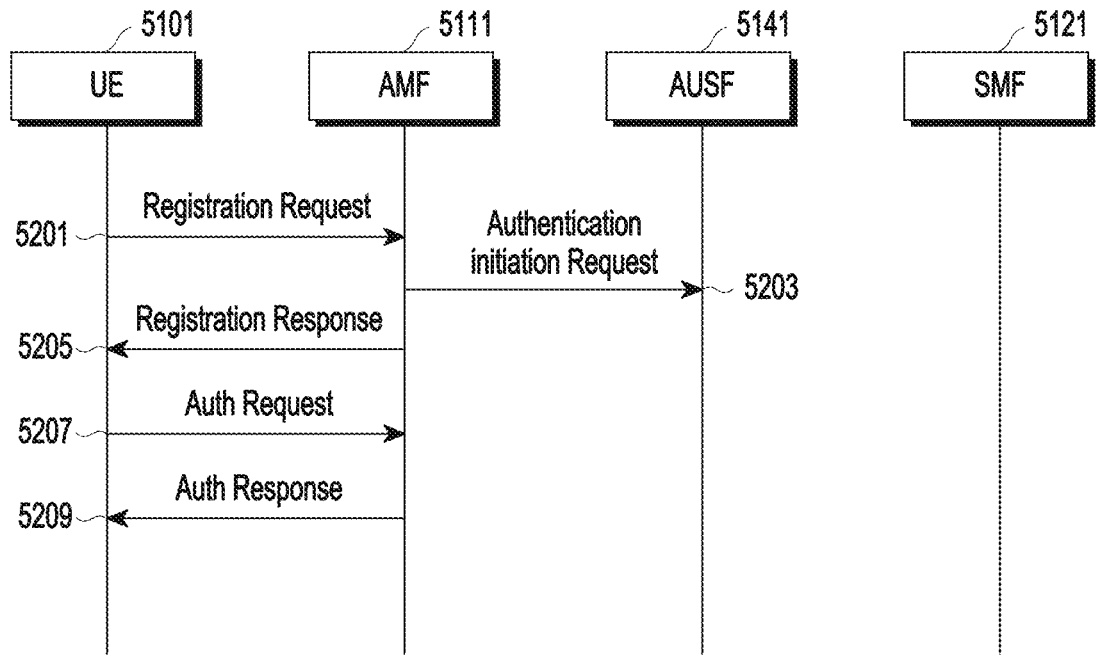
FIG. 53 illustrates signal exchange for supporting security for a terminal in a 5G network according to various embodiments of the present disclosure.

FIG. 53 illustrates signal exchange for supporting security for a terminal in a 5G network according to various embodiments of the present disclosure. FIG. 53 exemplifies signal exchange between the UE 5101, AMF 5111, AUSF 5141, and SMF 5121.

Referring to FIG. 53, in step 5201, the UE 5101 sends a registration request message to the AMF 5111. In step 5203, when the UE 5101 needs to be reauthenticated (or authenticated), the AMF 5111 sends an authentication initiation request message to the AUSF 5141. In step 5205, the AMF 5111 sends a registration response message to the UE 5101.

In step 5207, the UE 5101 may send an authentication request message for authentication to the AMF 5111. In step 5209, the AMF 5111 may send an authentication response message to the UE 5101.

In some embodiments, in a case where the UE 5101 performs initial registration, the mobile subscription identification number (MSIN) which is part of the international mobile subscriber identity (IMSI) may be protected with the public key to thereby protect the identity of the UE 5101. At this time, the mobile country code (MCC) which is the country code and the mobile network code (MNC) which is the network code are not protected but transmitted. Thus, the country and network may be selected via the non-protected MCC and MNC, and the MSIN identified in the corresponding network may be protected and transmitted to thereby protect the identity for the corresponding UE. The identity thusly sent is referred to as a subscriber permanent identifier (SUPI), the corresponding network is identified with the MCC and MNC, the UE is identified via the security-protected MSIN, and the identity for the UE may be protected.

In other words, the security-protected MSIN is used when the UE 5101 performs initial registration, and MCC and MNC are not protected while the MSIN alone is protected.

In some embodiments, in case of emergency, the identity of the UE 5101 is not security-protected, and the IMSI may be used as the identity. In such a case, the IMSI being used as the identity may be known to the network and may be known via the information element. A relevant embodiment may be configured as follows.

In some embodiments, in a case where the UE 5101 sends an initial registration request message to the AMF 5111, the AMF 5111 may send an authentication initiation request message to the AUSF 5141. This procedure may be performed when an authentication procedure with the UE 5101 is desired. At this time, if the UE 5101 is registered in the AMF 5111 with the SUCI-protected identity, the SUCI is used but, if the UE 5101 has a valid 5G-GUTI and the network reauthenticates the UE 5101, the AMF 5111 may send an authentication initiation request message including the IMSI to the AUSF 141 to thereby perform reauthentication.

In order to identify whether the UE's identity included in the authentication information request (5G-AIR) message transmitted from the AMF 5111 to the AUSF 141 is the IMSI or SUCI, in an embodiment, the AMF 5111 may explicitly make it known whether it is IMSI or SUCI by including an indicator, i.e., identity, or in another embodiment, a code for differentiating an identity type as to whether it is IMSI or SUCI may be used in information carrying the identity.

In some embodiments, in case of emergency, the security-protected SUCI of the UE 5101 is used as the identity, and as the security algorithm used, a null security algorithm may be used and, in practice, it may be used in the plain type for the MSIN.

Such some embodiments regard the case where the 5GS mobile identity type is the SUCI and the security algorithm is null. As the security algorithm applied to the UE 5101 and the UE identity is null, the actual operation is not security protected as in the plain state. This case may not be as efficient as the case where the UE 5101 is identified with the IMSI from the beginning in terms of processing time.

In some embodiments, the 5G information element may be configured as shown in FIG. 77 (5GS mobile identity information element).

In some embodiments, the identity type of the 5G mobile identity information element may be configured as shown in Table 68 below.

TABLE 68

Type of identity (octet 3)
Bits
3 2 1
0 0 1   SUCI
1 1 0   5G-GUTI
0 1 1   IMEI
1 0 0   5G-TMSI
1 0 1   IMSI
1 1 1
All other values are reserved.
Odd/even indication (octet 3)
Bit
4
0   even number of identity digits
1   odd number of identity digits
Identity digits (octet 4 etc)
For the SUCI, this field is coded using BCD coding. If the number of identity digits is even then bits 5 to 8 of the last octet shall be filled with an end mark coded as "1111".
For the IMSI, this field is coded using BCD coding. If the number of identity digits is even then bits 5 to 8 of the last octet shall be filled with an end mark coded as "1111".
For the IMEI, this field is coded using BCD coding. The format of the IMEI is described in 3GPP TS 23.003 [2].
If the mobile identity is the 5G-TMSI then bits 5 to 8 of octet 3 are coded as "1111" and bit 8 of octet4 is the most significant bit and bit 1 of the last octet the least significant bit.
The coding of the 5G-TMSI is left open for each administration.

In some embodiments, the identity type of the 5G mobile identity information element may be configured as shown in Table 69 below.

TABLE 69

Type of identity (octet 3)
Bits
3 2 1
0 0 1   SUCI
1 1 0   5G-GUTI
0 1 1   IMEI
1 0 0   5G-TMSI
0 1 0   IMSI
1 0 1
1 1 1
All other values are reserved.
Odd/even indication (octet 3)
Bit
4
0   even number of identity digits
1   odd number of identity digits
Identity digits (octet 4 etc)
For the SUCI, this field is coded using BCD coding. If the number of identity digits is even then bits 5 to 8 of the last octet shall be filled with an end mark coded as "1111".
For the IMSI, this field is coded using BCD coding. If the number of identity digits is even then bits 5 to 8 of the last octet shall be filled with an end mark coded as "1111".
For the IMEI, this field is coded using BCD coding. The format of the IMEI is described in 3GPP TS 23.003 [2].
If the mobile identity is the 5G-TMSI then bits 5 to 8 of octet 3 are coded as "1111" and bit 8 of octet4 is the most significant bit and bit 1 of the last octet the least significant bit.
The coding of the 5G-TMSI is left open for each administration.

In some embodiments, the identity type of the 5G mobile identity information element may be configured as shown in Table 70 below.

TABLE 70

Type of identity (octet 3)
Bits
3 2 1
0 0 1 IMSI
1 1 0 5G-GUTI
0 1 1 IMEI
1 0 0 5G-TMSI
0 1 0 SUCI
1 0 1
1 1 1
All other values are reserved.
Odd/even indication (octet 3)
Bit
4
0    even number of identity digits
1    odd number of identity digits
Identity digits (octet 4 etc)
For the SUCI, this field is coded using BCD coding. If the number of identity digits is even then bits 5 to 8 of the last octet shall be filled with an end mark coded as "1111".
For the IMSI, this field is coded using BCD coding. If the number of identity digits is even then bits 5 to 8 of the last octet shall be filled with an end mark coded as "1111".
For the IMEI, this field is coded using BCD coding. The format of the IMEI is described in 3GPP TS 23.003 [2].
If the mobile identity is the 5G-TMSI then bits 5 to 8 of octet 3 are coded as "1111" and bit 8 of octet4 is the most significant bit and bit 1 of the last octet the least significant bit.
The coding of the 5G-TMSI is left open for each administration.

In some embodiments, the identity type of the 5G mobile identity information element may be configured as shown in Table 71 below.

TABLE 71

Type of identity (octet 3)
Bits
3 2 1
0 0 1 IMSI
1 1 0 5G-GUTI
0 1 1 IMEI
1 0 0 5G-TMSI
0 1 0
1 0 1 SUCI
1 1 1
All other values are reserved.
Odd/even indication (octet 3)
Bit
4
0    even number of identity digits
1    odd number of identity digits
Identity digits (octet 4 etc).
For the SUCI, this field is coded using BCD coding. If the number of identity digits is even then bits 5 to 8 of the last octet shall be filled with an end mark coded as "1111".
For the IMSI, this field is coded using BCD coding. If the number of identity digits is even then bits 5 to 8 of the last octet shall be filled with an end mark coded as "1111".
For the IMEI, this field is coded using BCD coding. The format of the IMEI is described in 3GPP TS 23.003 [2].
If the mobile identity is the 5G-IMSI then bits 5 to 8 of octet 3 are coded as "1111" and bit 8 of octet4 is the most significant bit and bit 1 of the last octet the least significant bit.
The coding of the 5G-TMSI is left open for each administration.

Figure 54:
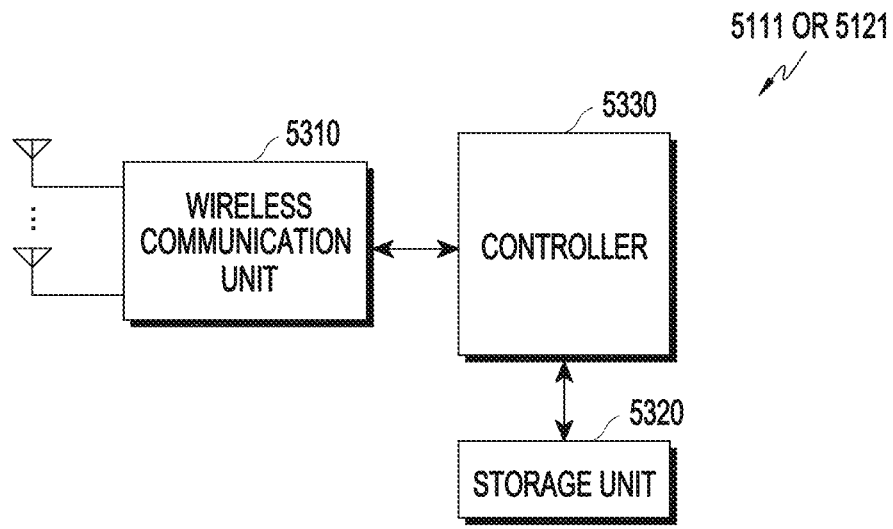
FIG. 54 illustrates a configuration of a network entity in a wireless communication system according to various embodiments of the present disclosure.

FIG. 54 illustrates a configuration of a network entity in a wireless communication system according to various embodiments of the present disclosure. The configuration shown in FIG. 54 may be appreciated as the configuration of the AMF 5111 or SMF 5121. Further, the term " . . . unit" and the suffix " . . . er" as used herein denote a unit processing at least one function or operation and be implemented in hardware, software, or a combination thereof.

Referring to FIG. 54, the network entity includes a wireless communication unit 5310, a storage unit 5320, and a controller 5330.

The wireless communication unit 5310 performs functions for transmitting/receiving signals via a wireless channel. For example, the wireless communication unit 5310 performs the function of conversion between a baseband signal and bit stream according to the physical layer specifications of the system. For example, upon data transmission, the wireless communication unit 5310 encodes and modulates a transmission bit stream, thereby generating complex symbols. Further, upon data reception, the wireless communication unit 5310 reconstructs the reception bit stream by demodulating and decoding the baseband signal.

Further, the wireless communication unit 5310 up-converts the baseband signal into a radio frequency (RF) band signal and transmits the converted signal via an antenna, and the wireless communication unit 5310 down-converts a RF band signal received via an antenna into a baseband signal. To that end, the wireless communication unit 5310 may include, e.g., a transmission filter, a reception filter, an amplifier, a mixer, an oscillator, a digital-to-analog converter (DAC), and an analog-to-digital converter (ADC). The wireless communication unit 5310 may include multiple transmission/reception paths. Further, the wireless communication unit 5310 may include at least one antenna array constituted of multiple antenna elements.

In terms of hardware, the wireless communication unit 5310 may be configured of a digital unit and analog unit, and the analog unit may be constituted of multiple sub units depending on the operation power and operation frequency. The digital unit may be implemented as at least one processor (e.g., a digital signal processor (DSP)).

The wireless communication unit 5310 transmits and receives signals as described above. Thus, the whole or part of the wireless communication unit 5310 may be referred to as a 'transmitter,' 'receiver,' or 'transceiver.' Further, transmission and reception performed via a wireless channel in the following description may also mean performing the above-described process by the wireless communication unit 5310.

The storage unit 5320 stores a basic program for operating the network entity, application programs, configuration information, or other data. The storage unit 5320 may be configured as a volatile memory, a non-volatile memory, or a combination of a volatile memory and a non-volatile memory. The storage unit 5320 provides the stored data according to a request from the controller 5330.

The controller 5330 controls the overall operation of the network entity. For example, the controller 5330 transmits and receives signals via the wireless communication unit 5310. The controller 5330 records and reads data in/from the storage unit 5320. The controller 5330 may perform the functions of the protocol stack required in the communication specifications. According to another implementation example, the protocol stack may be included in the wireless communication unit 5310. To that end, the controller 5330 may include at least one processor.

According to various embodiments, the controller 5330 may control the network entity to perform operations according to various embodiments of the present disclosure.

Figure 55:
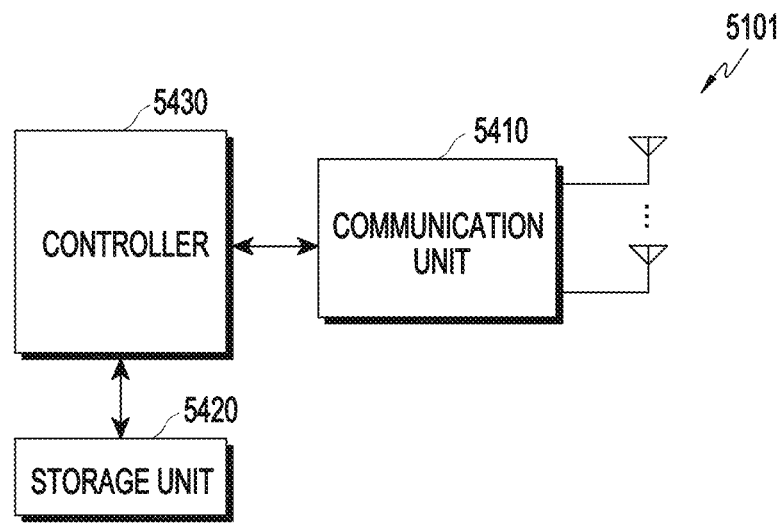
FIG. 55 illustrates a configuration of a terminal in a wireless communication system according to various embodiments of the present disclosure.

FIG. 55 illustrates a configuration of a terminal in a wireless communication system according to various embodiments of the present disclosure. The configuration shown in FIG. 55 may be appreciated as the configuration of the UE 5101. Further, the term " . . . unit" and the suffix " . . . er" as used herein denote a unit processing at least one function or operation and be implemented in hardware, software, or a combination thereof.

Referring to FIG. 55, the UE includes a communication unit 5410, a storage unit 5420, and a controller 5430.

The communication unit 5410 performs functions for transmitting/receiving signals via a wireless channel. For example, the communication unit 5410 performs the function of conversion between a baseband signal and bit stream according to the system physical layer specifications. For example, upon data transmission, the communication unit 5410 encodes and modulates a transmission bit stream, thereby generating complex symbols. Further, upon data reception, the communication unit 5410 reconstructs the reception bit stream by demodulating and decoding the baseband signal. Further, the communication unit 5410 up-converts the baseband signal into an RF band signal and transmits the converted signal via an antenna, and the communication unit 5410 down-converts the RF band signal received via an antenna into a baseband signal. For example, the communication unit 5410 may include a transmission filter, a reception filter, an amplifier, a mixer, an oscillator, a DAC, and an ADC.

The communication unit 5410 may include multiple transmission/reception paths. Further, the communication unit 5410 may include at least one antenna array constituted of multiple antenna elements. In terms of hardware, the communication unit 5410 may be configured of a digital circuit and an analog circuit (e.g., a radio frequency integrated circuit (RFIC)). Here, the digital circuit and analog circuit may be implemented in a single package. The communication unit 5410 may include multiple RF chains. Further, the communication unit 5410 may perform beamforming.

Further, the communication unit 5410 may include different communication modules for processing signals of different frequency bands. Further, the communication unit 5410 may include multiple communication modules for supporting multiple different radio access techniques. For example, the different radio access techniques may include BLUETOOTH low energy (BLE), wireless-fidelity (WI-FI), WiFi Gigabyte (WIGIG), or cellular network (e.g., long-term evolution (LTE)). The different frequency bands may include a super-high frequency (SHF) (e.g., 2.5 GHz or 5 GHz) band or millimeter wave (mmWave) (e.g., 60 GHz) band.

The communication unit 5410 transmits and receives signals as described above. Thus, the whole or part of the communication unit 5410 may be referred to as a 'transmitter,' 'receiver,' or 'transceiver.' Further, transmission and reception performed via a wireless channel in the following description may also mean performing the above-described process by the communication unit 5410.

The storage unit 5420 stores a basic program for operating the UE, application programs, configuration information, or other data. The storage unit 5420 may be configured as a volatile memory, a non-volatile memory, or a combination of a volatile memory and a non-volatile memory. The storage unit 5420 provides the stored data according to a request from the controller 5430.

The controller 5430 controls the overall operation of the UE. For example, the controller 5430 transmits and receives signals via the communication unit 5410. The controller 5430 records and reads data in/from the storage unit 5420. The controller 5430 may perform the functions of the protocol stack required in the communication specifications. To that end, the controller 5430 may include at least one processor or microprocessor or may be part of a processor.

Part of the communication unit 5410 and the controller 5430 may be referred to as a communication processor (CP). According to various embodiments, the controller 5430 may control the UE to perform operations according to various embodiments of the present disclosure.

Figure 56:
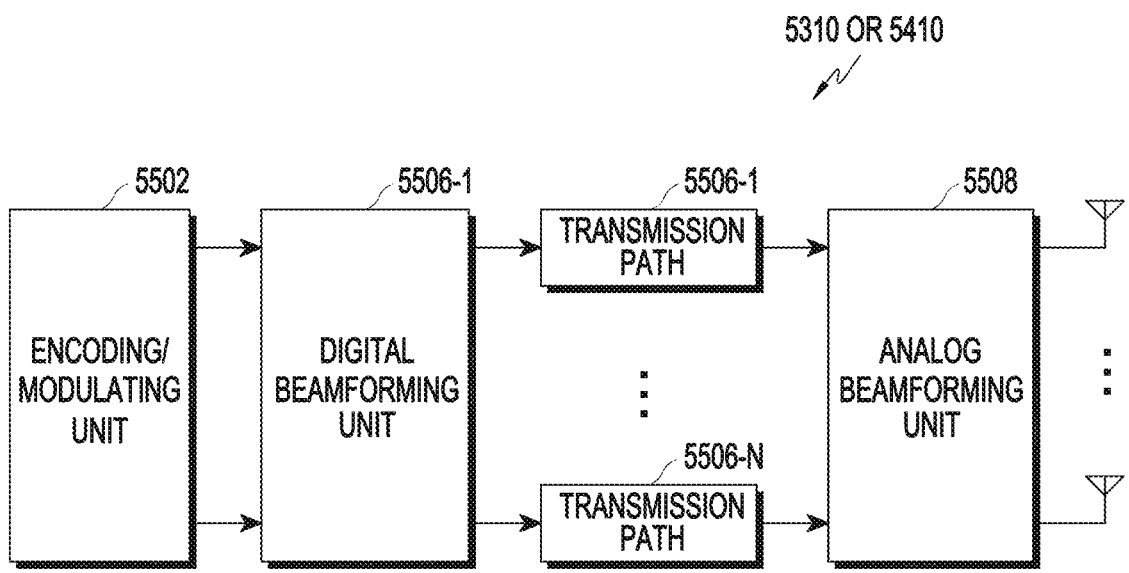
FIG. 56 illustrates a configuration of a communication unit in a wireless communication system according to various embodiments of the present disclosure.

FIG. 56 illustrates a configuration of a communication unit in a wireless communication system according to various embodiments of the present disclosure. FIG. 56 illustrates an example detailed configuration of the wireless communication unit 5310 of FIG. 54 or the communication unit 5410 of FIG. 55. Specifically, FIG. 56 shows example of components for performing beamforming as part of the wireless communication unit 5310 of FIG. 54 or the communication unit 5410 of FIG. 55.

Referring to FIG. 56, the wireless communication unit 5310 or the communication unit 5410 includes an encoding/decoding unit 5502, a digital beamforming unit 5504, multiple transmission paths 5506-1 to 5506-N, and an analog beamforming unit 5508.

The encoding/modulating unit 5502 performs channel encoding. For channel encoding, at least one of a low-density parity check (LDPC) code, a convolution code, or a polar code may be used. The encoding/modulating unit 5502 performs constellation mapping, thereby generating modulation symbols.

The digital beamforming unit 5504 performs beamforming on digital signals (e.g., modulation symbols). To that end, the digital beamforming unit 5504 multiplies modulation symbols by beamforming weights. Here, the beamforming weights are used to change the magnitude and phase of signals and may be referred to as 'precoding matrix' or 'precoder.' The digital beamforming unit 5504 outputs the digital beamformed modulation symbols to the multiple transmission paths 5506-1 to 5506-N. At this time, the modulation symbols may be multiplexed by a multiple-input multiple-output (MIMO) transmission scheme, or the same modulation symbols may be provided to the multiple transmission paths 5506-1 to 5506-N.

The multiple transmission paths 5506-1 to 5506-N convert the digital beamformed digital signals into analog signals. To that end, each of the multiple transmission paths 5506-1 to 5506-N may include an inverse fast Fourier transform (IFFT) computation unit, a cyclic prefix (CP) inserting unit, a DAC, and an up-converting unit. The CP inserting unit is for an orthogonal frequency division multiplexing (OFDM) scheme and may be excluded if a different physical layer scheme (e.g., filter bank multi-carrier (FBMC)) is applied. In other words, the multiple transmission paths 5506-1 to 5506-N provide an independent signal process on multiple streams generated via digital beamforming. However, depending on implementation schemes, some of the components of the multiple transmission paths 5506-1 to 5506-N may be shared.

The analog beamforming unit 5508 performs beamforming on analog signals. To that end, the digital beamforming unit 5504 multiplies the analog signals by beamforming weights. Here, the beamforming weights are used to change the magnitude and phase of signals.

Specifically, the analog beamforming unit 5508 may come in various configurations depending on the connection structure between the multiple transmission paths 5506-1 to 5506-N and antennas. For example, each of the multiple transmission paths 5506-1 to 5506-N may be connected to one antenna array. As another example, the multiple transmission paths 5506-1 to 5506-N may be connected to one antenna array. As still another example, the multiple transmission paths 5506-1 to 5506-N may be connected adaptively to one antenna array or two or more antenna arrays.

The methods according to the embodiments descried in the specification or claims of the present disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the present disclosure.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the present disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

Although specific embodiments of the present disclosure have been described above, various changes may be made thereto without departing from the scope of the present disclosure. Thus, the scope of the disclosure should not be limited to the above-described embodiments, and should rather be defined by the following claims and equivalents thereof.

The invention claimed is:

1. A method of communication by a terminal in a wireless communication system supporting a plurality of protocol data unit (PDU) sessions, the method comprising:

transmitting, to a network entity in charge of mobility management, a first non-access stratum (NAS) message including first information indicating whether each of the plurality of PDU sessions is inactive or not; and receiving, from the network entity, a second NAS message including second information indicating whether each of the plurality of PDU sessions is inactive or not, wherein the plurality of PDU sessions are identified by a plurality of PDU session identities (PSIs), respectively, wherein the first information is represented by a plurality of bits, the plurality of bits being mapped respectively to the plurality of PSIs and each of the plurality of bits being coded as a value of 0 or 1 to indicate whether a corresponding PDU session is inactive or not, wherein the second information is represented by a plurality of bits, the plurality of bits being mapped respectively to the plurality of PSIs and each of the plurality of bits being coded as value of 0 or 1 to indicate whether a corresponding PDU session is inactive or not, wherein a number of the plurality of PSIs is at least a number of data radio bearers (DRBs) supported by the terminal, and wherein each of the plurality of PSIs is represented by using 8 bits.

2. The method of claim 1, wherein the network entity in charge of mobility management is an access and mobility management function (AMF), wherein the AMF communicates with a session management function (SMF), which is another network entity in charge of session management, for signaling, and wherein the first NAS message is a registration request message or service request message transmitted from the terminal to the AMF, and the second NAS message is a registration accept message or service accept message received from the AMF.

3. The method of claim 1, wherein the number of DRBs supported by the terminal is 16.

4. The method of claim 1, wherein each of the plurality of bits in the first information indicates that the corresponding PDU session is not inactive if coded as 1 and indicates that the corresponding PDU session is inactive if coded as 0, and wherein each of the plurality of bits in the second information indicates that the corresponding PDU session is not inactive if coded as 1 and indicates that the corresponding PDU session is inactive if coded as 0.

5. The method of claim 1, wherein the plurality of PSIs is represented, by using 8 bits, as values from 0 to value of the number of the DRBs supported by the terminal minus 1, and wherein bits in the first information corresponding to a plurality of PSIs represented as values from 1 to value of the number of the DRBs supported by the terminal minus 1 is coded as 0 or 1 to indicate whether a corresponding PDU session is inactive or not, and wherein bits in the second information corresponding to a plurality of PSIs represented as values from 1 to value of the number of the DRBs supported by the terminal minus 1 is coded as 0 or 1 to indicate whether a corresponding PDU session is inactive or not.

6. A terminal in a wireless communication system supporting a plurality of protocol data unit (PDU) sessions, the terminal comprising:
- a transceiver; and
- a processor coupled with the transceiver and configured to:
  - transmit, to a network entity in charge of mobility management via a base station, a first non-access stratum (NAS) message including first information indicating whether each of the plurality of PDU sessions is inactive or not; and
  - receive, from the network entity, a second NAS message including second information indicating whether each of the plurality of PDU sessions is inactive or not,
- wherein the plurality of PDU sessions are identified by a plurality of PDU session identities (PSIs), respectively,
- wherein the first information is represented by a plurality of bits, the plurality of bits being mapped respectively to the plurality of PSIs and each of the plurality of bits being coded as a value of 0 or 1 to indicate whether a corresponding PDU session is inactive or not,
- wherein the second information is represented by a plurality of bits, the plurality of bits being mapped respectively to the plurality of PSIs and each of the plurality of bits being coded as value of 0 or 1 to indicate whether a corresponding PDU session is inactive or not,
- wherein a number of the plurality of PSIs is at least a number of data radio bearers (DRBs) supported by the terminal, and
- wherein each of the plurality of PSIs is represented by using 8 bits.

7. The terminal of claim 6, wherein the number of DRBs supported by the terminal is 16.

8. The terminal of claim 6, wherein each of the plurality of bits in the first information indicates that the corresponding PDU session is not inactive if coded as 1 and indicates that the corresponding PDU session is inactive if coded as 0, and
- wherein each of the plurality of bits in the second information indicates that the corresponding PDU session is not inactive if coded as 1 and indicates that the corresponding PDU session is inactive if coded as 0.

9. The terminal of claim 6, wherein the plurality of PSIs is represented, by using 8 bits, as values from 0 to value of the number of the DRBs supported by the terminal minus 1, and
- wherein bits in the first information corresponding to a plurality of PSIs represented as values from 1 to value of the number of the DRBs supported by the terminal minus 1 is coded as 0 or 1 to indicate whether a corresponding PDU session is inactive or not, and
- wherein bits in the second information corresponding to a plurality of PSIs represented as values from 1 to value of the number of the DRBs supported by the terminal minus 1 is coded as 0 or 1 to indicate whether a corresponding PDU session is inactive or not.

10. A method of communication by a network entity in charge of mobility management in a wireless communication system supporting a plurality of protocol data unit (PDU) sessions, the method comprising:
- receiving, from a terminal, a first non-access stratum (NAS) message including first information indicating whether each of the plurality of PDU sessions is inactive or not; and
- transmitting, to the terminal, a second NAS message including second information indicating whether each of the plurality of PDU sessions is inactive or not,
- wherein the plurality of PDU sessions are identified by a plurality of PDU session identities (PSIs), respectively,
- wherein the first information is represented by a plurality of bits, the plurality of bits being mapped respectively to the plurality of PSIs and each of the plurality of bits being coded as a value of 0 or 1 to indicate whether a corresponding PDU session is inactive or not,
- wherein the second information is represented by a plurality of bits, the plurality of bits being mapped respectively to the plurality of PSIs and each of the plurality of bits being coded as value of 0 or 1 to indicate whether a corresponding PDU session is inactive or not,
- wherein a number of the plurality of PSIs is at least a number of data radio bearers (DRBs) supported by the terminal, and
- wherein each of the plurality of PSIs is represented by using 8 bits.

11. The method of claim 10, wherein the number of DRBs supported by the terminal is 16.

12. The method of claim 10, wherein each of the plurality of bits in the first information indicates that the corresponding PDU session is not inactive if coded as 1 and indicates that the corresponding PDU session is inactive if coded as 0, and
- wherein each of the plurality of bits in the second information indicates that the corresponding PDU session is not inactive if coded as 1 and indicates that the corresponding PDU session is inactive if coded as 0.

13. The method of claim 10, wherein the plurality of PSIs is represented, by using 8 bits, as values from 0 to value of the number of the DRBs supported by the terminal minus 1, and
- wherein bits in the first information corresponding to a plurality of PSIs represented as values from 1 to value of the number of the DRBs supported by the terminal minus 1 is coded as 0 or 1 to indicate whether a corresponding PDU session is inactive or not, and
- wherein bits in the second information corresponding to a plurality of PSIs represented as values from 1 to value of the number of the DRBs supported by the terminal minus 1 is coded as 0 or 1 to indicate whether a corresponding PDU session is inactive or not.

14. A network entity in charge of mobility management in a wireless communication system supporting a plurality of protocol data unit (PDU) sessions, the network entity comprising:
- a transceiver; and
- a processor coupled with the transceiver and configured to:
  - receive, from a terminal, a first non-access stratum (NAS) message including first information indicating whether each of the plurality of PDU sessions is inactive or not; and
  - transmit, to the terminal, a second NAS message including second information indicating whether each of the plurality of PDU sessions is inactive or not,
- wherein the plurality of PDU sessions are identified by a plurality of PDU session identities (PSIs), respectively,
- wherein the first information is represented by a plurality of bits, the plurality of bits being mapped respectively to the plurality of PSIs and each of the plurality of bits being coded as a value of 0 or 1 to indicate whether a corresponding PDU session is inactive or not, wherein the second information is represented by a plurality of bits, the plurality of bits being mapped respectively to the plurality of PSIs and each of the plurality of bits being coded as value of 0 or 1 to indicate whether a corresponding PDU session is inactive or not, wherein a number of the plurality of PSIs is at least a number of data radio bearers (DRBs) supported by the terminal, and wherein each of the plurality of PSIs is represented by using 8 bits.

15. The network entity of claim 14, wherein the number of DRBs supported by the terminal is 16.

16. The network entity of claim 14, wherein each of the plurality of bits in the first information indicates that the corresponding PDU session is not inactive if coded as 1 and indicates that the corresponding PDU session is inactive if coded as 0, and wherein each of the plurality of bits in the second information indicates that the corresponding PDU session is not inactive if coded as 1 and indicates that the corresponding PDU session is inactive if coded as 0.

17. The network entity of claim 14, wherein the plurality of PSIs is represented, by using 8 bits, as values from 0 to value of the number of the DRBs supported by the terminal minus 1, and wherein bits in the first information corresponding to a plurality of PSIs represented as values from 1 to value of the number of the DRBs supported by the terminal minus 1 is coded as 0 or 1 to indicate whether a corresponding PDU session is inactive or not, and wherein bits in the second information corresponding to a plurality of PSIs represented as values from 1 to value of the number of the DRBs supported by the terminal minus 1 is coded as 0 or 1 to indicate whether a corresponding PDU session is inactive or not.

* * * * *